(12) United States Patent
Hashimoto et al.

(10) Patent No.: US 7,835,625 B2
(45) Date of Patent: Nov. 16, 2010

(54) RECORDING MEDIUM, PLAYBACK APPARATUS, MANAGEMENT PROGRAM AND PLAYBACK METHOD

(75) Inventors: Satoshi Hashimoto, Lawrenceville, NJ (US); Masahiro Oashi, Kyoto (JP); Tomoyuki Okada, Nara (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 958 days.

(21) Appl. No.: 11/568,555

(22) PCT Filed: Nov. 30, 2005

(86) PCT No.: PCT/JP2005/022009
§ 371 (c)(1),
(2), (4) Date: Nov. 1, 2006

(87) PCT Pub. No.: WO2006/059654
PCT Pub. Date: Jun. 8, 2006

(65) Prior Publication Data
US 2007/0223876 A1    Sep. 27, 2007

(30) Foreign Application Priority Data
Dec. 1, 2004    (JP)    ............... 2004-349144

(51) Int. Cl.
*H04N 5/91* (2006.01)
(52) U.S. Cl. .................. 386/95; 386/96; 386/125
(58) Field of Classification Search .............. 386/46, 386/95, 96, 98, 125, 126
See application file for complete search history.

(56) References Cited

U.S. PATENT DOCUMENTS

| 6,097,558 | A | 8/2000 | Oguro |
| 2002/0194618 | A1 | 12/2002 | Okada et al. |
| 2003/0161615 | A1 | 8/2003 | Tsumagari et al. |
| 2004/0101285 | A1* | 5/2004 | Seo et al. ................ 386/95 |
| 2004/0120695 | A1 | 6/2004 | Tsumagari et al. |
| 2005/0089310 | A1* | 4/2005 | Fischer .................. 386/96 |
| 2005/0198115 | A1* | 9/2005 | Sugimoto et al. ........ 709/203 |
| 2007/0041279 | A1* | 2/2007 | Kim et al. .............. 369/4 |

FOREIGN PATENT DOCUMENTS

| JP | 7-320411 | 12/1995 |
| JP | 9-18833  | 1/1997  |

(Continued)

OTHER PUBLICATIONS

English language abstract of JP 2002-369154.

(Continued)

*Primary Examiner*—Huy T Nguyen
(74) *Attorney, Agent, or Firm*—Greenblum & Bernstein, P.L.C.

(57) ABSTRACT

A BD-ROM on which an AVClip and a Java™ application are recorded. The AVClip includes a video stream and an audio stream multiplexed therein. On the BD-ROM recorded further are management information and the Mixing_On flag corresponding to the management information. The management information indicates a playback control of the AVClip that is to be played back when the Java™ application is executed. The Mixing_On flag indicates whether or not when a user performs an operation on the Java™ application being executed while the AVClip is under the playback control, mixing of the click sound with an audio output of the AVClip is available.

5 Claims, 45 Drawing Sheets

FOREIGN PATENT DOCUMENTS

| | | |
|---|---|---|
| JP | 2002-369154 | 12/2002 |
| JP | 2003-150180 | 5/2003 |
| JP | 2003-249057 | 9/2003 |
| JP | 2004-206863 | 7/2004 |

OTHER PUBLICATIONS

English language abstract of JP 2003-249057.
English language abstract of JP 2004-206863.
English language abstract of JP 2003-150180.

\* cited by examiner

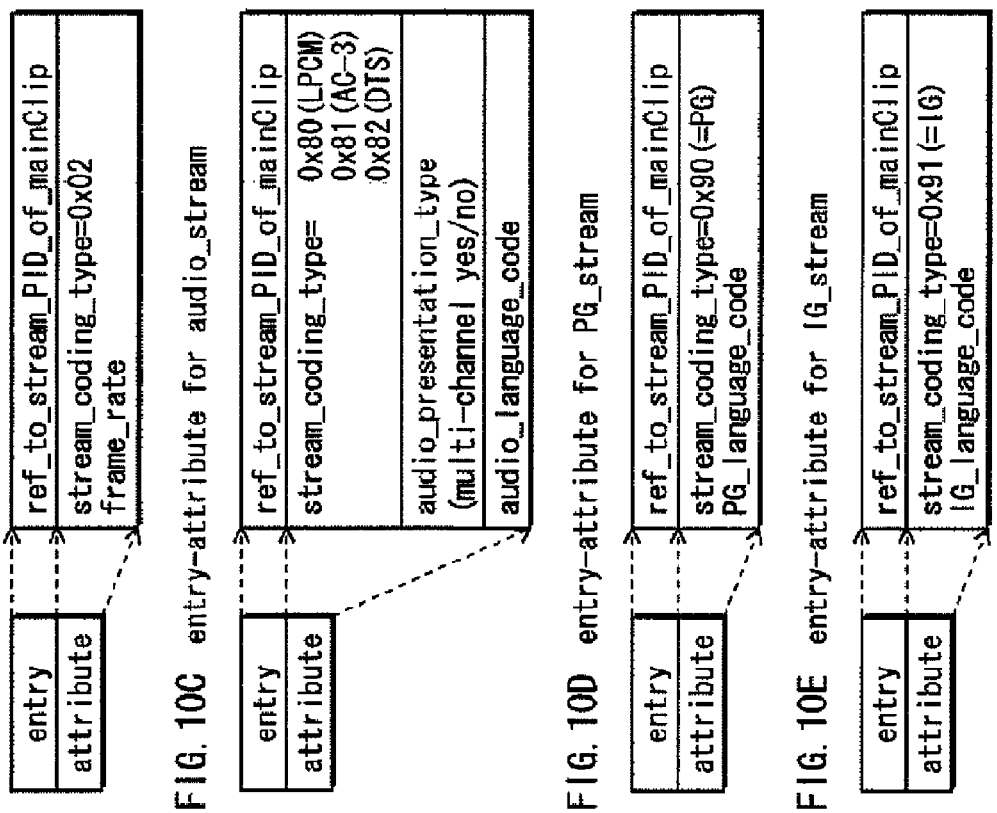
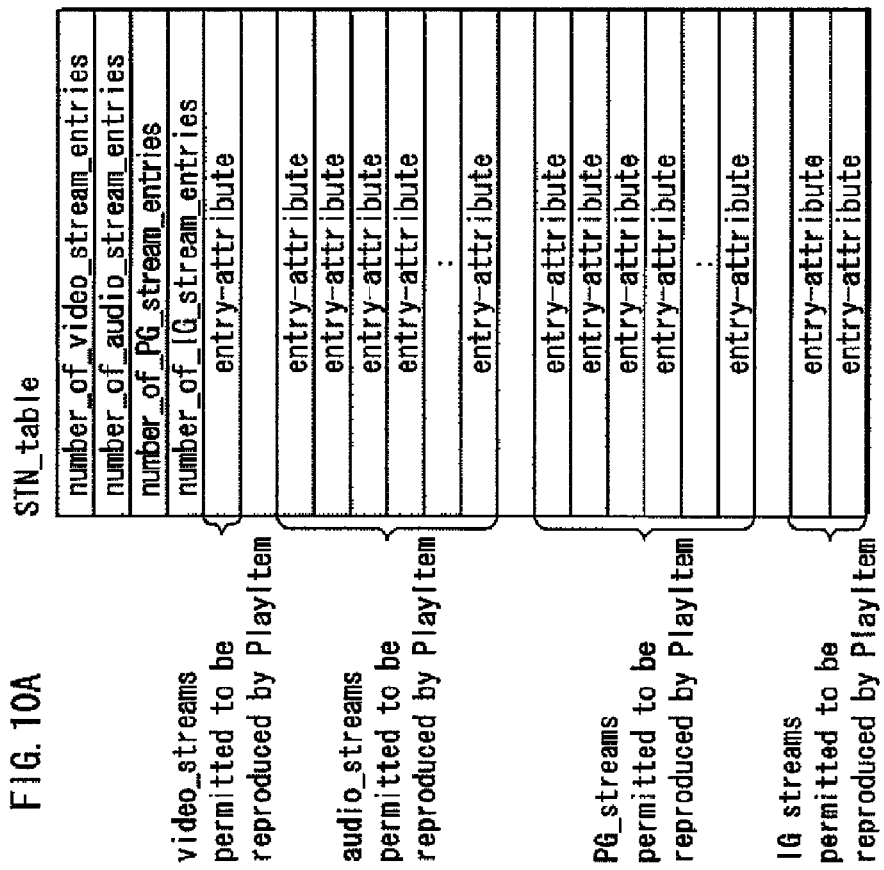

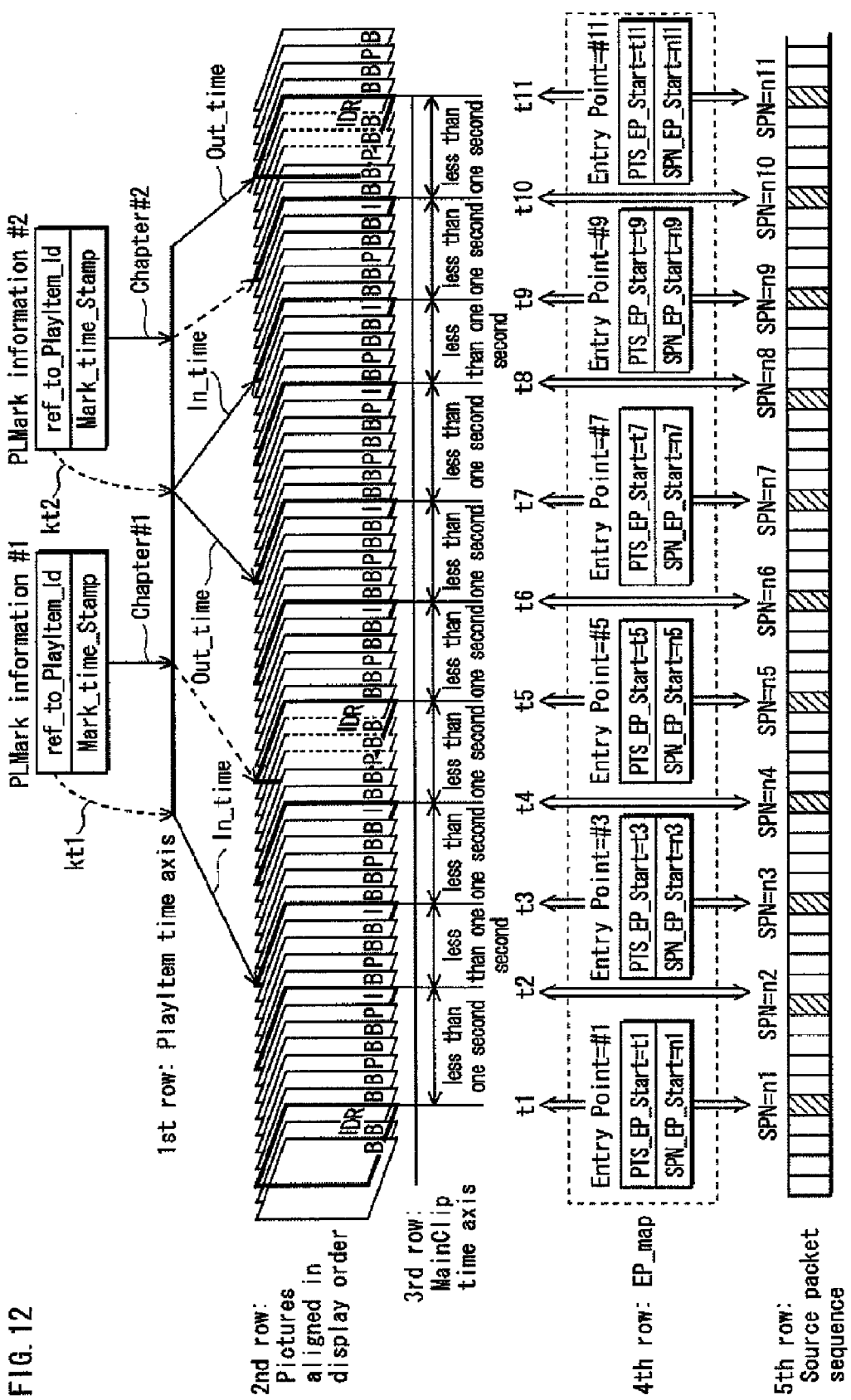

FIG. 13

Information correlating Java application with stream···BD-JObject
XXXXX.BOBJ

| | |
|---|---|
| Application Management Table (AMT) | Defining Java application whose life cycle is Title corresponding to BD-JObject |
| PlayList Management Table (PLMT) | Indicating PlayList to be reproduced simultaneously with execution of Java application in Title corresponding to BD-JObject |
| Sound Management Table (SMT) | Indicating whether to validate or invalidate mixing of click sound for audio output during playback of PlayList |

FIG. 16A Application Management Table (AMT)

| life_cycle |
| --- |
| apli_id_ref |
| run_attribute |
| run_priority |

FIG. 16B Application Management Table (AMT)

| life_cycle | apli_id_ref | run_attribute | run_priority |
| --- | --- | --- | --- |
| Application "life cycle" represented by Title, PL, Chapter | Reference value for "application ID" being 5-digit integer zzzzz assigned to JAR file name | "Run attribute" that is Auto Run, Present (no specification), or Suspend | "Run priority" that takes value ranging from 0 to 255 |

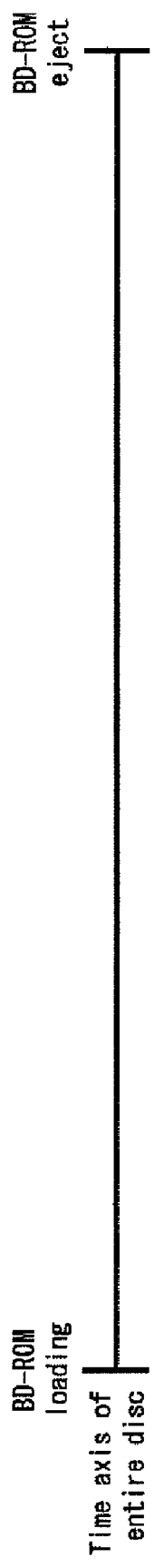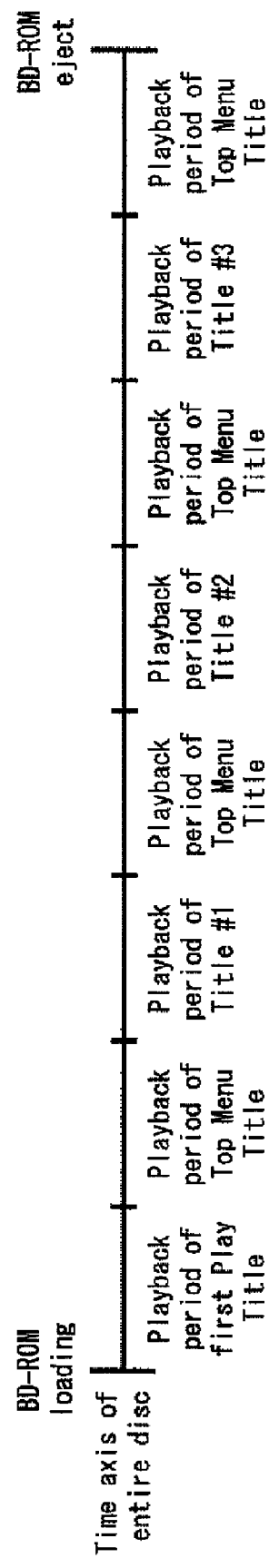
FIG. 18A
FIG. 18B

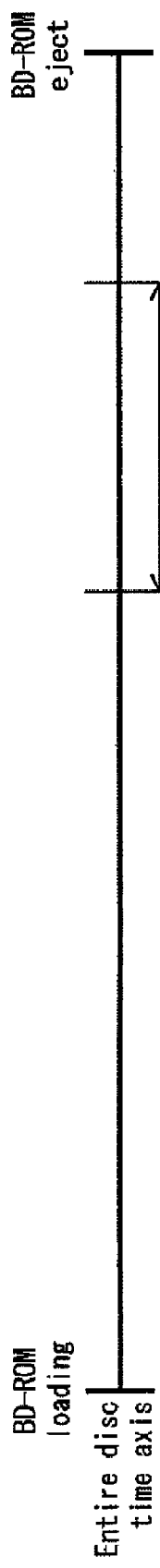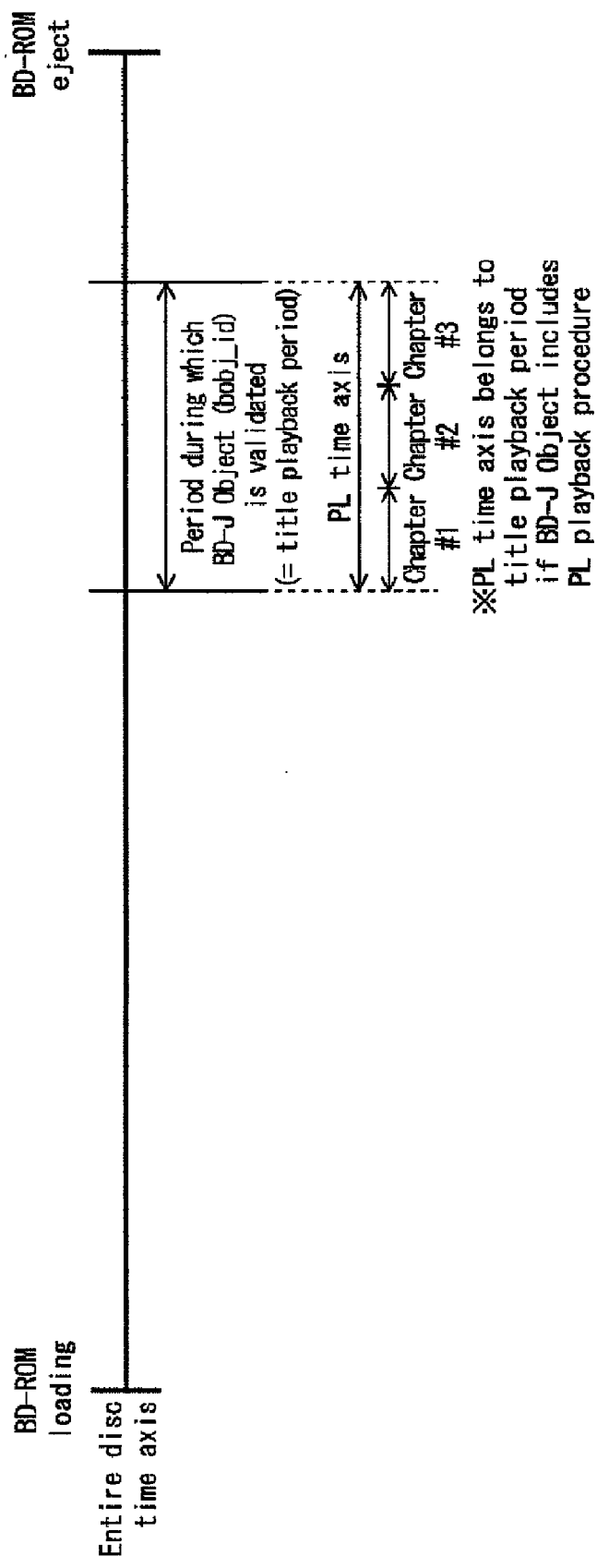
FIG. 19A
FIG. 19B

FIG. 23

| Application status in previous title | Run attribute | | |
|---|---|---|---|
| | Present | AutoRun | Suspend |
| Not run | Maintain status with no operation | Start application | Maintain status with no operation |
| Running | Maintain status with no operation | Maintain status with no operation | Suspend |
| Suspend | Resume | Resume | Maintain status with no operation |

FIG. 24A  Play List Management Table (PLMT)

| PL_id_ref |
|---|
| Playback_Attribute |

FIG. 24B  Play List Management Table (PLMT)

| PL_id_ref | Playback_Attribute |
|---|---|
| "Play List ID" being 5-digit value in MPLS file name | "Playback attribute" that is Auto Play or Present (no specification) |

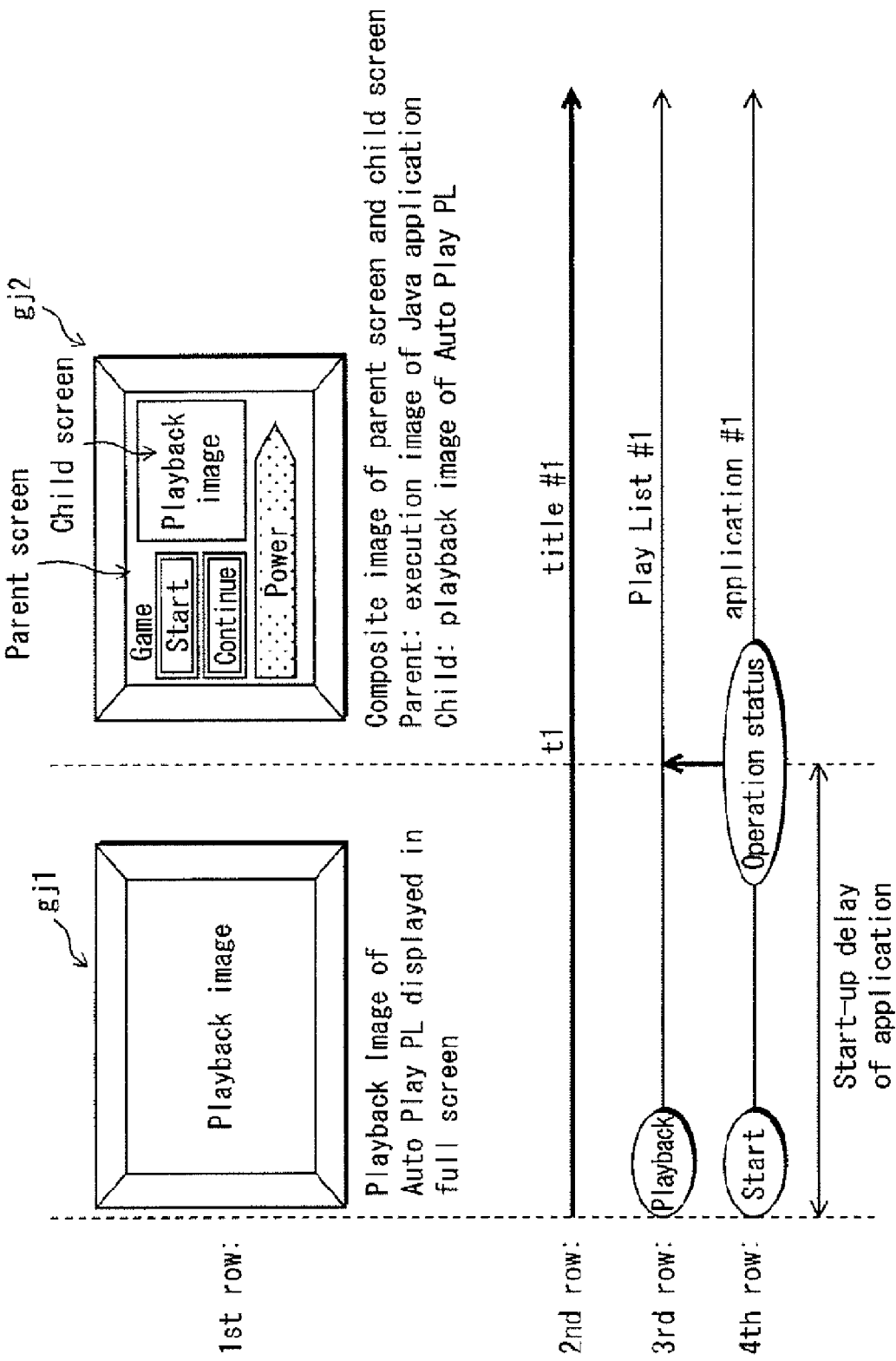

FIG. 26

| | Branch destination Title has no PLMT | Branch destination Title has PLMT | |
|---|---|---|---|
| | | Playback attribute: Auto Play | Playback attribute: Present |
| Branch source Title being played back | Stop playback | Maintain status | Maintain status |
| Branch source Title not being played back | Maintain status | Start automatic playback | Maintain status |

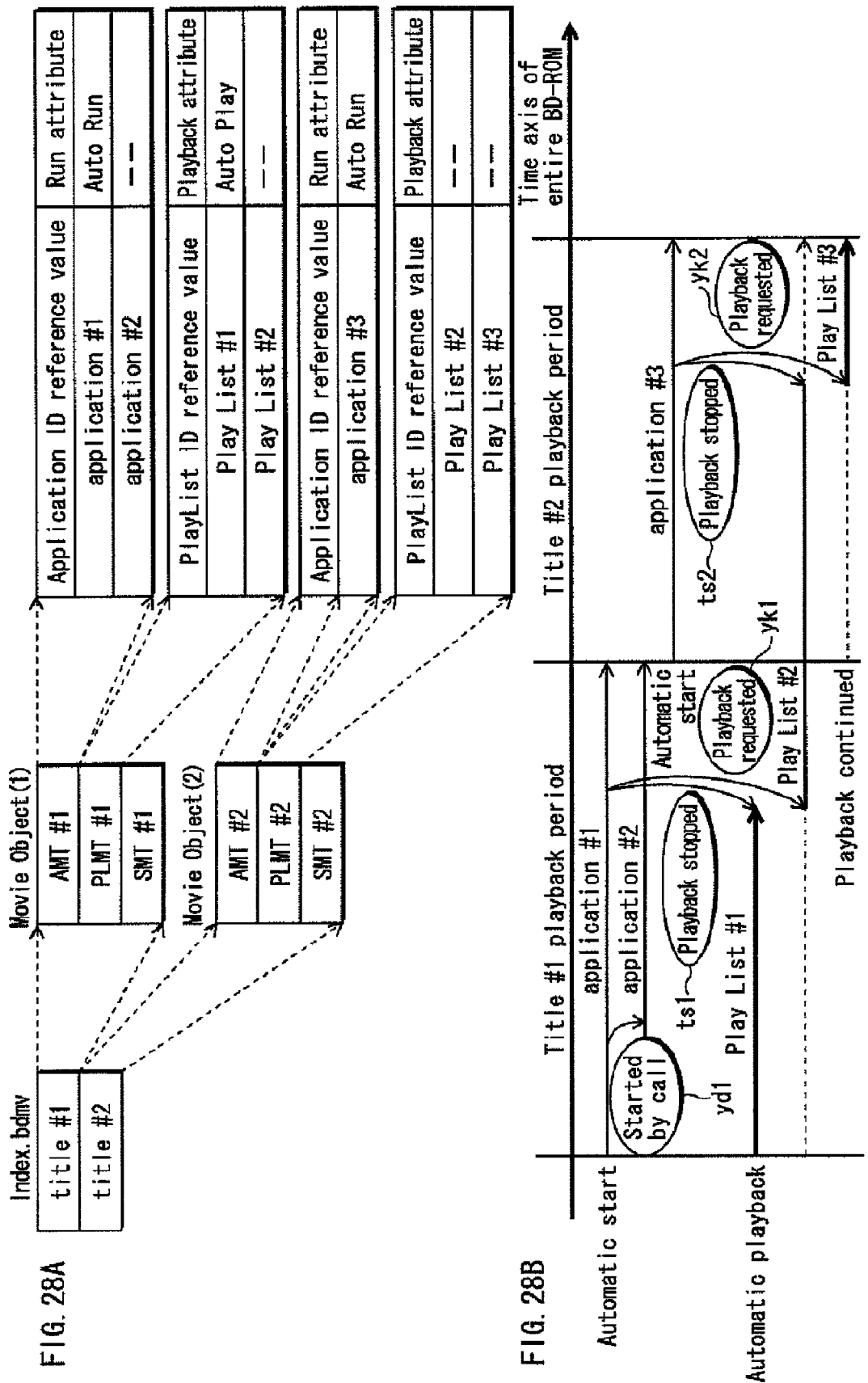

FIG. 29

SMT (Sound Management Table)

| Mixing_ON flag (to validate sound mixing) | "1" indicates to mix playback sound/voice of PL to be played back with click sound of sound.bdmv based on PLMT belonging to same BD-JObject<br><br>"0" indicates not to mix playback sound/voice of PL to be played back with click sound of sound.bdmv based on PLMT belonging to same BD-JObject | Default value 0 |
|---|---|---|

FIG. 44A

Selection algorithm by Parental Level

| PSR range | Play List_id_ref |
|---|---|
| PSR(13)<14 | Play List #1 |
| 14≦PSR(13)<18 | Play List #2 |
| 18≦PSR(13) | Play List #3 |

FIG. 44B

Selection algorithm by Language Code for Audio

| PSR range | Play List_id_ref |
|---|---|
| PSR(16)=English | Play List #1 |
| PSR(16)=Japanese | Play List #2 |
| PSR(16)=others | Play List #3 |

FIG. 44C

Selection algorithm by Player Configuration for Video

| PSR range | Play List_id_ref |
|---|---|
| PSR(14)=525×60 TV system 4:3 Letter Box | Play List #1 |
| PSR(14)=525×60 TV system 16:9 | Play List #2 |
| PSR(14)=1920×1080TV system | Play List #4 |

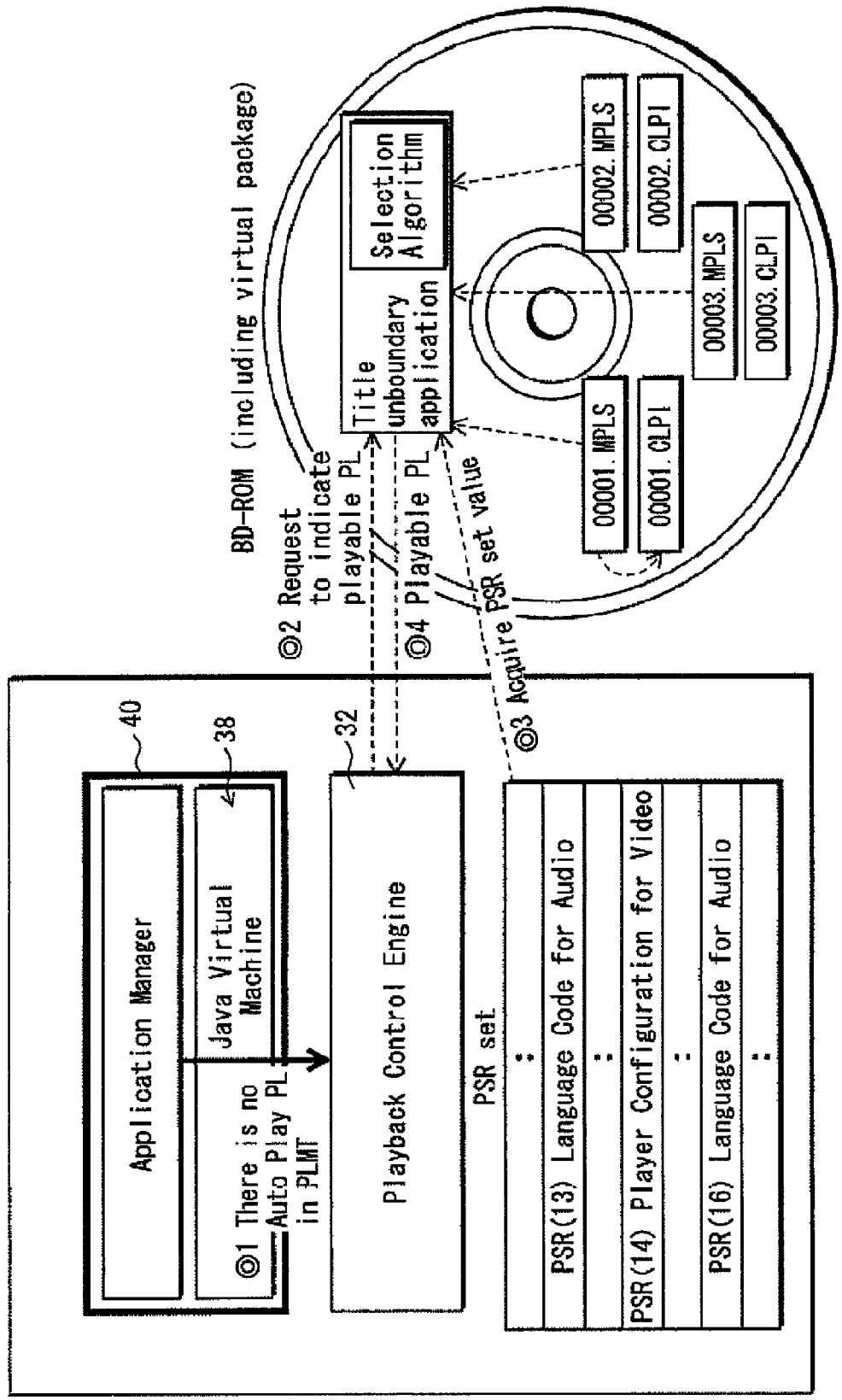

RECORDING MEDIUM, PLAYBACK APPARATUS, MANAGEMENT PROGRAM AND PLAYBACK METHOD

TECHNICAL FIELD

The present invention relates to a technical field of a click sound playback.

BACKGROUND ART

The click sound playback is a technology of, when a user operates onto a GUI that is displayed while a motion picture is played back, mixing a click sound with a playback sound/voice of the motion picture and outputting the mixed sound/voice.

For example, when the GUI, displayed while a motion picture is played back, can receive an instruction to perform a function like "game start" from the user, an audio announce "Let's play the game!!" may be mixed, as the click sound, with the playback sound/voice of the motion picture and the mixed sound/voice may be output. In such a case, if the audio announce is a voice or a character appearing in the motion picture, the user, especially when he/she is a child, will have an impression that he/she is talked to by the character appearing in the motion picture. With the introduction of such a click sound, it is possible to provide the motion picture with a GUI that make children fun.

The following Document 1 discloses a technology for mixing an audio output with another audio output and outputting a mixed sound/voice.

Document 1: Japanese Patent Application Publication No. 7-320411

DISCLOSURE OF THE INVENTION

The Problems the Invention is Going to Solve

Meanwhile, to mix the click sound, it is necessary to develop the digitized audio stream into the LPCM state. In such a case, if the audio stream of the main playback data, which is to be mixed with the click sound, has a multi-channel attribute such as 5.1 channels, the amount of the developed data in the LPCM state is extremely large. For this reason, there are some types of digital interfaces that cannot output a mixed digital sound/voice due to a band-related restriction, after mixing a click sound with an audio stream having a multi-channel attribute. Motion pictures produced in recent years have a tendency to give importance to the acoustic effects. Also, there are many users who spend a lot of cost to build a private acoustic system composed of an amplifier, surround speakers and the like. In these circumstances, the motion pictures would be damaged a lot if the introduction of the click sound would interrupt the digital audio output of the motion picture.

In so far as there is a fear that the multi-channel audio output might be interrupted if the click sound was introduced, the function of the click sound itself will not be easily adopted in the motion picture production. To eliminates the fear of the production studio, it is only required that every playback apparatus needs to re-encode, for example. That is to say, this problem will be cleared if the playback apparatus has an encoders develops an audio stream having a multi-channel attribute such as 5.1 channels into the LPCM state, mixes the click sound with the developed audio data, re-encode the mixed audio data, and digitally outputs the re-encoded audio data. More specifically, when a digital interface such as the S/PDIF (Sony/Philips Digital Interconnect Format, ISO60958-3 standard) is used to digitally output the mixed sound/voice, it is necessary to perform the above-mentioned re-encoding and a conversion of data into the Dolby digital or DTS. However, such re-encoding requires an encoder. Accordingly, the technology will hardly be employed as the standard model for the BD-ROM playback apparatus.

It is therefore an object of the present invention to provide a recording medium that enables mixed audio data produced by mixing with a click sound to be output, without adversely affecting the audio output.

Means to Solve the Problems

The above-mentioned object is fulfilled by a recording medium on which an application, management information, a flag corresponding to the management information, and a digital stream including a video stream and an audio stream multiplexed therein are recorded, wherein the management information indicates a playback control on she digital stream that is to be played back when the application is executed, and the flag is used to indicate whether or not a playback apparatus should mix a click sound with an audio output of the digital stream, when a user performs an operation on the application.

Effects of the Invention

With the above-stated construction of the present invention, it is possible to invalidate the sound mixing when a playback control intended to output a multi-channel sound/voice is performed, and to validate the sound mixing when a playback control not intended to output a multi-channel sound/voice is performed.

This enables the motion picture production studio to prohibit the click sound from being played back when a multi-channel playback is intended, and to prohibit the multichannel playback when the click sound is intended to be played back.

This makes it possible to eliminate the fear of the production studio that the multi-channel audio output might be interrupted if the click sound was introduced. And this will spur the introduction of the click sound into motion pictures.

BRIEF DESCRIPTION OF THE DRAWING

FIG. 10A shows the internal structure of the STN_table.

FIGS. 10B-10E show details of entry-attribute.

FIG. 12 shows how chapter positions are specified by the PLMark information of the PlayList information.

FIG. 13 shows the internal structure of BD-J Object.

FIG. 16A shows the internal structure of the application management table.

FIG. 16B shows the meaning of the information elements that constitute the application management table.

FIG. 18A shows the time axis of the entire BD-ROM.

FIG. 18B shows how the time axis of the entire BD-ROM is structured.

FIGS. 19A and 19B show, in the time axis of the entire BD-ROM, Title playback periods that are identified by BD-J Objects.

FIG. 23 shows combinations of the three run attributes (Present, AutoRun, and Suspend) and three possible statuses of the previous Title (Not Run, Running, and Suspend).

FIG. 24A shows the internal structure off the PlayList management table.

FIG. 24B shows the meaning of the information elements that constitute the PlayList management table.

FIG. 25 shows specific examples of Titles defined by the PlayList management table and the application management table.

FIG. 26 shows six combinations of three possible statuses of the branch destination Title, namely the current Title ((i) Not having PlayList management table, (ii) Having PlayList management table and AutoPlay, and (iii) Having PlayList management table and Present) and two possible statuses of the PlayList in the previous Title (Not being played back, and Being played back).

FIG. 28A shows another example of the description of the PlayList management table.

FIG. 28B shows how the PlayLists are played back and the applications are executed based on the PlayList and application management tables that are written as shown in FIG. 28A.

FIG. 29 shows the internal structure of the sound management table.

FIG. 31 shows an audio playback performed by the playback apparatus when a button on the GUI framework is operated with respect to a Title for which the Mixing_On flag is set to ON.

FIG. 44A shows the contents of the selection algorithm based on the parental level.

FIG. 44A shows she contents of the selection algorithm based on the parental level.

FIG. 44B shows the contents of the selection algorithm based on Language for Audio.

FIG. 44C shows the contents of the selection algorithm based on Player Configuration for Video.

FIG. 45 is an illustration of the process in which the Title unboundary application selects PlayLists.

DESCRIPTION OF CHARACTERS

Figure 1:
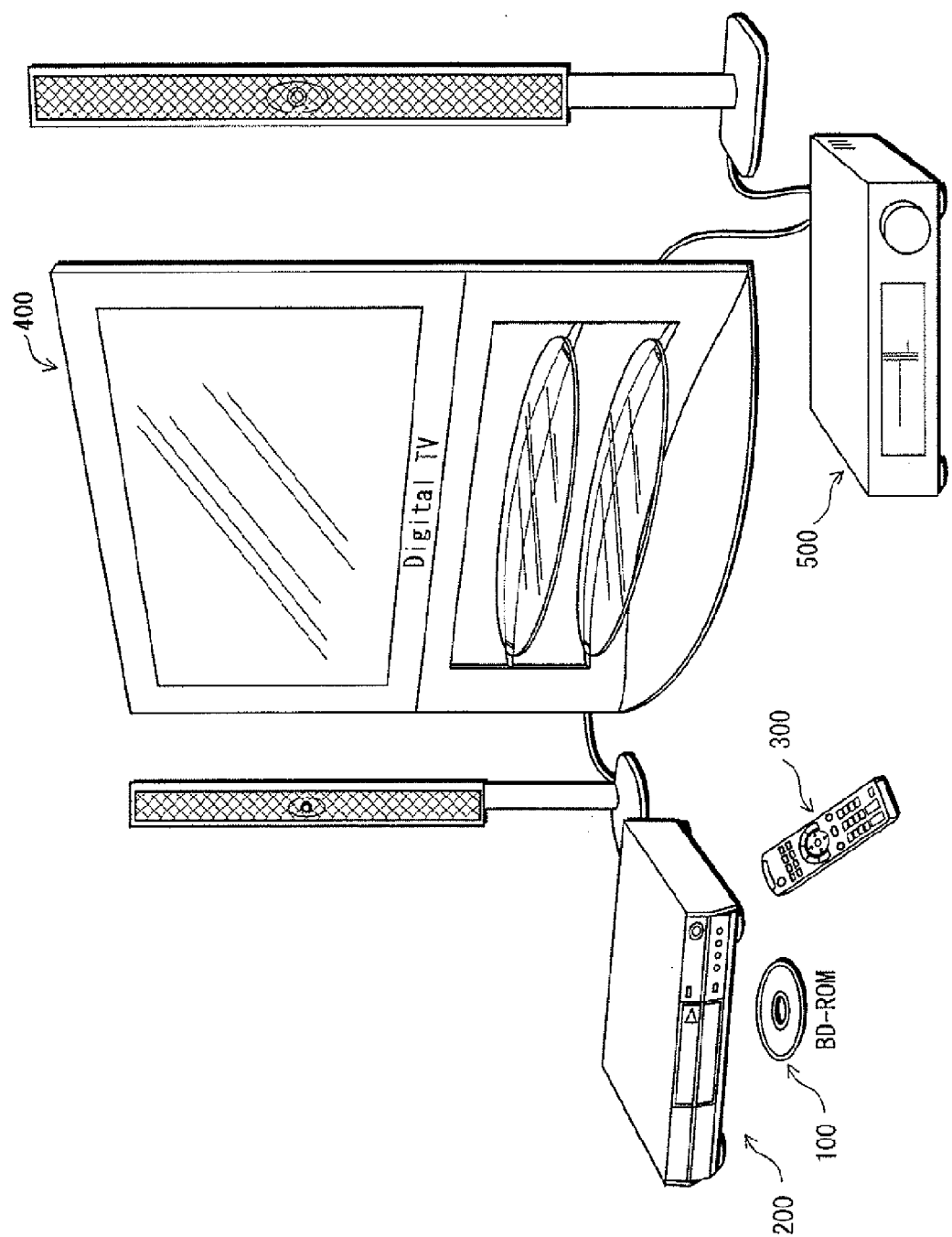
FIG. 1 shows a use of the recording medium of the present invention.

1 BD-ROM drive
2 read buffer
3 demultiplexer
4 video decoder
5 video plane
6 sound processor
7 sound processor
8 mixer
9 sound controller
10 D/A converter
11 interactive graphics decoder
12 interactive graphics plane
13 presentation graphics decoder
14 presentation graphics plane
15 JPEG decoder
16 still plane
17 combining unit
18 STC-delta adding unit
19 ATC-delta adding unit
20 local storage
21 instruction ROM
22 user event processing unit
23 PSR set
24 CPU
25 scenario memory
26 local memory

BEST MODE FOR CARRYING OUT THE INVENTION

Embodiment 1

The following describes embodiments of the recording medium of the present invention. First, the use form of the recording medium of the present invention will be described. In FIG. 1, the recording medium of the present invention is a BD-ROM 100. The BD-ROM 103 is used for providing contents to a home theater system that is composed of a playback apparatus 200, a remote control 300, a television 400, and an amplifier 500.

In this home theater system, the playback apparatus 200 plays bask various data recorded on the BD-ROM 100, and provides a video output and an audio output. The playback apparatus 200 sends the video output to the television 400 via the HDMI (High Definition Multimedia Interface) and an analog interface. The playback apparatus 210 also sends the audio output to the television 400 or the amplifier 500 via the S/PDIF or the HDMI and an analog Interface.

Up to now, the use form of the recording medium of the present invention has been described.

Figure 2:
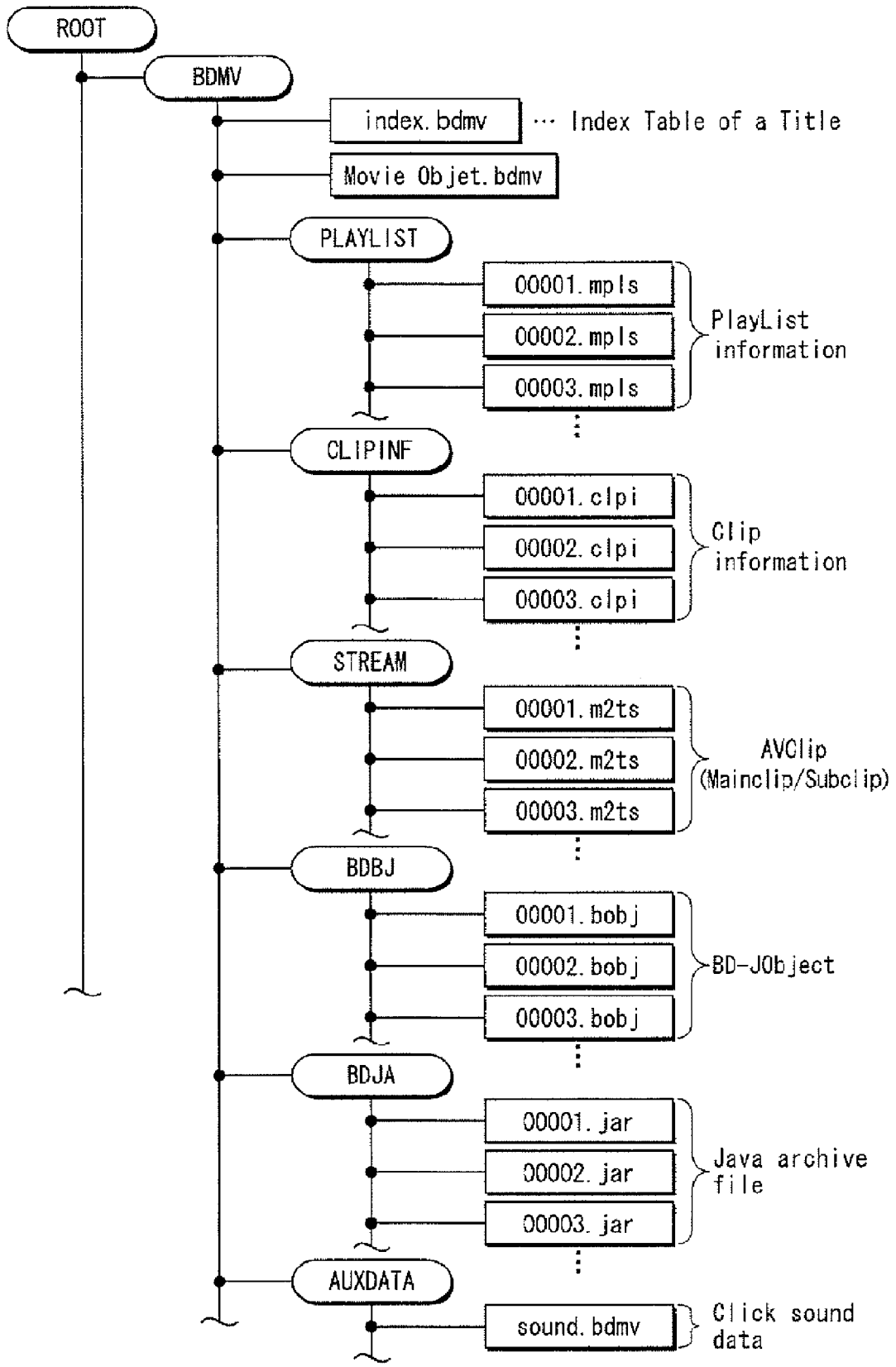
FIG. 2 shows the internal structure of the BD-ROM.

The following describes the manufacturing of the recording medium of the present invention. The recording medium of the present invention can be achieved as an improvement in a file system on a BD-ROM. FIG. 2 shows a file/directory structure for BD-ROM. As FIG. 2 indicates, for BD-ROM, the BDMV directory is provided under the root directory.

The BDMV directory has files to which extension "bdmv" has been attached ("index.bdmv", "Movie Object.bdmv"). Under the BDMV directory, there are six sub-directories: PLAYLIST, CLIPINF, STREAM, BDBJ, BDJA, and AUX-DATA directories.

The PLAYLIST directory has files to which extension "mpls" has been attached ("00001.mpls", "00002.mpls", "00003.mpls").

The CLIPINF directory has files to which extension "clpi" has been attached ("00001.clpi", "00002.clpi", "00003.clpi").

The STREAM directory has files to which extension "m2ts" has been attached ("00001.m2ts", "00002.m2ts", "00003.m2ts").

The BDBJ directory has files to which extension "bobj" has been attached ("00001.bobj", "00002.bobj", "00003.bobj").

The BDJA directory has files to which extension "jar" has been attached ("00001.jar", "00002.jar", "00003.jar").

The AUXDATA directory includes a file "sound.bdmv".

It is understood from the above-described directory structure that a plurality of different types of files are stored in the BD-ROM.

<BD-ROM Structure 1: AVClip>

Figure 3:
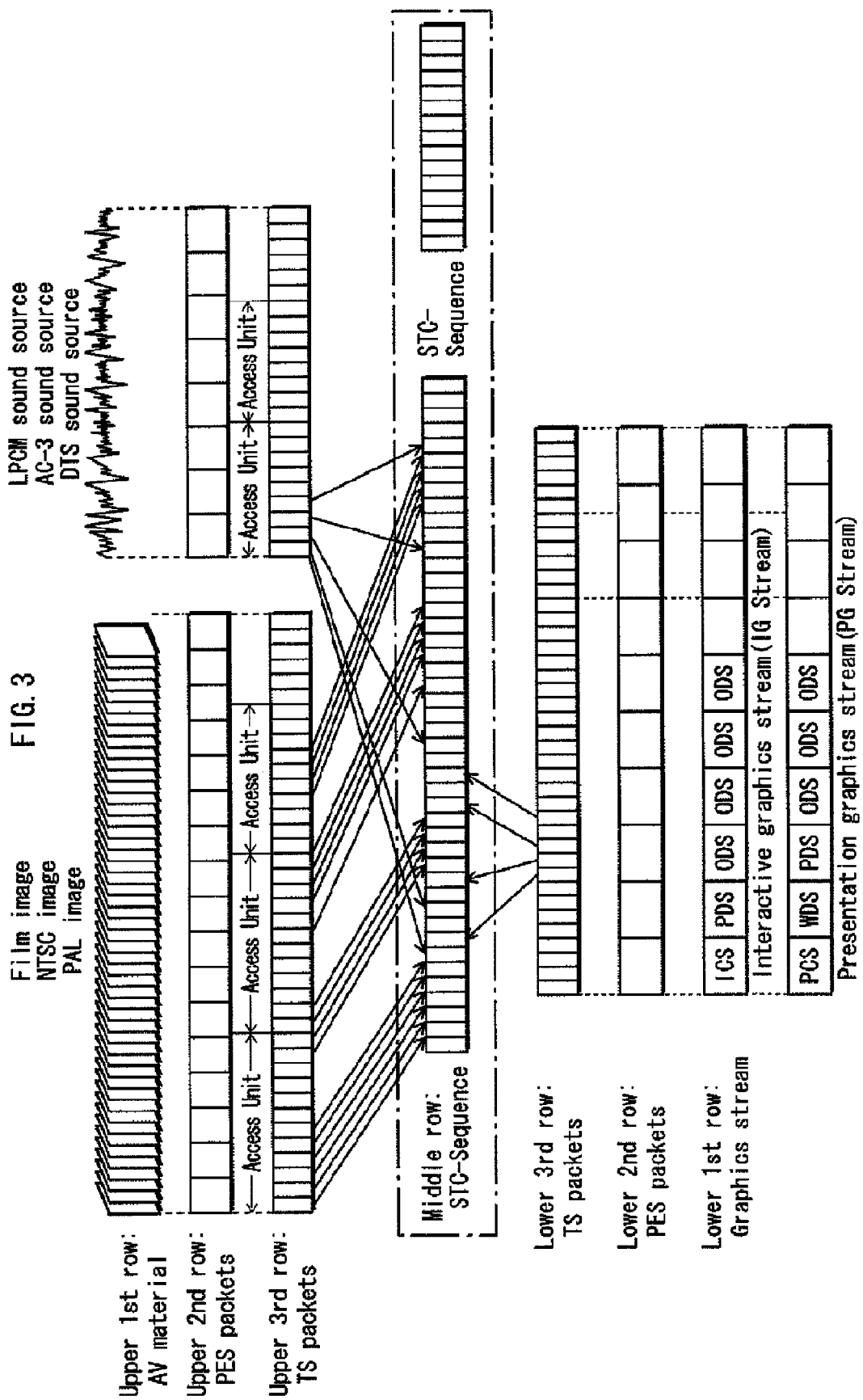
FIG. 3 shows the structure of the file to which the extension "m2ts" is attached.

Firstly, files attached with the extension "m2ts" will be explained. FIG. 3 shows the structure of the file no which the extension "m2ts" is attached. The file to which the extension "m2ts" is attached ("00001.m2ts", "00002.m2ts", "00003.m2ts" . . . ) stores an AVClip. The AVClip is a digital stream in the MPEG2-Transport Stream format. The digital stream is generated by converting the digitized video, which is obtained by digitizing the film image, NTSC image, PAL image or the like (upper $1^{st}$ row), and the digitized audio, which is obtained by digitizing the LPCM sound source, AC-3 sound source, DTS sound source or the like (upper $1^{st}$ row), into an elementary stream composed of PES packets (upper $2^{nd}$ row), and converting the elementary stream into TS packets (upper $3^{rd}$ row), and similarly, converting the Presentation Graphics (PG) stream for the subtitles or the like and the Interactive Graphics (IG) stream or the interactive purposes (lower $1^{st}$ row) into the PES packets (lower $2^{nd}$ row), converting the PES packets into TS packets (lower $3^{rd}$ row), and finally multiplexing these TS packets.

The PG stream is an elementary stream that achieves a display of subtitles in line with the progress of a playback of a moving image. The IG stream is an elementary stream that achieves a GUI in line with the progress of a playback of a moving image.

The digital image composed of PES packets is called a video stream, and the sound/voice composed of PES packets is called an audio stream. The video stream and the audio stream are elementary streams. These streams can be decoded in units of, for example, "Access Units". In the video streams, what is called GOP (Group Of Pictures) is the Access Unit.

In the video stream, a playback unit (for example, picture) that is played back in one PTS is called "Video Presentation Unit". In the audio stream, a playback unit that is played back in one PTS is called "Audio Presentation Unit".

The PES packets constituting the AVClip also constitute one or more "STC_Sequences". Each "STC_Sequence" is a sequence of PES packets, and the values of the System Time Clock (STC) that is referred to by their PTSs and DTSs do not include a system time-base discontinuity. Since it is a necessary requirement for the STC_Sequence that it does not include a system time-base discontinuity, one STC_Sequence is constituted from a sequence of PES packets that starts with a PES packet that includes a PCR (Program Clock Reference) and is immediately after a system time-base discontinuity and ends with a PES packet immediately before the next system time-base discontinuity.

Figure 4:
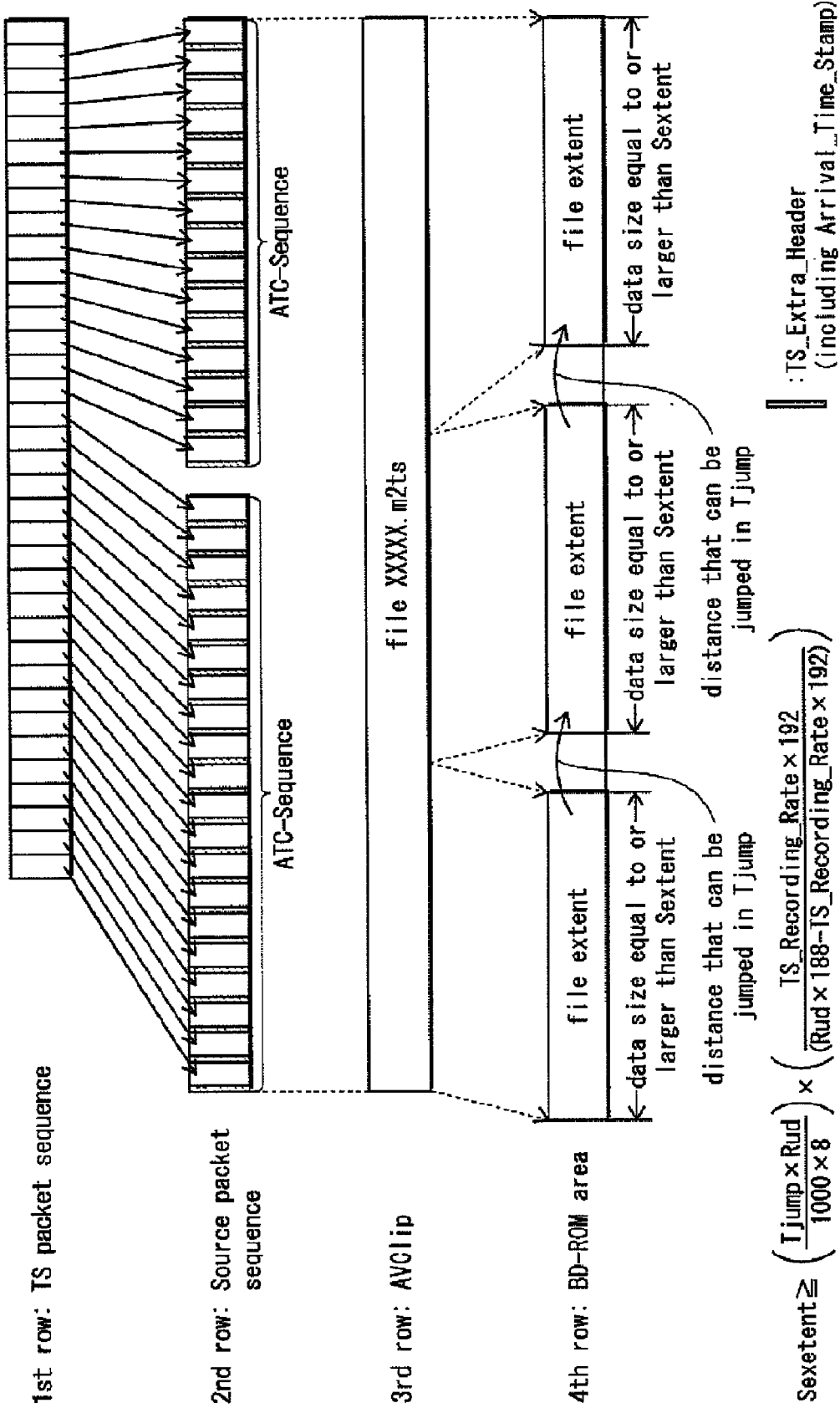
FIG. 4 shows what processes the TS packets constituting the AVClip are subjected to before they are written to the BD-ROM.

Next, how the AVClip having the above-described construction is written to the BD-ROM will be explained. FIG. 4 shows what processes the TS packets constituting the AVClip are subjected to before they are written to the BD-ROM. The $1^{st}$ row of FIG. 4 shows the TS packets constituting the AVClip.

As shown in the $2^{nd}$ row of FIG. 4, a 4-byte TS_extra_header (shaded portions in the drawing) is attached to each 188-byte TS packet constituting the AVClip to generate each 192-byte Source packet. The TS_extra_header includes Arrival_Time_Stamp that is Information Indicating the time at which the TS packet is input to the decoder.

The AVClip shown in the $3^{rd}$ row includes one or more "ATC_Sequences" each of which is a sequence of Source packets. The "ATC_Sequence" is a sequence of Source packets, where Arrival_Time_Clocks referred to by the Arrival_Time_Stamps included in the ATC_Sequence do not include "arrival time-base discontinuity". In other words, the "ATC_Sequence" is a sequence of Source packets, where Arrival_Time_Clocks referred to by the Arrival_Time_Stamps included in the ATC_Sequence are continuous.

Such ATC_Sequences constitute the AVClip, and is recorded on the BD-ROM with a file name "xxxxx.m2ts".

The AVClip is, as is the case with the normal computer files, divided into one or more file extents, which are then recorded in areas on the BD-ROM. The $4^{th}$ row shows how the AVClip is recorded on the BD-ROM. In the $4^{th}$ row, each file extent constituting the file has a data length that is equal to or larger than a predetermined length called Sextent.

Sextent is the minimum data Length of each file extent, where an AVClip is divided into a plurality of file extents to be recorded.

It is presumed here that the time required for the optical pickup to jump to a location on the BD-ROM is obtained by the following equation:

$$Tjump=Taccess+Toverhead.$$

The "Taccess" is a time (msec) that corresponds to a jump distance, and is:

179 msec when the jump distance (the number of logical blocks) is 0 to 5000;

210 msec when the jump distance (the number of logical blocks) is 5001 to 10,000;

270 msec when the jump distance (the number of logical blocks) is 10,001 to 20,000;

990 msec when the jump distance (the number of logical blocks) is a half stroke; and 1,220 msec when the jump distance (the number of logical blocks) is a full stroke.

The TS packets read out from the BD-ROM are stored in a buffer called the read buffer, and then output to the decoder. The "Toverhead" is obtained by the following equation when the input to the read buffer is performed with a bit rate called the Rud and the number or sectors in the ECC block is represented by Secc:

$$Toverhead \leq (2 \times Secc \times 8)/Rud = 20 \text{ msec}.$$

TS packets read out from the BD-ROM are stored in the read buffer in the state of Source packets, and then supplied to the decoder at a transfer rate called "TS_Recording_rate".

To keep the transfer rate of the TS_Recording_rate while the TS packets are supplied to the decoder, it is necessary that during Tjump, the TS packets are continuously output from the read buffer to the decoder. Here, Source packets, not TS packets, are output from the read buffer. As a result, when the ratio of the TS packet to the Source packet in size is 192/188, it is necessary that during Tjump, the Source packets are continuously output from the read buffer at a transfer rate of "192/188×TS_Recording_rate".

Accordingly, the amount of occupied buffer capacity of the read buffer that does not cause an underflow is represented by the following equation:

$$Boccupied \geq (Tjump/1000 \times 8) \times ((192/188) \times TS\_Recording\_rate).$$

The input rate to the read buffer is represented by Rud, and the output rate from the read buffer is represented by TS_Recording_rate×(192/188). Therefore, the occupation rate of the read buffer is obtained by performing "(input rate)−(output rate)", and thus obtained by "(Rud−TS_Recording_rate)× (192/188)".

The time "Tx" required to occupy the read buffer by "Boccupied" is obtained by the following equation:

$$Tx=Boccupied/(Rud-TS\_Recording\_rate \times (192/188)).$$

When reading from the BD-ROM, it is necessary to continue to input TS packets with the bit rate Rud for the time period "Tx". As a result, the minimum data length Sextent per extent when the AVClip is divided into a plurality of file extents to be recorded is obtained by the following equations:

$$Sextent=Rud \times Tx$$

$$=Rud \times Boccupied/(Rud-TS\_Recording\_rate \times (192/188))$$

$$\geq Rud \times (Tjump/1000 \times 8) \times ((192/188) \times TS\_Recording\_rate)/(Rud-TS\_Recording\_rate \times (192/188))$$

$$\geq (Rud \times Tjump/1000 \times 8) \times TS\_Recording\_rate \times 192/(Rud \times 188-TS\_Recording\_rate \times 192)$$

Hence, $$Sextent \geq (Tjump \times Rud/1000 \times 8) \times (TS\_Recording\_rate \times 192/(Rud \times 188-TS\_Recording\_rate \times 192)).$$

If each file extent constituting the AVClip has the data length that is equal to or larger than Sextent that is calculated as a value that does not cause an underflow of the decoder, even if the file extents constituting the AVClip are located discretely on the BD-ROM, TS packets are continuously supplied to the decoder so that the data is read out continuously during playback.

Figure 5:
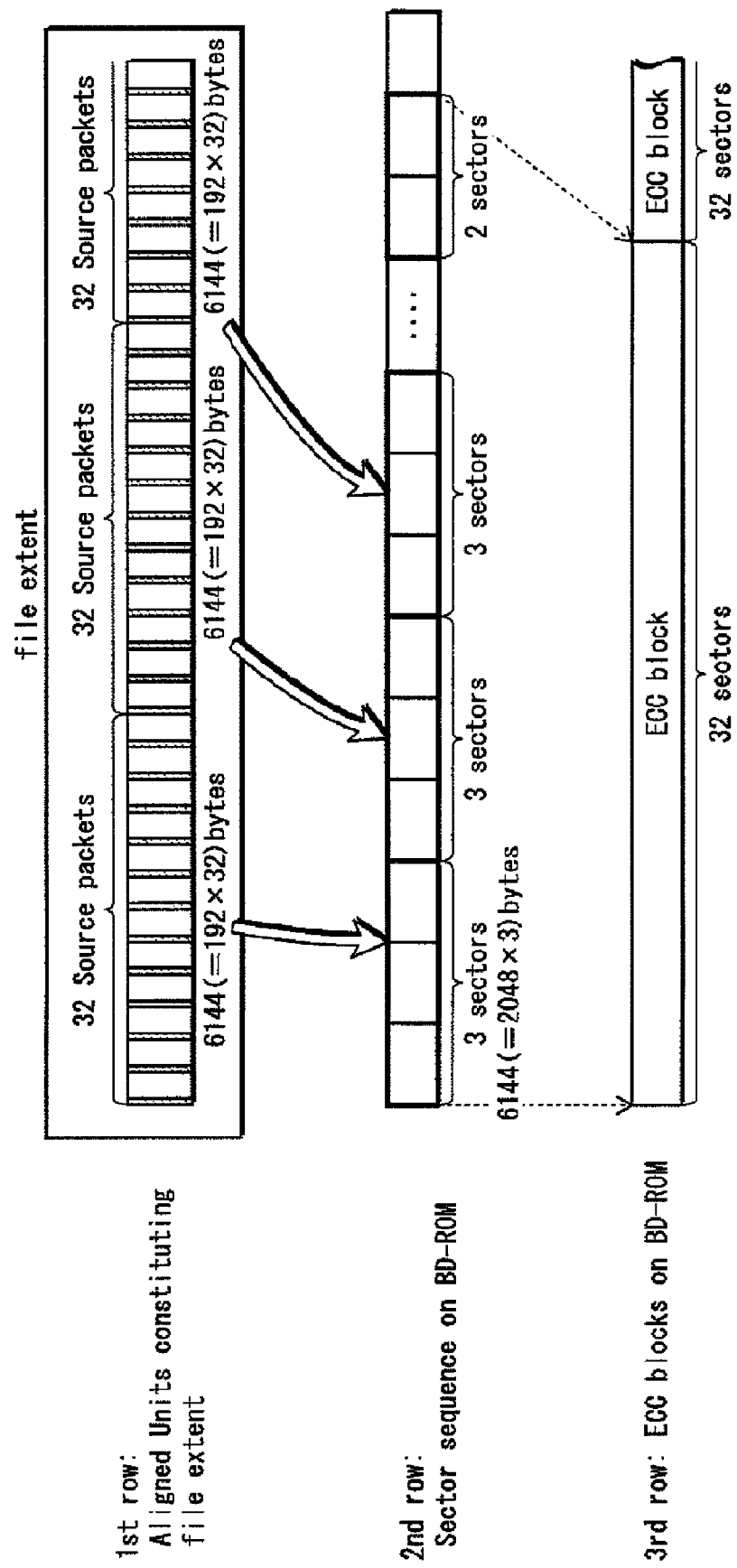
FIG. 5 shows what processes the TS packets constituting the AVClip are subjected to before they are written to the BD-ROM.

FIG. 5 shows relationships between the physical unit of the DD-ROM and the Source packets constituting one file extent. As shown in the $2^{nd}$ row, a plurality of sectors are formed on the BD-ROM. The Source packets constituting the file extent are, as shown in the $1^{st}$ row, divided into groups each of which is composed of 32 Source packets. Each group of Source packets is then written into a set of three consecutive sectors. The group of 32 Source packets is 6144 bytes (=32×192), which is equivalent to the size of three sectors (=2048×3). The 32 Source packets stored in the three sectors is called an "Aligned Unit". Writing to the BD-ROM is performed in units of Aligned Units.

In the $3^{rd}$ row, an error correction code is attached to each block of 32 sectors. The block with the error correction code is referred to as an ECC block. In so far as it access the BD-ROM in units of Aligned Units, the playback apparatus can obtain 32 complete Source packets. Up to now, writing process of the AVClip to the BD-ROM has been described.

<BD-ROM Structure 2: Clip Information>

Figure 6:
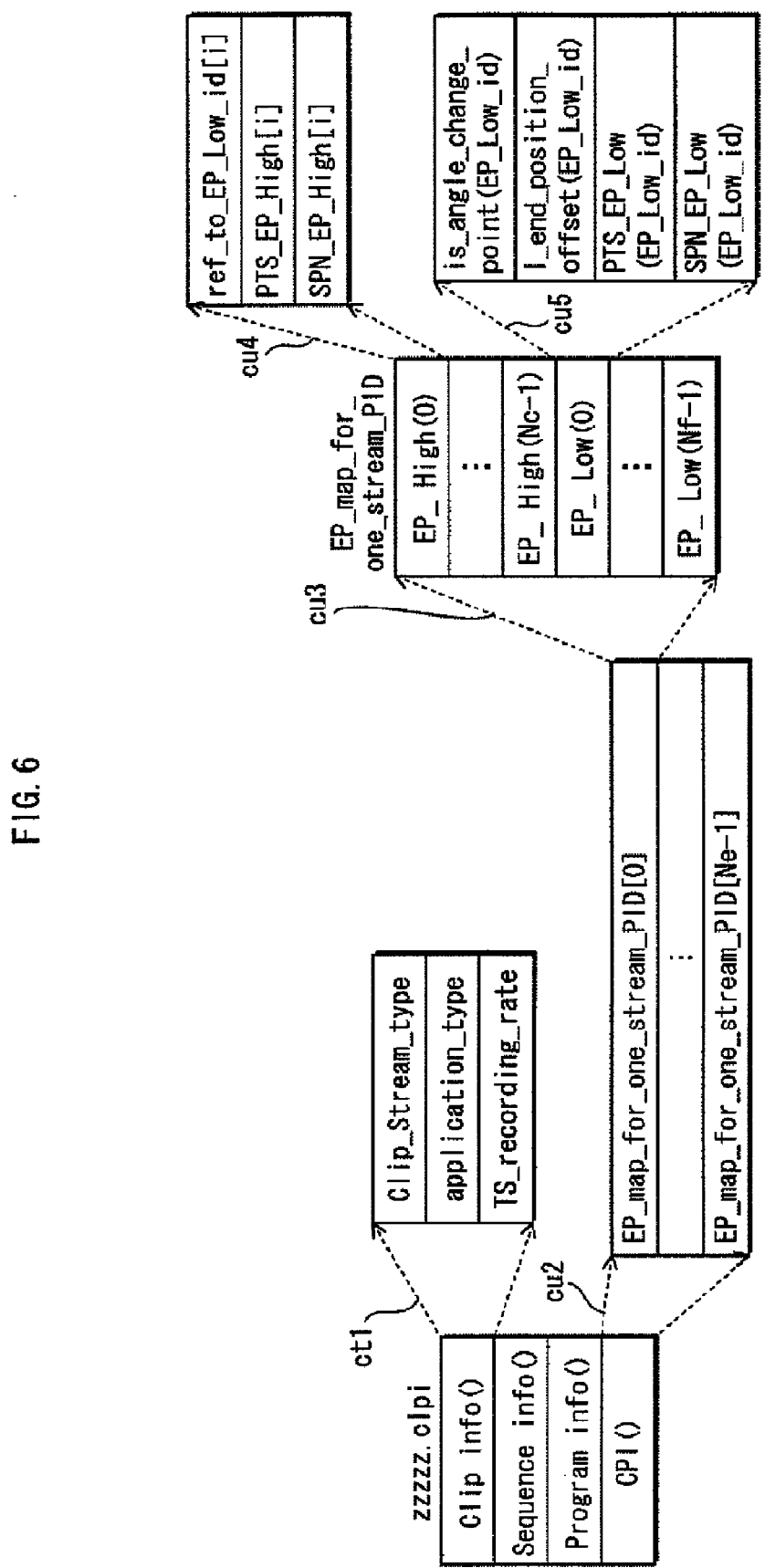
FIG. 6 shows the internal structure of Clip information.

Next, files to which an extension "clpi" is attached will be described. A file (00001.clip, 00002.clip, 00003.clip, . . . ), to which an extension "clpi" is attached, stores Clip information. The Clip information is management information on each AVClip. FIG. 6 shows the internal structure of Clip information. As shown on the left-hand side of the drawing, the Clip information includes:

i) "ClipInfo( )" storing information regarding the AVClip;

ii) "Sequence Info( )" storing information regarding the ATC Sequence and the STC Sequence;

iii) "Program Info( )" storing information regarding the Program Sequence; and iv) "Characteristic Point Info (CPI( ))".

The Sequence Info is information regarding one or more STC-Sequences and ATC-Sequences contained in the AVClip. The reason that these information are provided is to preliminarily notify the playback apparatus of the system time-base discontinuity and the arrival time-base discontinuity. That is to say, if such discontinuity is present there is a possibility that a PTS and an ATS that have the same value appear in the AVClip. This might be a cause of a defective playback. The Sequence Info provided to indica-e from where to where in the transport stream the STCs or the ATCs are sequential.

The Program Info is information that indicates a section (called "Program Sequence") of the program where the contents are constant. Here, "Program" is a group of elementary streams that have in common a time axis for synchronized playback. The reason that the Program Sequence information is provided is to preliminarily notify the playback apparatus of a point at which the Program contents change. It should be noted here that the point at which the Program contents change is, for example, a point at which the PID of the video stream changes, or a point at which the type of the video stream changes from SDTV to HDTV.

From now on, the Characteristic Point Info will be described. The lead line cu2 indicates the close-up of the structure of CPI. As indicated by the lead line cu2, the CPI is composed of the Ne number of EP_map_for_one_stream_PIDs: EP_map_for_one_stream_PID [0] . . . EP_map_for_one_stream_PID [Ne−1]. These EP_map_for_one_stream_PIDs are EP_maps of the elementary streams that belong to the AVClip. The EP_map is information that indicates, in association with an entry time (PTS_EP_start), a packet number (SPN_EP_start) at an entry position where the Access Unit is present in one elementary stream. The lead line cu3 in the drawing indicates the close-up of the internal structure of EP_map_for_one_stream_PID.

It is understood from this that the EP_map_for_one_stream_PID is composed of the Ne number of EP_Highs (EP_High(0) . . . EP_High(Nc−1)) and the Nf number of EP_Lows (EP_Low(0) . . . EP_Low(Nf−1)). Here, the EP_High plays a role of indicating upper bits of the SPN_EP_start and the PTS_EP_start of the Access Unit, the EP_Low plays a role of indicating lower bits of the SPN_EP_start and the PTS_EP_stars of the Access Unit.

The lead line cu4 in the drawing indicates the close-up of the internal structure of EP_High. As indicated by the lead line cu4, the EP_High(i) is composed of: "ref_to_EP_Low_id [i]" that is a reference value to EP_Low; "PTS_EP_High[i]" that indicates upper bits of the PTS of the Non-IDR I-Picture and the IDR-Picture that are at the start of the Access Unit; and "SPN_EP_High[i]" that indicates upper bits of the SPN of the Non-IDR I-Picture and the CPR-Picture that are at the start of the Access Unit. Here, "i" is an identifier of a given EP_High.

The lead line cu5 in the drawing indicates she close-up of the structure of EP_Low. As indicated by the lead line cu5, the EP_Low(i) is composed of: "is_angle_change_point(EP_Low_id)" that indicates whether or not the corresponding Access Unit is an IDR picture; "I_end_position_offset (EP_Low_id)" that indicates the size of the corresponding Access Unit; "PTS_EP_Low(EP_Low_id)" that indicates lower bits of the PTS of the Access Unit (Non-IDR I-Picture, IDR-Picture); and "SPN_EP_Low(EP_Low_id)" that indicates lower bits of the PTS of the Access Unit (Non-IDR I-Picture, IDR-Picture). Here, "EP_Low_id" is an identifier for identifying a given EP_Low.

<Clip Information Explanation 2: EP_Map>

Figure 7:
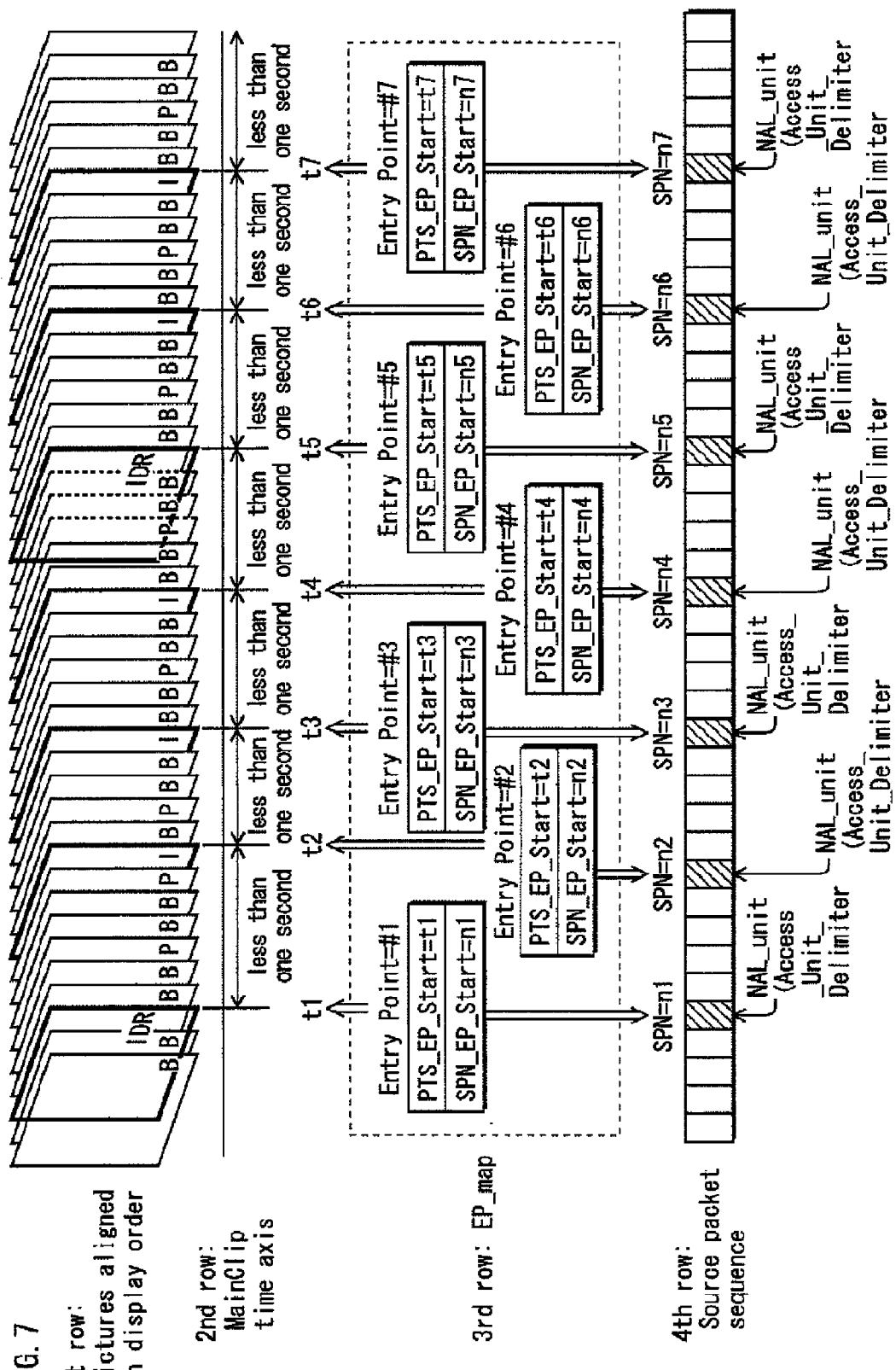
FIG. 7 shows EP_map settings on a video stream of a motion picture.

Here, the EP_map will be explained in a specific example. FIG. 7 shows EP_map settings on a video stream of a motion picture. The 1$^{st}$ row shows a plurality of pictures (IDR picture, I-Picture, B-Picture, and P-Picture-defined in MPEG4-AVC). The 2$^{nd}$ row shows the time axis for the pictures. The 4$^{th}$ row indicates a packet sequence, and the 3$^{rd}$ row indicates settings of the EP_map.

It is presumed here that in the time axis of the 2$^{nd}$ row, an IDR picture or an I-Picture is present at each time point t1 . . . t7. The interval between adjacent ones of the time point t1 . . . t7 is approximately one second. The EP_map used for the motion picture is set to indicate t1 to t7 as the entry times (PTS_EP_start) and indicate entry positions (SPN_EP_start) in association with the entry times.

<PlayList Information>

Next, the PlayList information will be described. A file (00001.mpls) to which extension "mpls" is attached is a file storing the PlayList (PL) Information.

Figure 8:
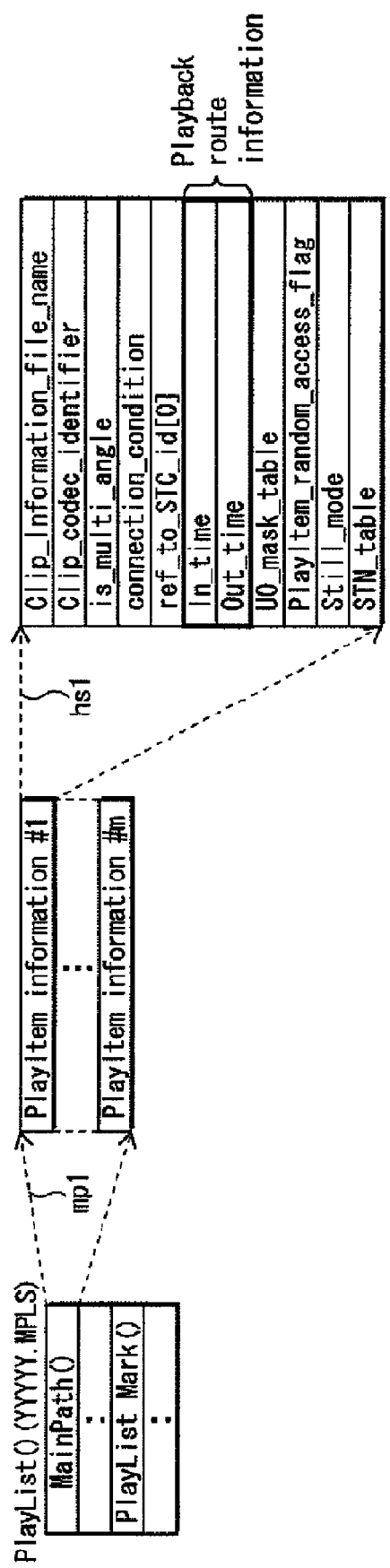
FIG. 8 shows the data structure of the PlayList information.

FIG. 8 shows the data structure of the PlayList Information. As indicated by the lead line mp1 in FIG. 8, the PlayList Information includes: MainPath information (MainPath( )) that defines MainPath; and PlayListMark information (PlayListMark( )) that defines chapter.

<PlayList Information Explanation 1: MainPath Information>

First, the MainPath will be described. The MainPath is a presentation path that is defined in terms of the video stream as the main image and the audio stream.

As indicated by the arrow mp1 the MainPath is defined by a plurality of pieces of PlayItem information: PlayItem information #1 . . . PlayItem information #m. The PlayItem information defines one or more logical playback periods that constitute the MainPath. The lead line hs1 in the drawing indicates the close-up of the structure of the PlayItem information. As indicated by the lead line hs1, the PlayItem information is composed of: "Clip_Information_file_name" that indicates the file name of the playback period information of the AVClip to which the IN point and the OUT point of the playback period belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id[0]" that indicates uniquely the STC_Sequence targeted by the PlayItem; "In_time" that is time information indicating the start point of the playback period; "Out_time" that is time information indicating the end point of the playback period; "UO_mask_table" that indicates which user operation should be masked by the PlayItem; "PlayItem_random_access_flag" that indicates whether or not to permit a random access to a mid-point in the PlayItem; "Still_mode" that indicates whether or not to continue a still display of the last picture after the playback of the PlayItem ends; and "STN_table". Among these, the time information "In_time" in indicating the start point of the playback period and the time information "Out_time" indicating the end point of the playback period constitute a presentation path. The presentation path information is composed of "In_time" and "Out_time".

Figure 9:
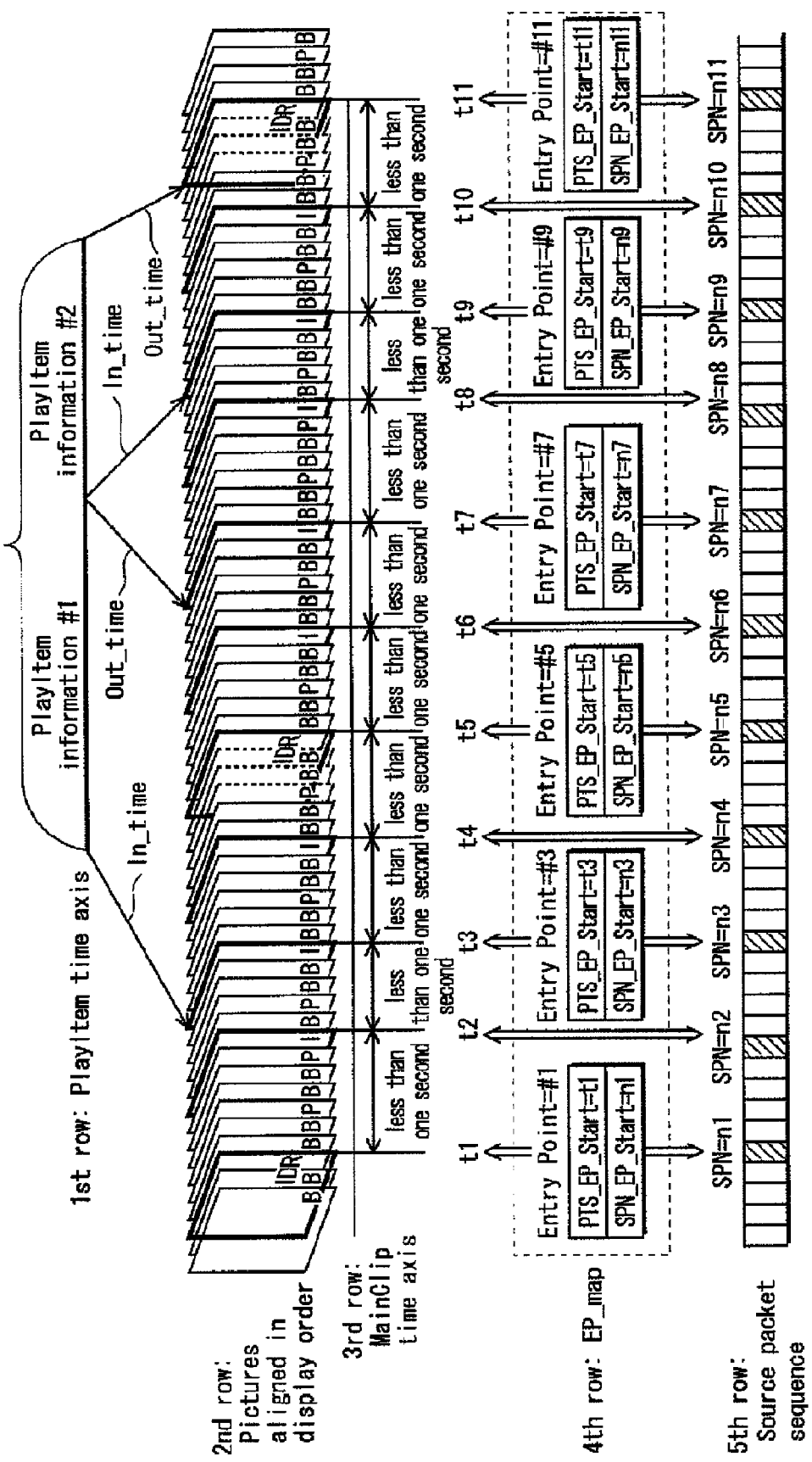
FIG. 9 shows the relationships between the AVClip and the PlayList information.

FIG. 9 shows the relationships between the AVClip and the PlayList information. The 1$^{st}$ row shows the time axis held by the PlayList information. The 2$^{nd}$ to 5$^{th}$ rows show the video stream (the same one shown in FIG. 7) that is referenced by the EP_map.

The PlayList information includes two pieces of PlayItem information: PlayItem information #1; and PlayItem information #2. Two playback periods are defined by "In_time" and "Out_time" included in the PlayItem information #1 and PlayItem information #2. When these playback periods are arranged, a tame axis that is different from the AVClip time axis is defined. This is the PlayList time axis shown in she 1$^{st}$ row. As understood from this, it is possible, by defining she PlayItem information, to define a presentation path that is different from the AVClip.

<STN_table>

The STN_table is a able that indicates playable streams among a plurality of elementary streams multiplexed in the AVClips specified by the Clip_Information_file_name in the PlayItem information. More specifically, the STN_table is generated by associating "entry" with "attribute" for each of the plurality of elementary streams.

FIG. 10A shows the internal structure of the STN_table. As shown in FIG. 10A, the STN_table includes a plurality of pairs (entry-attribute) of an entry of the STN_table and an attribute, and shows the number of the pairs (number_of_video_stream_entries, number_of_audio_stream_entries, number_of_PG_stream_entries, number_of_PG_stream_entries).

In the STN_table, as indicated by the parenthesis sign "(", each entry-attribute pair correspond to any of a video stream, audio stream, PG stream, and IG stream that are permitted to be by the PlayItem.

Here, the entry-attribute pair is described in detail. FIGS. 10B to 10E show details of the entry-attribute pairs.

FIG. 10B shows entry attribute corresponding to a video streams.

The entry for video stream includes "ref_to_stream_PID_of_mainClip" that indicates a PID used to extract the video stream when the AVClip is demultiplexed.

The attribute for video stream includes: "stream_coding_type" set to "0x02"; and "frame_rate" that indicates the display rate of the video stream.

FIG. 10C shows entry-attribute corresponding to an audio stream.

The entry for audio stream includes "ref_to_stream_PID_of_mainClip" that indicates a PID used to extract the audio stream when the AVClip is demultiplexed.

The attribute for audio stream includes: "stream_coding_type" that is set to any of "0x80" (Linear PCM), "0x81" (AC-3), and "0x82" (DTS) to indicate the coding type of the audio stream; "audio_presentation_type" that indicates the channel construction of the corresponding audio stream to indicate whether or not the multi-channel output is available; and "audio_language_code" that indicates the language attribute of the corresponding audio stream.

The multi-channel includes, for example, stereo sound/voice as well as surround sound/voice of 5.1 channels. In the following description, however, it is supposed that the multi-channel means only the surround sound/voice of 5.1 channels.

FIG. 10D shows entry-attribute corresponding to a PG stream.

The entry for PG stream includes "ref_to_stream_PID_of_mainClip" that indicates a PID used to extract the PG stream when the AVClip is demultiplexed.

The attribute for PG stream includes: "stream_coding_type" that is set to "0x90" to indicate the codec of the PG stream; and "PG_language_code" that indicates the language attribute of the corresponding PG stream.

FIG. 10E shows entry-attribute corresponding to an IG stream.

The entry for IG stream includes "ref_to_stream_PID_of_mainClip" that indicates a PID used to extract the IG stream when the AVClip is demultiplexed.

The attribute for IG stream includes: "stream_coding_type" that is set to "0x91" to indicate the codec of the IS stream; and "IG_language_code" that indicates the language attribute of the corresponding G stream.

<PlayList Information Explanation 2: PlayListMark>

Up to now, the PlayItem information in the present embodiment has been explained. From now on, PlayListMark information will be explained.

Figure 11:
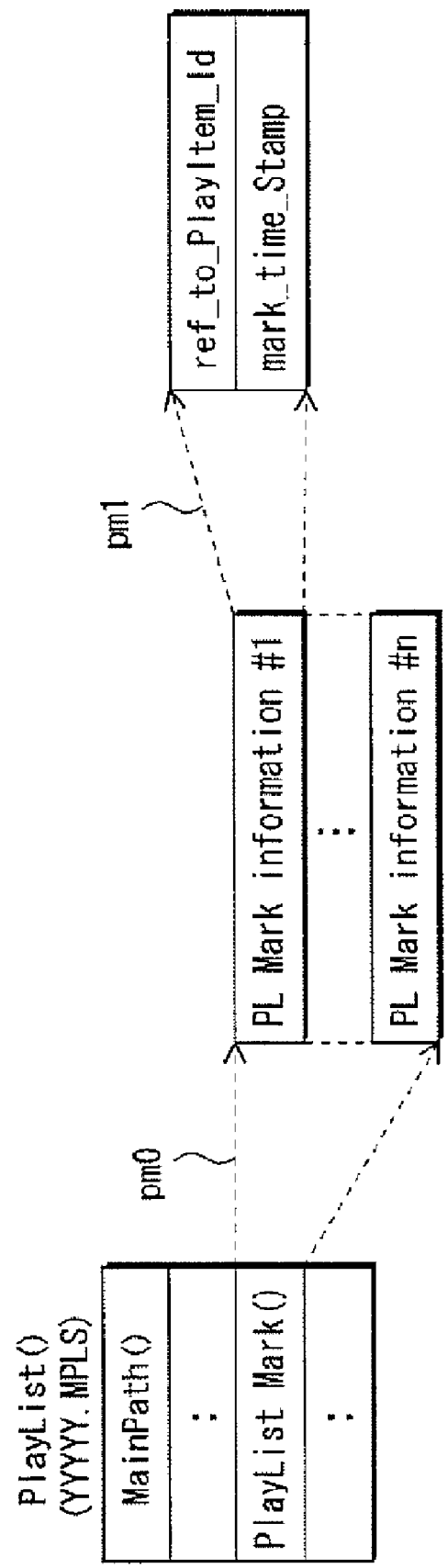
FIG. 11 shows the internal structure of the PlayListMark information of the PlayList information.

FIG. 11 shows the internal structure of the PlayListMark information of the PlayList information. As the lead line "pm0" in this figure indicates, the PlayListMark information includes a plurality of pieces of PLMark information (#1 ... #n). The PLMark information (PLMark ( )) specifies a given period in the PlayList time axis as a chapter. As the lead line "pm1" in this figure indicates, the PLMark information contains: "ref_to_PlayItem_Id" which indicates a PlayItem as the target chapter; and "Mark_time_stamp" which indicates the chapter position using the time notation.

FIG. 12 shows how chapter positions are specified by the PLMark information of the PlayList information. The $2^{nd}$ to $5^{th}$ rows in FIG. 12 show the EP_map and AVClip shown in FIG. 10.

The $1^{st}$ row shows the PL Mark information and the PL time axis. Two pieces of PL Mark information #1 and #2 are shown in the $1^{st}$ row. The arrows kt1 and kt2 indicate specifications of PlayItems by ref_to_PlayItem_Id in the PL Mark information. As understood from these arrows, ref_to_PlayItem_Id in the PL Mark information specifies PlayItems to be referred to. Also, the Mark_time_stamp indicates the times of Chapters #1 and #2 on the PL Lime axis. In this way, the PL Mark information defines chapter points on the PlayItem time axis.

The PlayList information in BD-ROM is characterized by its ability to define a synchronization period in which an AVClip and a SubClip can be synchronized. The above-described Clip information and PlayList Information are categorized as "static scenario". This is because the Clip information and PlayList Information define a PlayList that is a static playback unit. This completes the description of the static scenario.

The following describes the "dynamic scenario". The dynamic scenario is scenario data that dynamically defines the playback control of an AVClip. Here, "dynamically" means than the playback control can change in accordance with a status change of the playback apparatus or a key event from the user. BD-ROM presumes two nodes as the operation environment nor the playback control. The first mode is an operation environment similar to the operation environment of the DVD playback apparatus, and is a command-based execution environment. The second mode is an operation environment of the Java™ Virtual Machine. Of these two operation environments, the first one is called HDMV mode, and the second one is called BD-J mode. Due to the presence of the two operation environments, the dynamic scenario is written by presuming either of the two operation environments. The dynamic scenario presuming the HDMV mode is called Movie Object, and is defined by the management information. On the other hand, the dynamic scenario presuming the BD-J mode is called a BD-J Object.

First, the Movie Object will be explained.

<Movie Object>

The Movie Object is stored in a file "Movie Object.bdmv" shown in FIG. 2, and includes a navigation command sequence.

The navigation command sequence is composed of commands that achieve: a conditional branch; setting the status register in the playback apparatus; acquiring a value set in the status register, and so on. The following are the commands that can be written in the Movie Objects.

PlayPL Command

Format: PlayPL($1^{st}$ argument, $2^{nd}$ argument)

As the $1^{st}$ argument, a PlayList number can be used to indicate a PlayList to be played back. As the $2^{nd}$ argument, a PlayItem contained in the PlayList, a given time in the PlayList, a Chapter, or a Mark can be used to indicate a playback start position.

A PlayPL function that specifies a playback start position on the PL time axis using a PlayItem is called PlayPLatPlayItem( ).

A PlayPL function that specifies a playback start position on the PL time axis using a Chapter is called PlayPLat Chapter( ).

A PlayPL function that specifies a playback start position on the PL time axis using time information is called PlayPLatSpecifiedTime( ).

JMP Command

Format: JMP argument

The JMP command is used for a branch that discards a currently executed dynamic scenario and executes a branch destination dynamic scenario that is specified by the argument. The JMP command has two types: a direct reference type that directly specifies the branch destination dynamic scenario; and an indirect reference type that indirectly refers to the branch destination dynamic scenario.

The description format of the navigation command in the Movie Object resembles that in DVD. For this reason, a transplant of a disc content from a DUD onto a BD-ROM can be done efficiently. The Movie Object is a prior art disclosed in the following International Publication. For details, refer to the International Publication.

International Publication WO 2004/074976.

Up to now, the Movie Object has been described. The following describes the BD-J Object.

<BD-J Object>

The BD-J Object is a dynamic scenario in the BD-J mode, written in a Java™ programming environment, and is stored in files 00001 to 00003.bcbj.

FIG. 13 shows the internal structure of BD-J Object.bdmv. As shown in FIG. 13, BD-J Object.bdmv includes an Application Management Table (AMT), a PlayList Management Table (PLMT), and a Sound Management Table (SMT). The difference from the Movie object is that a command is not written directly in the BD-J Object. That is to say, in the Movie Object, the control procedure is written directly in the navigation commands. In contrast, the BD-J Object indirectly defines the control procedure by allowing a specification for a Java™ application to be written in the Application Management Table. Such an indirect definition provides an efficient sharing of a common control procedure, allowing a plurality of dynamic scenarios to share a common control procedure.

Also, in the Movie Object, a PL playback is performed in accordance with a navigation command (PlayPl command) written in the Movie Object, instructing to play back a PlayList. In contrast, in the BD-J Object, the Application Management Table, which indicates the PlayList playback procedure, is incorporated in the BD-J Object, enabling the PlayList playback procedure to be written.

Here, the Java™ application in the BD-J Object will be described. The BD-J mode in this example presumes the Java™ platform that is fully implemented with the Java™ 2 Micro Edition (J2ME) Personal Basis Profile (PBP1.0), and the Globally Executable MHP specification (GEM[1.0.2]) for package media targets.

The Java™ application in the BD-J Object is controlled by the Application Manager via the xlet interface. The xlet interface is in any of four statuses: "loaded", "paused", "active", and "destroyed".

The above-mentioned Java™ platform includes a standard Java™ library that is used to display image data such as JFIF (JPEG) and PNG. With this construction, the Java™ application can realize a GUI framework that is different from a GUT framework realized by the IG streams in the HDMV mode. The GUI framework of the Java™ application includes the HAVi framework defined in GEM[1.0.2], and includes the remote control navigation mechanism in GEM[1.0.2].

With such a construction, the Java™ application can realize a screen display that includes displaying buttons, texts, an online display (contents of BBS) or the like based on the HAVi framework, simultaneously with the moving image on the same screen. This enables she user to operate on the screen using the remote control.

The substantial body of the Java™ application is Java™ archive files (00001.jar, 00002.jar) that are stored in the BDJA directory under the BDMV directory shown in FIG. 2. The following describes the Java™ archive files.

<Java™ Archive Files>

The Java™ archive files (00001.jar, 00002.jar shown in FIG. 2) are each formed by combining one or more class files lard one or more data files into one, and constitute the Java™ application operating in the BD-J mode.

Figure 14:
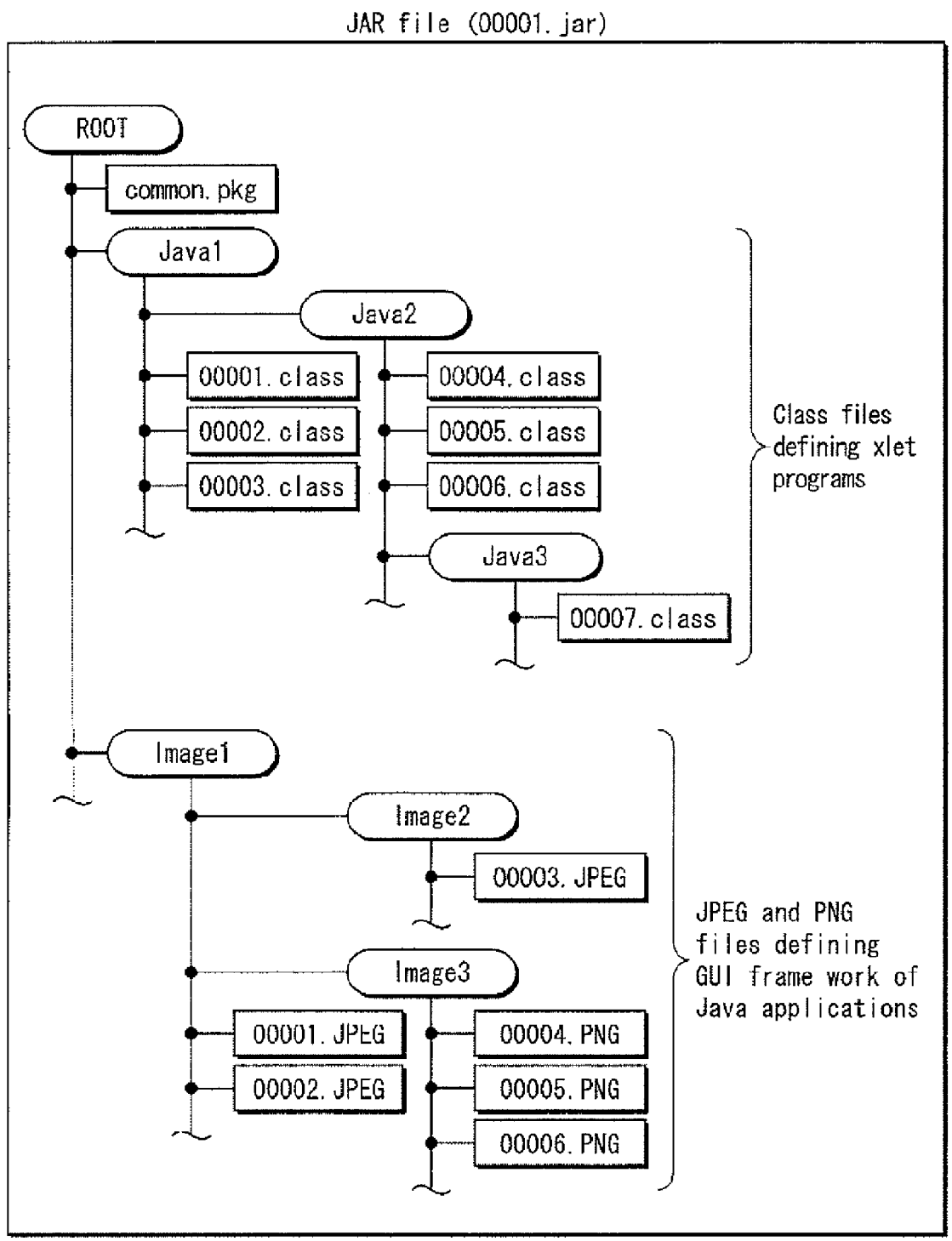
FIG. 14 shows the programs and data stored in the archive files.

FIG. 14 shows the programs and data stored in the archive files. The programs and data shown in FIG. 14 have been configured by the Java™ archiver by arranging a plurality of files into the directory structure indicated by the oval frames. The directory structure indicated by the oval frames is composed of the Root, Java™ 1, Java™ 2, Java™ 3, image 1, image 2, and image 3 directories. The common.pkg is arranged to be under the Root directory, the class files (00001.class to 00007.class) are arranged to be under the Java™ 1, Java™ 2, and Java™ 3 directories, and 00001.JPEG to 00003.JPEG and 00004.PNG to 00006.PNG are arranged to be under the image 1, image 2, and image 3 directories. The Java™ archive files are each formed by the Java™ archiver by combining such files into one. Such class files and data are developed when they are read from the BD-ROM into a cache, and are treated as files arranged in the directories. The five-digit number "zzzzz" attached to each Java™ archive file name indicates an application ID. When such a Java™ archive file has been read to a cache, it is possible to extract programs and data that constitute an arbitrary Java™ application by referring to the number attached to the file name.

It should be noted here that although in the present embodiment, programs and data that constitute the application are stored in Java™ archive files, such programs and data may be stored in LZH files or zip files.

Up to now, dynamic scenario in the BD-J mode has been described.

<sound.bdmv>

The sound.bdmv will be described. The sound.bdmv is a file for storing audio data that is output as a click sound when the GUI framework of a Java™ application is operated (such audio data is referred to as sound data).

Figure 15:
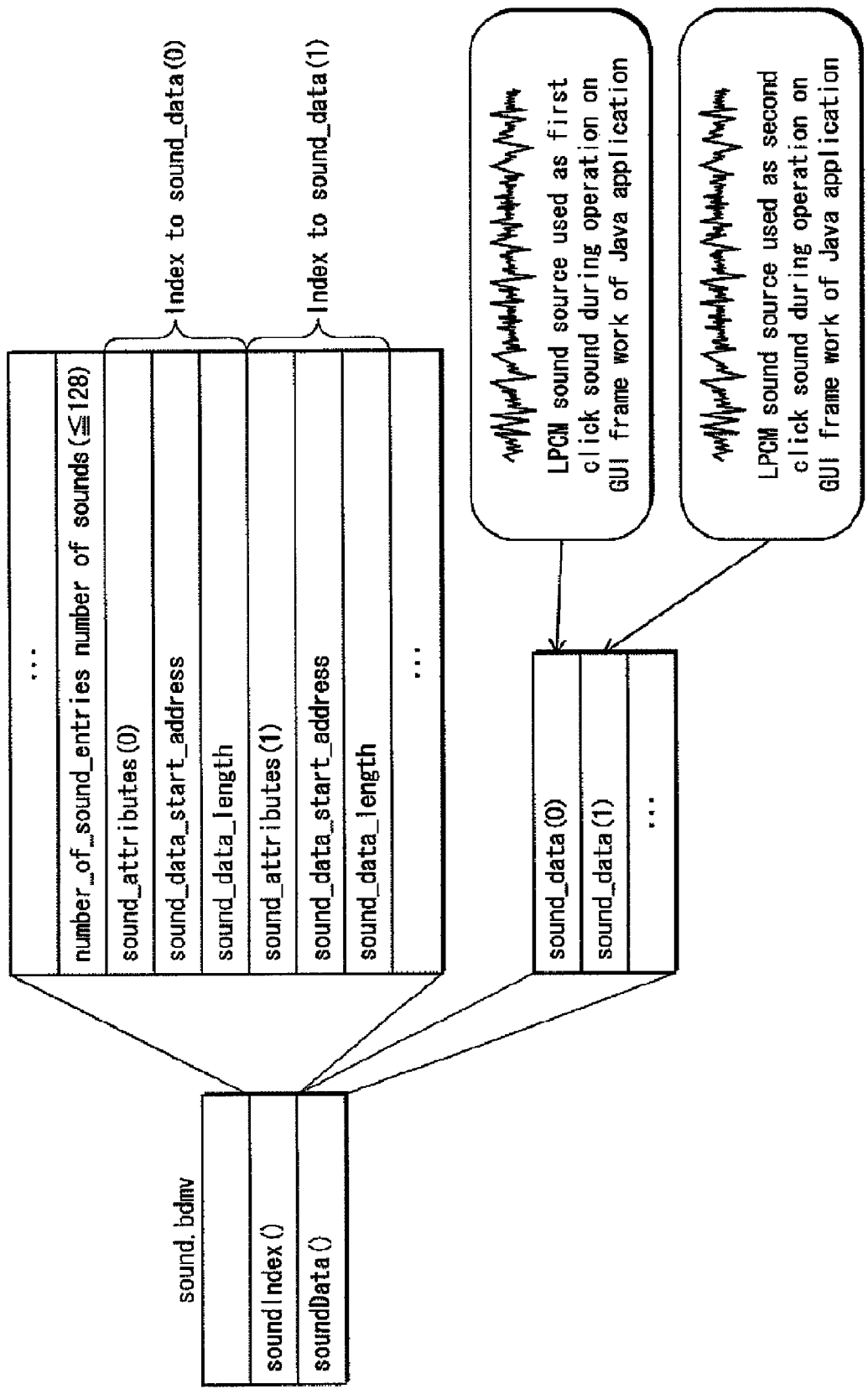
FIG. 15 shows the structure of the file sound.bdmv.

FIG. 15 shows the structure of the file sound.bdmv. The file sound.bdmv includes Sound Data( ) and Sound Index( ). The Sound Data( ) includes a plurality of pieces of sound data (sound_data (0), sound_data(1) . . . ). Among these pieces of sound data, sound_data (0) is a sound source of the $1^{st}$ click sound that is output when the GUI framework of a Java™ application is operated, and sound_data(1) is a sound source of the $2^{nd}$ click sound that is output when the GUI framework of a Java™ application is operated. These sound data are identified by identifiers called sound IDs.

The Sound Index( ) includes: the number of sounds (number_of_sound_entries); an index to sound_data(0); and an index to sound_data(1).

Each index includes: sound-attributes that indicates an attribute of the sound such as monaural or stereo; sound_data_start_address that indicates the address of a corresponding piece of sound data; and sound data length that indicates the sequential length of the corresponding piece of sound data.

As shown in FIGS. 2-6, the sources of the sounds used in the motion picture are multiplexed in the AVClip as the audio stream. This arrangement is made for the purpose of supplying the audio stream, which provides sound/voice in the motion picture, at the same time when the video stream is read out. On the other hand, the file sound.bdmv, in which the click sound for a menu operation by the user is stored, is recorded on the BD-ROM separately from the AVClip. Since the file sound.bdmv is recorded separately from the AVClip, when sound data is tried to be output during a reading out of the AVClip, the optical pickup jumps to read the file sound.bdmv. When this happens, the reading out of the AVClip is interrupted and the playback of the AVClip is interrupted.

To prevent such interruption of the AVClip playback, it is necessary to preload the file sound.bdmv in the buffer when the AVClip is not played back. That is to say, it is necessary to preload sound data of the file sound.bdmv prior to the AVClip playback. This completes the description of the file sound.bdmv.

<Index.bdmv>

The Index.bdmv is a table that indicates the Movie Object or the BD-J Object that constitutes a title.

That is to say, the Index.bdmv defines she Movie Object or the BD-J Object that is a component of a Title.

The below identified international publication discloses the Index.bdmv. Please refer to the international publication for detail of the Index.bdmv.

International Publication: WO 2004/025651 A1

The following describes in detail each of the Application Management Table, PlayListManagement Table, and Sound Management Table shown in FIG. 13.

<Application Management Table>

The application management table (AMT) will be described. The application management table (AMT) is a table implemented with the "application signaling" in the above-mentioned GEM 1.0.2 or package media targets. The "application signaling" is a control for running and executing an application using the "service" as the life cycle of the application. The application management table of the present embodiment achieves the control for running and executing an application by specifying the "Title" in the BD-ROM, instead of the "service", as the life cycle of the application.

FIG. 16A shows the internal structure of the application management table. As shown in FIG. 16A, the application management table is composed of "life_cycle", "apli_id_ref", "run_attribute", and "run_priority".

FIG. 16B shows the meaning of the information elements that constitute the application management table.

The "life_cycle" indicates a "life cycle" of the application.

The "apli_id_ref" indicates, by a reference value written therein in correspondence with the "application identifier", the application that has the above-mentioned life cycle. The application identifier is represented by a five-digit value "zzzzz" that is provided in the Java™ archive file as the file name. The five-digit value is written in the "apli_id_ref".

The "run_attribute" indicates the run attribute of the application during the life cycle. The run attribute is classified into: AutoRun, Present, and Suspend.

The "run_priority" indicates the "run priority" of the application during the life cycle. The BD-J Object controls the operation of the application using these pieces of information.

<Life Cycle>

The life cycle, which is defined in the application management sable, will be described.

The life cycle means a cycle during which an application lives on the work memory of the virtual machine, and is represented with the time axis of the entire contents of the BD-ROM. Here, the term "live" refers to the state where the xlet programs constituting the application have been loaded in the work memory such that the application can be executed by the virtual machine.

When an application is run on a Java™ Virtual Machine, it is important to clearly define, on the time axis, the start and end points of a service by the application. These start and end points of a service are defined in the "life cycle" of the application management table.

Figure 17:
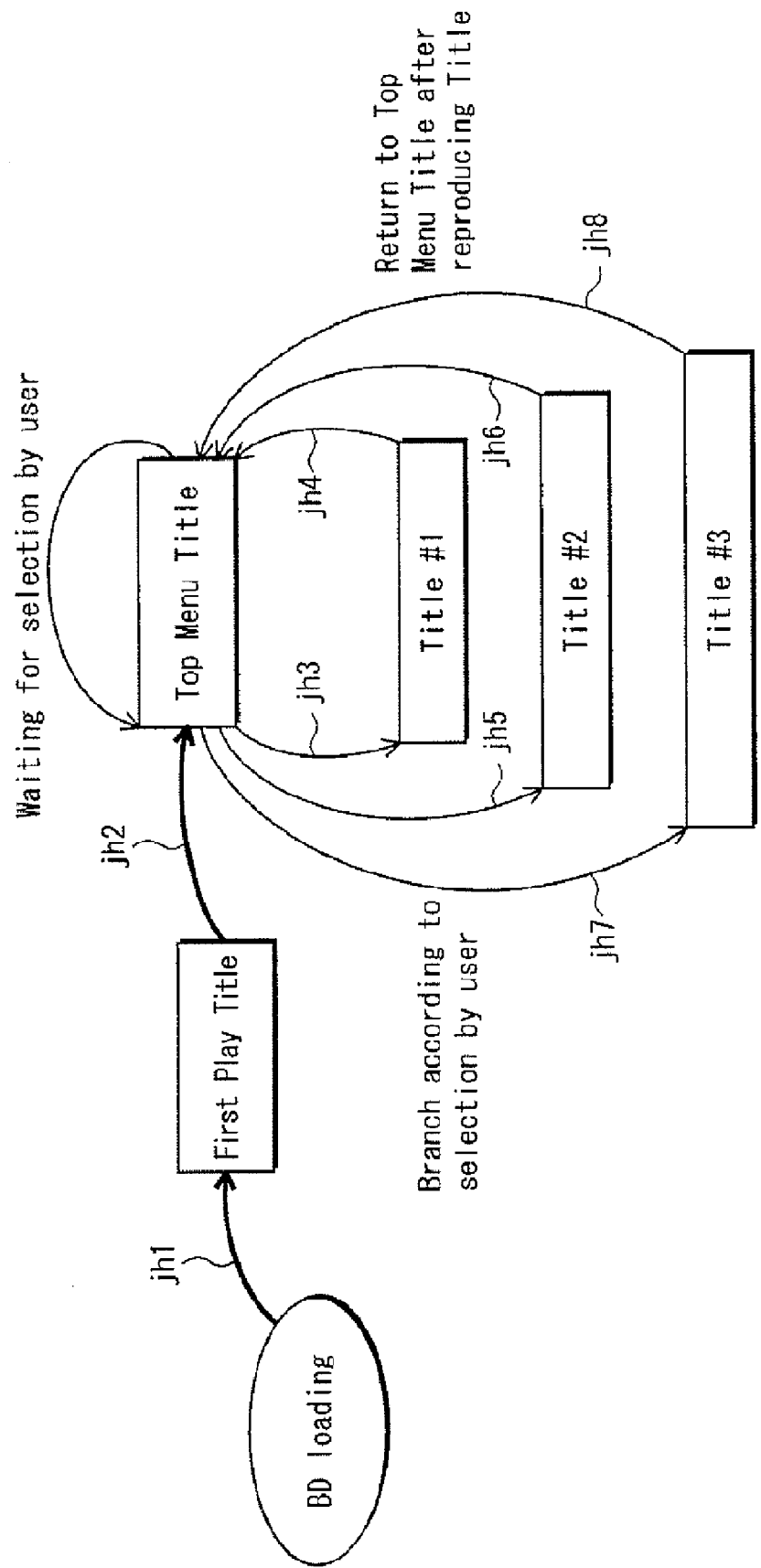
FIG. 17 shows the status change in a disc content.

On the other hand, the disc content provided in a read-only disc such as the DVD-Video has a structure that centers on the top menu. The status change in such a disc content is unique in that the playback branches from the top menu Title to each Title and then returns to the top menu Title. FIG. 17 shows the status change in a disc content. The boxes in FIG. 17 represent Titles. Here, each Title is a playback unit that corresponds to a "status" in the status change unique to the disc content, and the Title is used as the life cycle of a Java™ application.

Titles are classified into: "FirstPlayTitle" that is played back first after the BD-ROM is loaded, "Top_menuTitle" that constitutes the top menu, and "Titles" that are general Titles. The arrows jh1, jh2, jh3, jh4, jh5, jh6, jh7, and jh8 in FIG. 17 symbolically indicate branches between Titles. According to the status change shown in FIG. 17, "FirstPlayTitle" is played back upon loading of a BD-ROM, a branch to "Top_menuTitle" occurs, and then a selection on the top menu is waited for.

In the status change unique to the disc contents, the following operations are repeated until the BD-ROM is ejected: a Title selected by the user on the top menu is played back; and after the selected Title is played back, the screen returns to the top menu title.

The following shows how Title life cycle is defined with regards to such disc contents that change the status as shown in FIG. 17. Suppose that after the BD-ROM is loaded, branches are made in the ascending order of the numbers indicated by the arrows jh1, jh2, jh3, jh4, . . . in FIG. 17, and the BD-ROM is ejected. The continuous time band starting with the loading and ending with the ejection of the BD-ROM can be regarded as one time axis. The time axis is defined as the time axis of the entire disc. FIG. 18A shows the time axis of the entire disc. FIG. 18B shows how the time axis is structured. As shown in FIG. 18B, the time axis of the entire disc is composed of, a period during which the FirstPlayTitle is played back; a period during which the FirstPlayTitle is played back; a period during which the TopMenuTitle is played back; a period during which Title #1 is played back; . . . A Title is composed of one or more Movie Objects or one BD-J Object. Therefore, the playback period of each Title can be defined as a period during which any of the Movie Objects or BD-J Object is activated.

That is to say, the FirstPlayTitle, TopMenuTitle, and other Titles are each composed of dynamic scenarios. Therefore, the playback period of each Title can be defined as a period during which any of the BD-J Objects, which constitute Title, is activated as a current BC-J Object, and is decoded and executed within the playback apparatus. FIG. 19A shows, in the time axis of the entire BD-ROM, Title playback periods that are identified by a BD-J Object that is identified by the identifier "bobj_id". Here, if a BD-J Object identified by the identifier "bobj_id" constitutes a Title, a period in the BD-ROM time axis during which the BD-J Object identified by the identifier "bobj_id" is validated can be regarded as the playback period of Title.

The period during which a BD-J Object is activated lasts until a Title branch (JumpTitle) is performed. That is to say, the dynamic scenario, which is the target of the execution, is treated as a current BD-J Object until a Title branch (Jump- Title) is performed. As a result, a period that lasts until a JumpTitle occurs in the BD-J Object is treated as a Title playback period.

The following describes the relationships between Title playback period and the PL time axis. As described above, in the Movie Object or BD-J Object, the PlayList playback procedure can be written as a processing procedure. If a PlayList playback procedure has been written, all or part of the above-described PL time axis belongs to Title playback period. Suppose that a PlayList management table is written in the BD-J Object in the example shown in FIG. 19A. Then, as shown in FIG. 19B, the PL time axis belongs so Title playback period that corresponds to the BD-J Object. Since a plurality of chapters (Chapter#1,#2,#3) can be defined further to the PL time axis, domains "entire BD-ROM-Title-PlayList-Chapter" exist in the BD-ROM time axis. It is possible to write the life cycle of the application by using these domains. It should be noted here that since the PlayList playback started simultaneously with the execution of the application, a Title branch may happen in the middle of the PlayList playback. In such a case, only part of the PlayList time axis, not the entire PlayList time axis, belongs to one Title playback period. That is to say, whether only part of the PlayList time axis or the entire PlayList time axis belongs to one Title playback period depends on the time at which a Title branch occurs.

Figure 20:
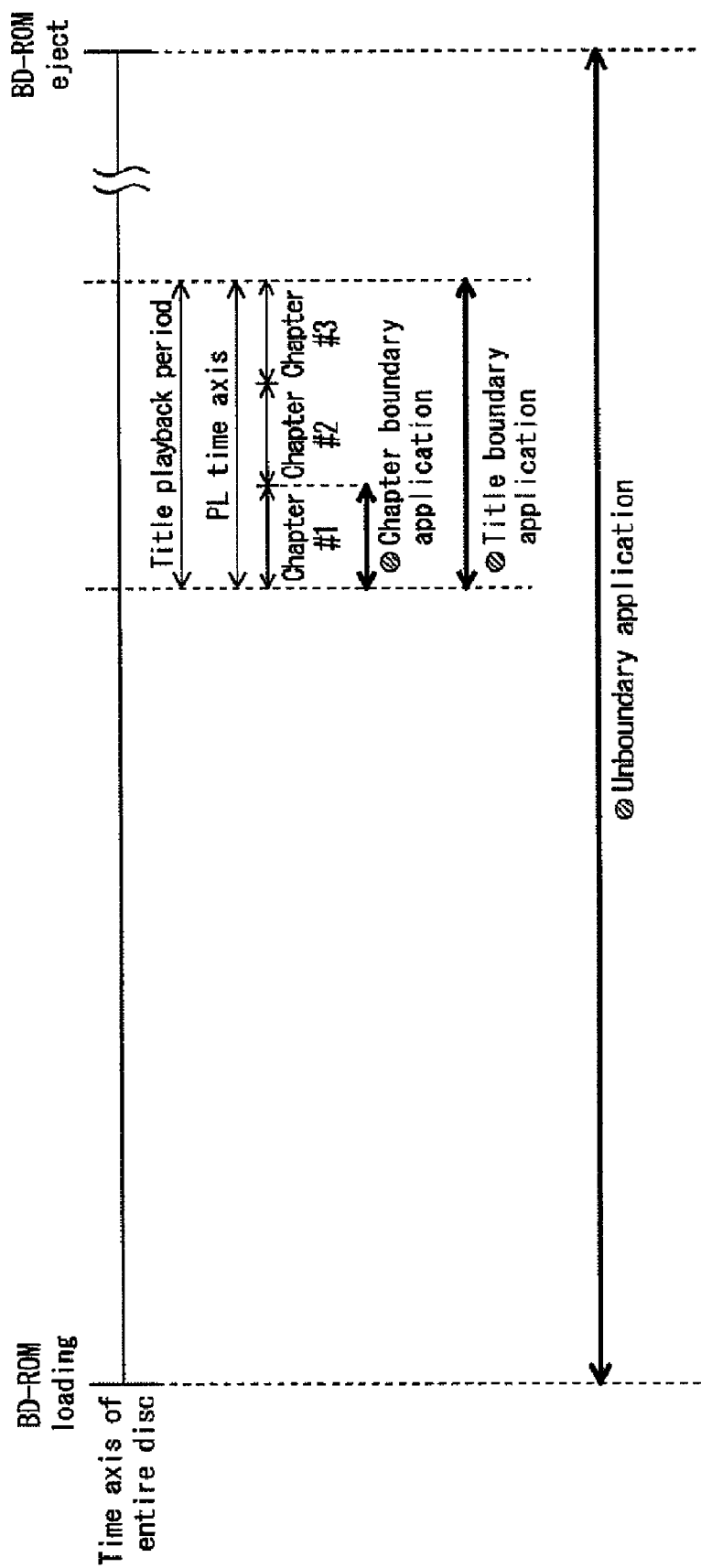
FIG. 20 shows a typical life cycle defined in the time axis shown in FIG. 19B.

FIG. 20 shows a typical life cycle defined in the time axis shown in FIG. 19B. As shown in FIG. 20, there are three typical applications: Title boundary application whose life cycle is a Title; the Chapter boundary application whose life cycle is a Chapter within a Title; and the unboundary application whose life cycle is the time axis of the entire BD-ROM.

Of these, the life cycle of a Title boundary application can be defined using the identifier of Title. Also, the life cycle of a Chapter boundary application can be defined using a combination of: the identifier of Title to which the Chapter belongs; and the identifier of the Chapter.

Even if the platform is operating, it is possible to regain the resource from the application after the life cycle defined as a Title or a Chapter ends. Such a construction assures the chance to regain the resource, and thereby stabilizes the operation of the platform.

Figure 21:
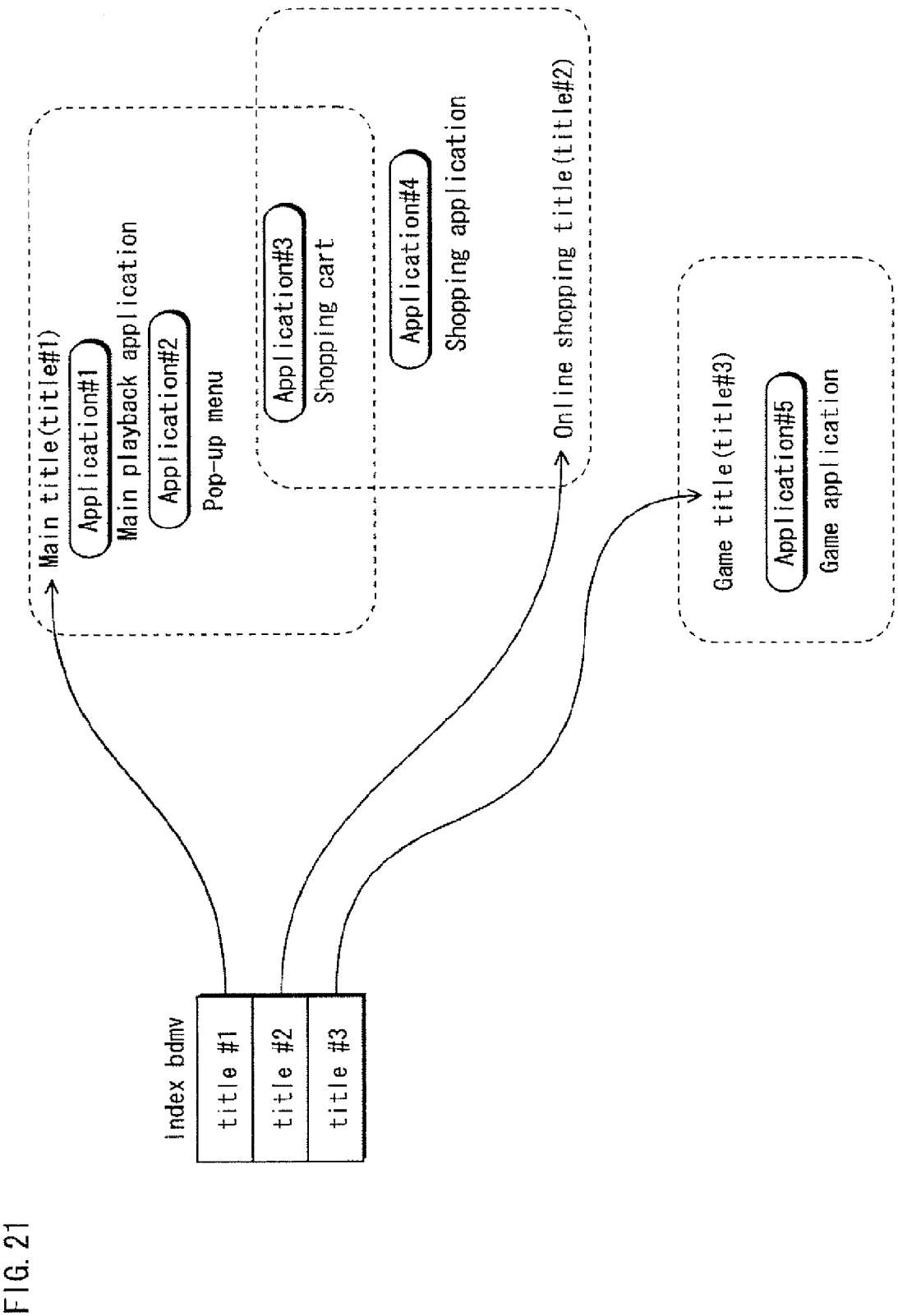
FIG. 21 shows a disc content that includes three Titles: a main Title; an online shopping Title; and a game Title.

The following describes how to write the life cycle in the application management table, using a specific example which includes a disc content that will be achieved in near future, as the material. The disc content used as the material includes three different types of Titles: a main Title (Title #1) that constitutes a main image work; an online shopping Title (Title #2) that constitutes an online shopping; and a game Title (Title #3) that constitutes a game application. FIG. 21 shows a disc content that includes three Titles: a main Title; an online-shopping Title; and a game Title. The left-hand side of FIG. 21 shows Index.bdmv, and the right-hand side of FIG. 21 shows the three Titles.

The dotted-line frames on the right-hand side of FIG. 21 show belonging relationships that indicate Titles to which each application belongs. Of the three Titles, Title #1 is composed of application #1, application #2, and application #3. Also, Title #2 is composed of application #3 and application #4, and Title #3 is composed of application #5S. In the example shown in FIG. 21, the application #3 is run by both Title #1 and Title #2.

Figure 22:
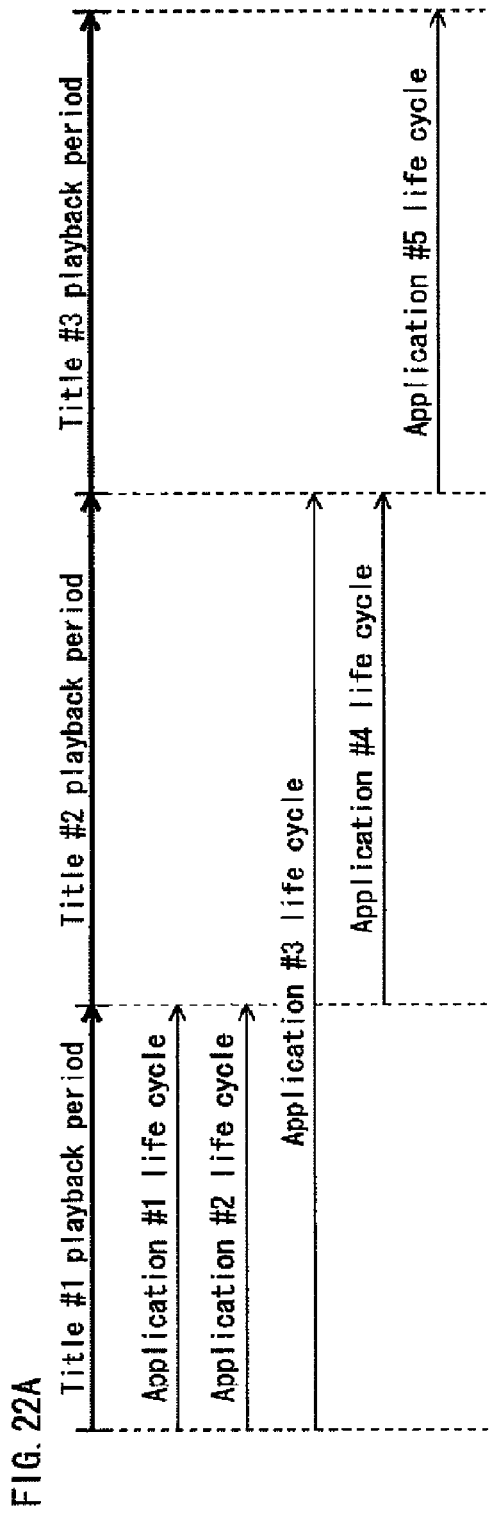
FIGS. 22A and 22B show examples of the application management tables and the life cycle.

FIG. 22A shows the life cycle of each application, which is drawn based on the belonging relationships shown by the dotted line frames of FIG. 21. In FIG. 22A, the horizontal axis indicates a Title playback period, and life cycles of applications are arranged in the vertical axis direction. Here, the application #1 and the application #2 belong only no Title #1, and therefore the life cycles of these applications are confined to Title #1. The application #4 belongs only to Title #2, and therefore the life cycle of the application #4 is confined to Title #2. The application #5 belongs only to Title #3, and therefore the life cycle of the application 45 is confined to Title #3. The application #3 belongs to Titles #1 and #2, and therefore the life cycle of the application #3 extends over Titles #1 and #2. FIG. 22B shows the application management tables for Titles #1, #2, and #3 that were written based on the life cycles shown in FIG. 22A. After the application management tables are written in this way, the application #1, application #2, and application #3 are loaded onto the work memory when the playback of Title #1 is started. Then, when the playback of Title #2 is started, the applications #1 and #2 are deleted from the work memory, causing only the application #3 to remain. Similarly, it is possible to perform a control so that the application #4 is loaded onto the work memory when the playback of Title #2 is started, and that the applications #3 and #4 are deleted from the work memory when the playback of Title #3 is started.

Further, it is possible to perform a control so that the application #5 is loaded onto the work memory while Title #3 is played back, and that the application #5 is deleted from the work memory when the playback of Title #3 ends.

With this construction, the number of times the applications are loaded onto the work memory is minimized. This is because if a branch between Titles occurs, applications that live in both the branch source and branch destination may be stored in the work memory, and applications that do not live in the branch source and live in only the branch destination may be loaded onto the work memory. Such a construction that decreases the number of times data is loaded enables an unboundary application to be achieved, where the unboundary application is such an application that does not make one conscious about a boundary between Titles.

The following describes the run attributes of the application. The run attributes include: "AutoRun" indicating that the application with this attribute is automatically started to run; "Present" indicating that the application with this attribute is not the target of the automatic run but may be stored in the work memory of the virtual machine; and "Suspend" indicating that the application with this attribute is stored in the work memory of the virtual machine but is not assigned the CPU power.

When a corresponding Title branches, an application with the "AutoRun" attribute is loaded onto the work memory and is executed. When a Title branches to another Title, the management body (application manager) that manages the applications loads an application, which lives in the branch destination Title and whose run attribute has been set to AutoRun, onto the work memory of the virtual machine, and executes the application. This means that the application is automatically started to run as Title branches.

The run attribute "Present" is a continuous attribute, and indicates that the status of the application in the branch source Title is maintained. This is also an attribute that indicates that a corresponding application can be executed. An application whose run attribute is set to "Present" can be called from another application. When an application is called from another application that is being run, the management body (application manager) judges whether or not the application ID of the application is written in the application management table and whether or not the run attribute of the application is set to "Present". If it is set to "Present", the management body loads the application onto the work memory. If the application ID of the call destination application is not written in the application management table, the management body does not bond the application onto the work memory. Only applications whose run attribute is set to "Present" can be called from another application. "Present" is a default run attribute that is assigned when the run attribute is not clearly specified. As a result, when the run attribute of an application is "--" indicating no specification, it means that the run attribute of the application is "Present".

"Suspend" indicates that the application with this attribute is assigned a resource but is not assigned the CPU power. The attribute "Suspend" is effective, for example, in achieving the process of passing a side path while a game Title is executed.

FIG. 23 shows combinations of the three run attributes (Present, AutoRun, and Suspend) and three possible statuses of the previous Title (Not Run, Running, and Suspend). If the previous status is "Not Run" and the run attribute is "AutoRun", the application is started in the branch destination Title.

If the previous status is "Not Run" and the run attribute is "Present" or "Suspend", no operation is performed, and the status is maintained.

If the previous status is "Running" and the run attribute is "Present" or "AutoRun", no operation is performed, and the status is maintained.

If the run attribute is set to "Suspend", the status of the application is suspended. If the previous status is "Suspend" and the run attribute of the branch destination Title is "Suspend", the "Suspend" is maintained. If the previous status is "Suspend" and the run attribute of the branch destination Title is "Present" or "AutoRun", the application is resumed in the branch destination Title. Defining life cycles and run attributes in the application management table makes it possible to perform a synchronization control to run a Java™ application during a Title playback period. This enables achievement and provision of various applications that cause images to be played back and programs to be executed.

It should be noted here that if the previous status is "Suspend" and the run attribute of the branch destination Title is "Present", the previous status "Suspend" may be maintained.

Lastly, "run priority" for each application will be described.

The run priority takes values 3 to 255. When the memory resource runs short or when the CPU load is high, the application manager can use the run priority to decide which application to terminate forcibly, or which application to regain resource from. The application manager terminates an application with low level run priority, and keeps the operation of an application with high-level run priority.

The run priority can also be used in arbitration between applications that conflict with each other requesting a PlayList that is being played back. Suppose here that an application is fast forwarding a PlayList and another application issues a pause request for the same PlayList. Then the run priority levels assigned to these applications are compared with each other. If the fast-forwarding application has a higher run priority level, the fast-forwarding is continued. If the pause-requesting application has a higher ran priority level, the PlayList being fast-forwarded is paused.

With the above-described life cycle, run attribute, and run priority, it is possible during the authoring to limit the number of applications that can operate on the virtual machine to a predetermined number or less. This provides stable operation of applications.

<PlayList Management Table>

Up to now, the application management table has been described. From now one, the PlayList management table (PLMT) will be described. The PlayList management table shows playback control that should be performed simultaneously with execution of each application during the life cycle of the application. The operation of an application is unstable. There may be a start-up failure or an abnormal termination. In the present embodiment, a PlayList management table is provided for each application life cycle, as a Fail Safe mechanism that functions in case the start-up failure or abnormal termination occurs. The PlayList management table is information that defines a playback control that should be performed when an application life cycle starts. The playback control described here is a playback of an AVClip based on the PlayList information. That is to say, by performing the playback control based on the PlayList information, the execution of an application and the playback of a PlayList are performed simultaneously. It was said earlier that a PlayList management table is provided for each application life cycle. It should be noted here however that the PlayList management table can only be provided in correspondence with Title boundary application. This is because since the life cycle of Title unboundary application extends over all Titles, the control for simultaneous performance of the execution of an application and the playback of a PlayList cannot be applied to Title unboundary application.

There is no need to define the playback of a PlayList in regards with the Chapter boundary application. This is because the life cycle of the Chapter boundary application is defined on the premise that the execution of the application is started from a Chapter within a PlayList. As understood from the above description, the PlayList management table is defined in correspondence with a life cycle that is composed of one or more Titles.

FIG. 24A shows the internal structure of the PlayList management table. As shown in FIG. 24A, the PlayList management table is composed of "PL_id_ref" and "Playback_Attribute".

FIG. 24B shows the meaning of the information elements that constitute the PlayList management table.

The "PL_id_ref" indicates, by a reference value written therein in correspondence with a PlayList identifier, a PlayList that can be played back during an application life cycle. The PlayList identifier is represented by a five-digit value "YYYYY" that is provided in the file YYYYY.MPLS as the file name. The "PL_id_ref" with the YYYYY written therein indicates a PlayList that can be played back in a corresponding Title.

The "Playback_Attribute" is an attribute that is similar to the run attribute in the application management table, and is a playback attribute that defines how to play back the PlayList written in the "PL_id_ref" when Title starts. The playback attributes for PlayList are classified into "AutoPlay", "Present" or the like.

"AutoPlay" is an attribute indicating that When a corresponding Title branches, a PlayList with the "AutoPlay" attribute is played back. When a Title branches to another Title, the management body (application manager) that manages the applications starts playing back a PlayList which can be played back in the branch destination Title and whose playback attribute has been set to AutoPlay. This means that the PlayList whose playback attribute has been set to AutoPlay is automatically activated as Title branches.

"Present" is, as is the case with the run attribute "Present", a continuous attribute, and indicates that the status of the PlayList in the branch source Title is maintained. The "Present" is also an attribute that indicates that a corresponding PlayList can be played back. Suppose, for example, that there are two Titles that are to be played back continuously, that in the PlayList management table of the former Title, the playback attribute of a certain PlayList is set to AutoPlay, and that in the PlayList management table of the current Title, the playback attribute of the certain PlayList is set to Present. Here, it is supposed that the PlayList can be played back for two hours, and that a branch occurs after it is played back for one hour. In this case where the playback attribute of the PlayList of the current Title is set to Present, the current Title plays back the PlayList starting with a position immediately after an already-played-back one hour portion. As understood from this, even if a branch occurs between Titles, by setting the playback attribute of a PlayList to Present in the branch destination Title, it is possible to resume the playback of the PlayList in the branch destination Title. This enables a series of branch Titles to continuously play back a common PlayList, thus making it easy to achieve "a common PlayList being played back in a series of Titles". When there are a plurality of branch destination Titles, it is possible, by setting the playback attribute of the PlayList to Present in the branch destination Titles, to continue the playback of a common PlayList through the branch destination Titles.

It should be noted here that since there is no need to assure the seamless playback at a boundary between Titles, it is permitted to interrupt the playback of the PlayList at around a branch in the above-stated case where a common PlayList is played back through a plurality of Titles.

Also, a PlayList whose playback attribute is set to "Present" can be played back upon request from another application. When a playback request is issued from another application that is being run, the management body (application manager) judges whether or not PL_id_ref of the target PlayList is written in the PlayList management table and whether or not the playback attribute of the PlayList is set to "AutoPlay" or "Present". If it is set to "AutoPlay" or "Present", the management body plays back the PlayList. If PL_id_ref of the PlayList is not written in the PlayList management table, the management body does not play back the PlayList. Only PlayLists whose playback attribute is set to "AutoPlay" or "Present" can be played back upon request from another application. "Present" is a default playback attribute that is assigned when the playback attribute is not clearly specified. As a result, when the playback attribute of an application is "--" indicating no specification, it means that the playback attribute of the PlayList is "Present".

FIG. 25 shows specific examples of Titles defined by the PlayList management table and the application management table. In FIG. 25, the 1$^{st}$ row shows playback images of a Title, the 2$^{nd}$ row shows the time axis of the Title, the 3$^{rd}$ row shows the progress of playback of a PlayList whose playback is defined by the PLMT, and the 4$^{th}$ row shows the execution of an application. The 4$^{th}$ row indicates that the application #1 is started at the start of the Title, and then enters the operation status at time t1. On the other hand, PlayList #1 starts to be played back at the start of the Title. As a result, as shown on the left-hand side of the 1$^{st}$ row, a playback image gj1 of PlayList #1 is displayed as a full-screen image during the start-up delay of the application, namely during a period between immediately after the start of the Title and immediately before the application enters the operation status. In this way, by setting the playback attribute to "AutoPlay" in the PlayList management table, even if it takes 5 to 10 seconds for a started Java™ application to enter the operation status, "something" is displayed on the screen during the start-up. This status, in which "something is displayed on the screen", alleviates the start-up delay that occurs when a Title is started to be executed.

On the other hand, when the application #1 enters the operation status at time t1, a composite image gj2 is displayed, where the composite image gj2 is composed of: the playback image of the PlayList as a child screen; and the execution image of the application as a parent screen. The execution image of the application in this example is a GUI framework for a game in which a Start button, a Continue button, and a Power indicator are arranged. The display of such a screen is achieved as the Java™ application executes the drawing process of the GUI framework.

FIG. 26 shows six combinations of three possible statuses of the branch destination Title, namely the current Title ((i) Not having PlayList management table, (ii) Having PlayList management table and AutoPlay, and (iii) Having PlayList management table and Present) and two possible statuses of the PlayList in the previous Title (Not being played back, and Being played back).

Of these six combinations shown in FIG. 26, in the combination of "Previous status=Not being played back" and "Branch destination Title has PlayList management table, and Playback attribute is AutoPlay", playback of the PlayList is automatically started in the branch destination Title.

Also, in the combination of "Previous status=Being played back" and "Branch destination Title does not have PlayList management table", playback of the PlayList is automatically stopped in the branch destination Title.

In the combinations other than these, the status in the branch source Title is maintained. Based on the PlayList management table, a playback of a PlayList is started only when the PlayList has not been played back in the branch source Title and the playback attribute for the PlayList is set to AutoPlay in the branch destination Title. As a result, there is no need to start playing back a PlayList each time a branch between Titles occurs. Accordingly, the number of starting playback of a PlayList is minimized even if a lot of branches occur between Titles.

Figure 27A:
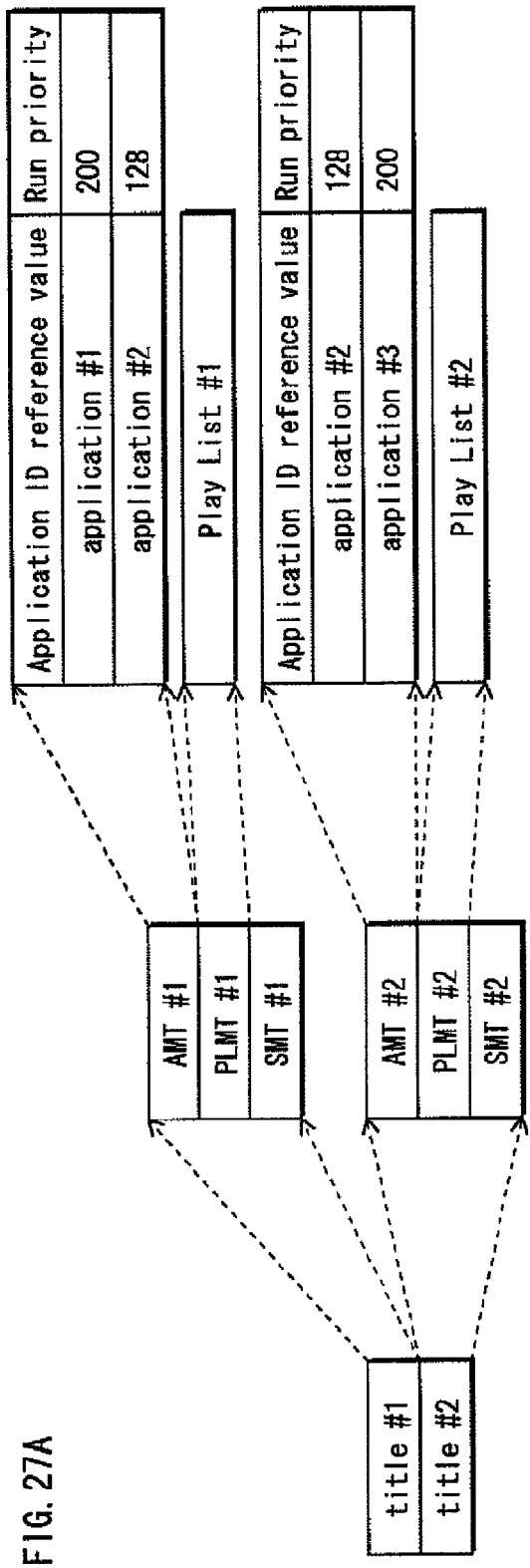
FIG. 27A shows a specific example of the description of the PlayList and application management tables.
Figure 27B:
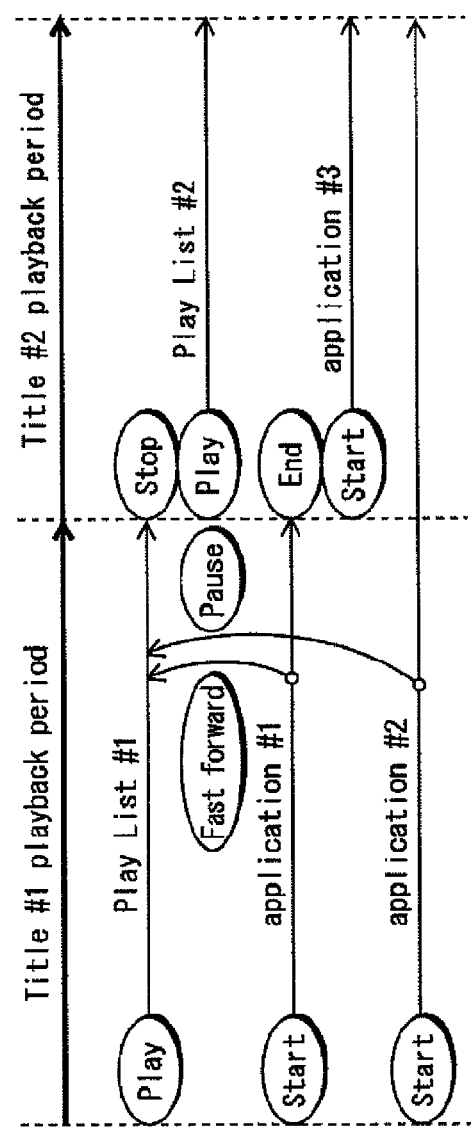
FIG. 27B shows how the PlayLists are played back and the applications are executed based on the PlayList and application management tables that are written as shown in FIG. 27A.

The following describes how to write the PlayList and application management tables, with reference to a specific example shown in FIG. 27A. In this specific example, two continuous Titles (Title #1, Title #2) are used. In the table for Title #1, application #1 and application #2 are written as AutoRun applications. In the table for Title #2, application #2 and application #3 are written as AutoRun applications. It is supposed that in the PlayList management table for Title #1, PlayList #1 is written as an AutoPlay PlayList, and that in the PlayList management table for Title #2, PlayList #2 is written as an AutoPlay PlayList. FIG. 273 shows how the PlayLists are played back and the applications are executed based on the PlayList and application management tables that are written as shown in FIG. 27A.

According to the PlayList and application management tables that are set as described above, at the start of Title #1, the applications #1 and #2 are automatically started, and a playback of PlayList #1 is automatically started.

According to the PlayList and application management tables that are set as described above, in terms of the application #1, a there is description in the table for Title #1, but there is no description in the table for Title #2. Therefore, the execution of the application #1 is stopped. Similarly, in terms of PlayList #1, there is description in the table for Title #1, but there is no description in the table for Title #2. Therefore, the playback of PlayList #1 is stopped.

In terms of PlayList #2 and the application #3, there is no description in the tables for Title #1, but there is description in the tables for Title #2. Therefore, a playback of PlayList #2 and an execution of the application #3 are automatically started. A branch can be used as a chance to change a PlayList to be played back to another PlayList. In this way, use of the PlayList and application management tables makes it possible to define, in advance in the authoring stage, a process of changing PlayLists to be played back, at a branch.

Also in the example shown in FIG. 27A, the application #1, application #2, and application #3 are assigned with values 200, 128, and 200 as the run priority levels, respectively. Such assignment of run priority levels causes an arbitration between applications to be performed when the applications conflict with each other issuing requests to control PlayList #1 or PlayList #2. Suppose here that the application #1 is fast forwarding PlayList #1 and the application #2 issues a pause request for PlayList #1. Then the run priority levels assigned to these applications in the application management table are compared with each other for the arbitration. As a result of this, the control by the application #1 is continued, rejecting the request by the application #2. Such a process can be defined at the authoring stage. Use of the run priority together with the PlayList management table makes it possible for the playback apparatus to perform even an arbitration when a conflict occurs for a PlayList.

The following describes a specific example of the description of the PlayList management table. FIG. 28A shows an example of the description of the PlayList management table. The tables are written for each of the two continuous Titles (Title #1, Title #2) as follows. In the PlayList management table for Title #1, PlayList #1 is written as an AutoRun PlayList, and PlayList #2 is written as a playable PlayList. In the application management sable for Title #1, application #1 is written as an AutoRun application, and application #2 is written as an executable application. In the PlayList management table for Title #2, PlayList #2 and PlayList #3 are written as playable PlayLists. In the application management table for Title #2, application #3 is written as an AutoPlay application. FIG. 28B shows how the PlayLists are played back and the applications are executed based on the PlayList and application management tables that are written as shown in FIG. 28A. According to the PlayList and application management tables that are set as described above, at the start of Title #1, the application #1, which is written as an AutoRun application, is automatically started. Also, since the application #2 is written as an executable application in the application management table for Title #1, the application #2 is started by a call yd1 from the application #1.

In the application management table for Title #2, there is no description of the applications #1 and #2, but the application #3 is written as an AutoRun application. Therefore, at the boundary between Title #1 and Title #2, the execution of the applications #1 and #2 is stopped, and the application #3 is automatically started. In the PlayList management table for Title #1, PlayLists #1 and #2 are written as playable PlayLists. Of these playable PlayLists, PlayList #1 is assigned the AutoPlay attribute. As a result, PlayList #1 is automatically played back at the start of Title #1.

In the PlayList management table for Title #1, PlayList #2 is written as a playable PlayList, as well as PlayList #1. It is therefore possible for the application #1 to stop the playback of PlayList #1 and start a playback of PlayList #2 by requesting the playback of PlayList #2, thus achieving the PlayList change. In the PlayList management table for Title #2, PlayList #2 and PlayList #3 are written as playable PlayLists, and there is no PlayList to which the AutoPlay attribute has been attached. As a result, the playback of PlayList #1, which was automatically started at the start of Title #1, may continue during Title #1, but automatically stops at the start of Title #2.

However, the playback of PlayList #2, if it continues through Title #1, continues also into Title #1. In the PlayList management table for Title #2, PlayList #2 and PlayList #3 are written as playable PlayLists. As a result, it is possible for the application #3, which is run in Title #2, to stop the playback of PlayList #2 and start a playback of PlayList #3 by requesting the playback of PlayList #3, thus achieving the PlayList charge.

With the above-stated arrangement of setting the playback attribute to "AutoPlay" in the PlayList management table, even if it takes 5 to 10 seconds to start a Java™ application, something is displayed on the screen during the start-up. That is to say, even if it takes time to start an application, something is displayed on the screen during the start-up. This alleviates the start-up delay which is caused by the time-consuming process of application start-up.

Defining the application and PlayList management tables makes it possible to perform a synchronization control to run a Java™ application during a Title playback period. This enables achievement and provision of various applications that cause images to be played back and programs to be executed.

<Sound Management Table>

The following describes the Sound Management Table (SMT).

FIG. 29 shows the internal structure of the sound management table. As shown in FIG. 29, the sound management table includes the Mixing_On flag. The Mixing_On flag is set to 1 or 0 to indicate whether the sound mixing is validated or invalidated. Here, "validated" means that the payback sound/voice of an audio stream is output after it is subjected to the mixing process, and "invalidated" means that the playback sound/voice of an audio stream is output as it is as "through output".

When the Mixing_On flag is set to 1 (ON), it indicates that the click sound of the file sound.bdmv is mixed with the playback sound/voice of the PlayList, which is played back by the PLMT that belongs to the same BD-Object.

When the Mixing_On flag is set to 0 (OFF), it indicates that the click sound of the file sound.bdmv is not mixed with the playback sound/voice of the PlayList, which is played back by the PLMT that belongs to the same BD-Object.

Whether or not to mix the click sound of the file sound.bdmv can be defined in units of life cycles of Java™ applications, namely in units of Titles. And the Mixing_On flag is set depending on the settings in the STN_Table of the PlayList.

Figure 30A:
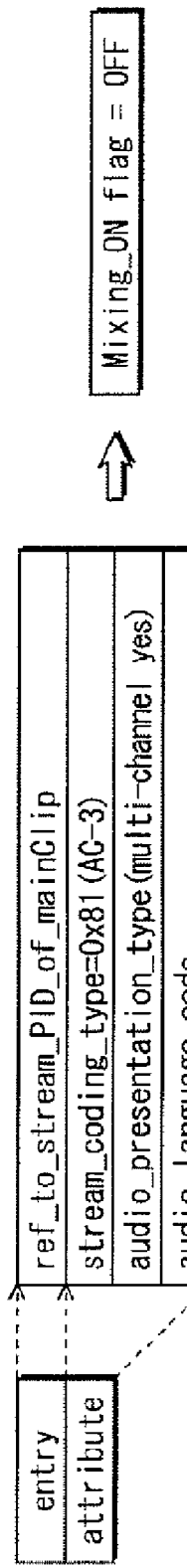
FIGS. 30A and 30B show relationships between the entry-attribute for audio streams in the STN_Table and the setting of the Mixing_On flag.
Figure 30B:
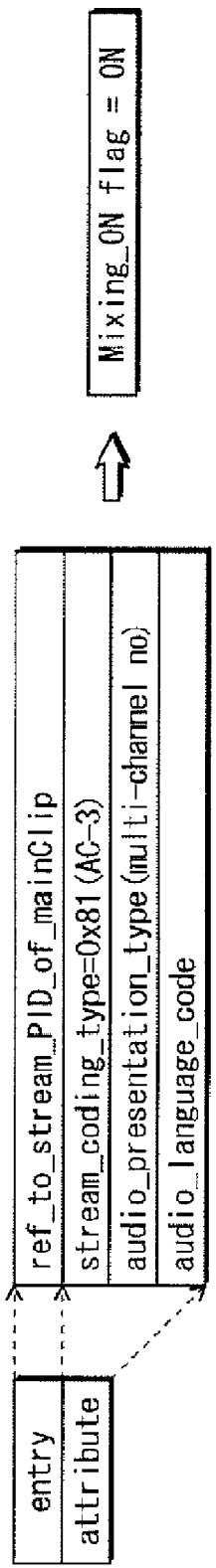

FIGS. 30A and 30B show relationships between the entry-attribute for audio streams in the STN_Table and the setting of the Mixing_On flag. As shown in FIG. 30A, if the audio_presentation_type of entry-attribute indicates "multi-channel yes", the Mixing_On flag is set to 0 (OFF). As shown in FIG. 30B, if the audio_presentation type of entry-attribute indicates "multi-channel no", the Mixing_On flag is set to 1 (ON). With these settings, it is possible to invalidate the mixing with the playback sound/voice of the playback apparatus when the application is executed simultaneously with a PlayList (PlayItem) that performs a "multi-channel" playback; and it is possible to validate the mixing with the playback sound/voice of the playback apparatus when the application is executed simultaneously with a PlayList (PlayItem) chat performs a "non-multi-channel" playback.

Figure 31:
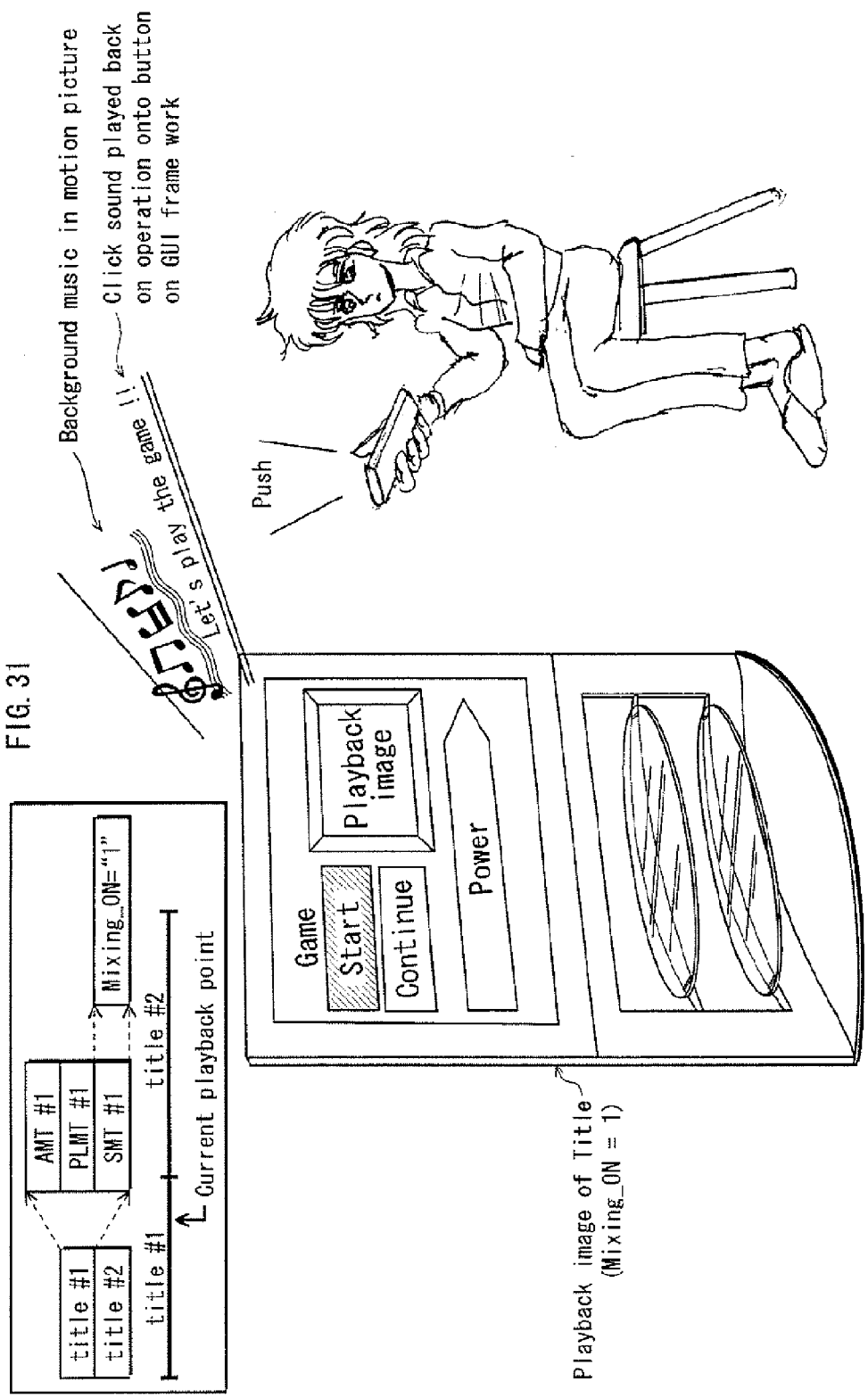

The following will describe one example of playback that is performed according to the settings of the sound management table shown in FIG. 27A. It is supposed here that of the Titles #1 and #2 shown in FIG. 97A, the Mixing_On flag for Title #1 indicates that the mixing with the playback sound/voice is validated, and the Mixing_On flag for Title #2 indicates that the mixing with the playback sound/voice is invalidated It is further supposed that the GUI framework and the PlayList playback image shown in FIG. 25 are output when Title #1 is played back. Here, suppose that the user operates a button on the GUI framework via the remote control as shown in FIG. 31. Then, if the setting "Mixing_On flag=1" is included in the sound management table belonging to the BD-Object to which the application management table of the Java™ application that drew the GUI framework also belongs, the sound data of the file sound.bdmv is mixed with the sound/voice of the PlayList.

Here, if the sound/voice of the PlayList is a background music of a motion picture and the sound data of the file sound.bdmv is a sound/voice guide "Let's play the game!!", a mixture of the background music and the sound/voice guide is output.

Figure 32:
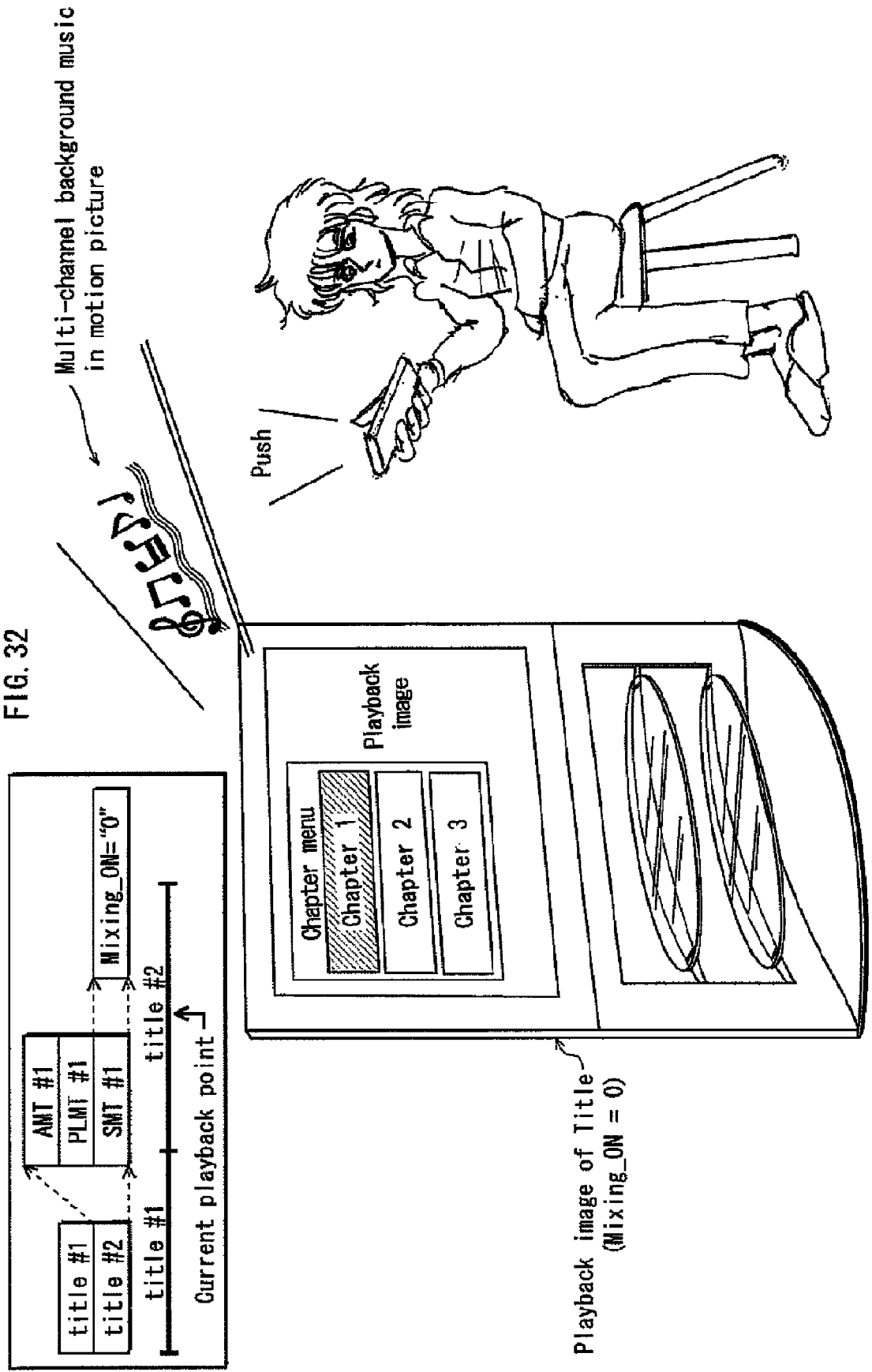
FIG. 32 shows an audio playback performed by the playback apparatus when a button on the GUI framework is operated with respect to a Title for which the Mixing_On flag is set to OFF.

It is further supposed here that a GUI framework and a PlayList playback image that are different from those shown in FIG. 25 are output when Title #2 is played back. Here, suppose that the user operates a button on the GUI framework via the remote control as shown in FIG. 32. Then, if the setting "Mixing_On flag=0" is included in the sound management table belonging to the BD-Object to which the application management table of the Java™ application that drew the GUI framework also belongs, the sound data of the file sound.bdmv is not mixed with the sound/voice of the PlayList. Here, if the sound/voice of the PlayList is a background music of a motion picture, only the background music of the motion picture is output.

<Significance of Mixing_On Flag>

The Mixing_On flag has the following meaning. In such a case where although an audio stream with the surround sound/voice of 5.1 channels is multiplexed with an audio stream with monaural sound/voice in the AVClip to be played back, the STN_Table or the PlayItem permits the playback of only she audio stream with monaural sound/voice, not the audio stream with the surround sound/voice of 5.1 channels, it is possible to perform the mixing with the click sound, by turning ON the Mixing_On flag that corresponds to the PlayItem. With such a construction, even if an AVClip, which includes an audio stream with the surround sound/voice of 5.1 channels and an audio stream with monaural sound/voice, is to be played back by a PlayItem that does not permit the playback of the audio stream with the surround sound/voice of 5.1 channels it is possible to perform the mixing with the click sound in the playback by the PlayItem.

It is found from the above description that when a title intended to be mixed with a click sound and a title not intended to be mixed with a click sound are to be recorded onto one BD-ROM, there is no need for an AVClip having a surround sound/voice of 5.1 channels and an AVClip having a monaural sound/voice to be separately recorded on the BD-ROM.

It is therefore possible to provide a BD-ROM that supplies both a title intended to be mixed with a click sound and a title not intended to be mixed with a click sound, by recording the following onto the BD-ROM: (a) one AVClip in which an audio stream having the surround sound/voice of 5.1 channels is multiplexed with an audio stream having a monaural sound/voice; (b) PlayItem information that permits the playback of the audio stream having the surround sound/voice of 5.1 channels; and (c) PlayItem information that does not permit the playback of the audio stream having the surround sound/voice of 5.1 channels.

The above-described construction can reduce the time and labor of the production studio, and improve the efficiency in producing a motion picture since it can produce and provide with users such a BD-ROM that includes, without increasing the number of AVClips, both (a) a title which provides a high-quality sound by excluding the mixing with a click sound, and (b) a title which provides improved interactiveness by including the mixing with a click sound.

<Relationships with Movie Object and Java™ Application>

The Mixing_On flag is set to 0 (OFF) in the case where it is apparent that the application does not playback a click sound, namely when a navigation command intended to output a click sound is not incorporated in the Movie Object in the HDMV mode, and a byte code intended to output a click sound is net incorporated in the Java™ Application in the BD-J mode. Conversely, the Mixing_On flag is set to 1 (ON) when a navigation command or a byte code intended to output a click sound is present. With such settings, it is possible to invalidate the mixing in the playback apparatus when it executes an application that does not play back a click sound, simultaneously with a PlayItem that plays back audio, and it is possible to validate the mixing in the playback apparatus when it executes an application that plays back a click sound, simultaneously wish a PlayItem that plays back audio.

Up to now, the recording medium has been explained. The following describes the playback apparatus of the present invention.

Figure 33:
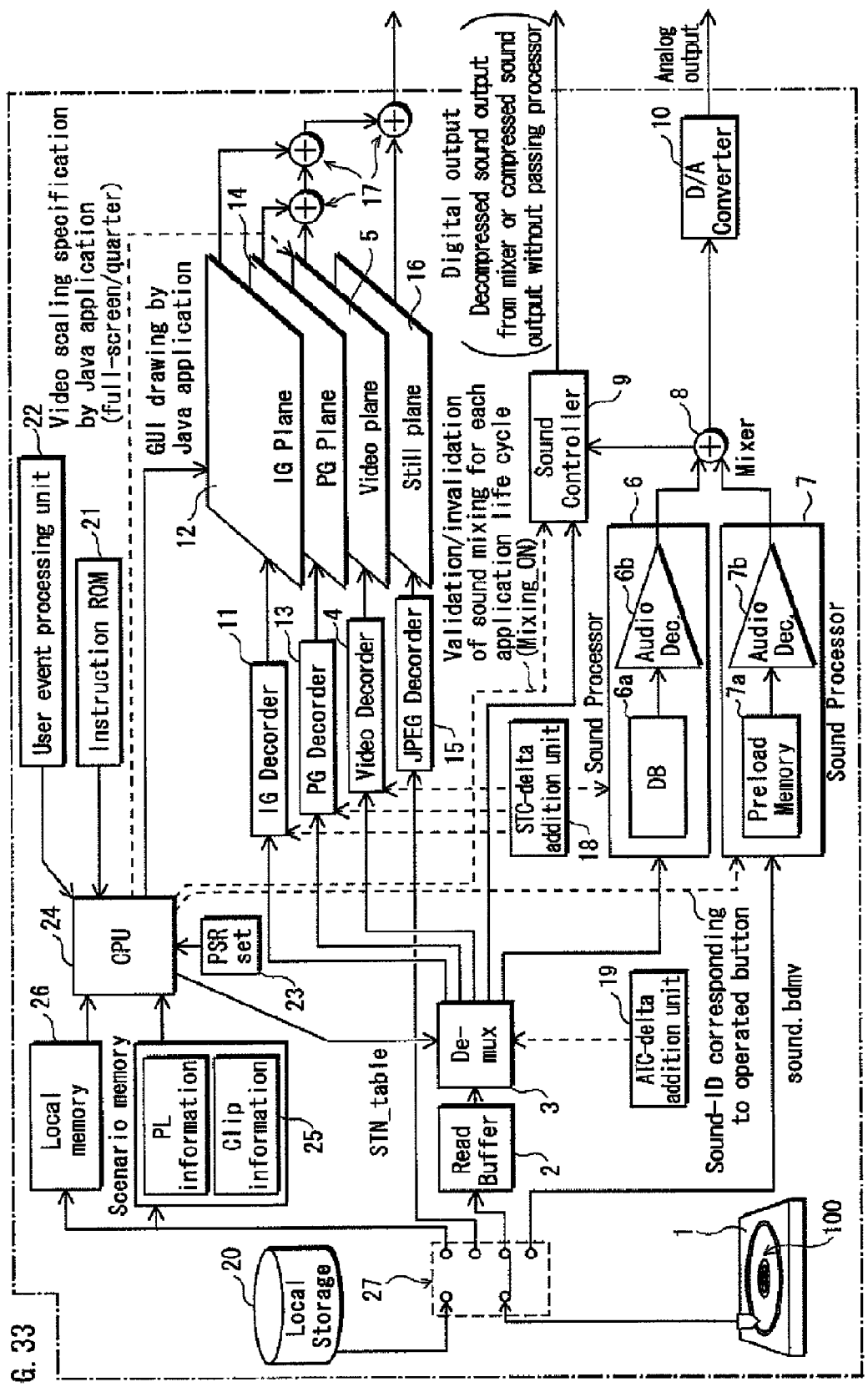
FIG. 33 shows the internal structure of the playback apparatus of the present invention.

FIG. 33 shows the internal structure of the playback apparatus of the present invention. The playback apparatus of the present invention is industrially manufactured based on the internal structure shown in FIG. 33. The playback apparatus of the present invention is mainly composed of two parts: a system LSI; and a drive apparatus. The industrial manufacturing is achieved by loading the parts into the cabinet and the board of the apparatus. The system LSI is an integrated circuit that includes various processing units for performing the functions of the playback apparatus. The playback apparatus manufactured in such a manner includes a BD-ROM drive 1, a read buffer 2, a demultiplexer 3, a video decoder 4, a video plane 5, a sound processor 6, a sound processor 7, a mixer 8, a sound controller 9, a D/A converter 10, an interactive graphics decoder 11, an interactive graphics plane 11, a presentation graphics decoder 13, a presentation graphics plane 14, a JPEG decoder 15, a still plane 16, a combining unit 17, an STC-delta adding unit 18, an ATC-delta adding unit 19, a local storage 20, an instruction ROM 21, a user event processing unit 22, a PSR set 23, a CPU 24, a scenario memory 25, and a local memory 26.

First, component elements (the BD-ROM drive 1 to the ATC-delta adding unit 19) for playing back the AVClips recorded on the PD-ROM will be described.

The BD-ROM drive 1 performs loading/ejecting a BD-ROM, and performs accesses to the BD-ROM.

The read buffer 2 is a FIFO memory in which TS packets read from the BD-ROM are stored in the First-In-First-Out manner.

The demultiplexer (De-mux) 3 extracts source packets from the read buffer 2, and converts TS packets constituting the source packets into PES packets. The demultiplexer 3 outputs PES packets, out of the PES packets obtained by the conversion, that have PIDs written in the STN_Table, to any of the video decoder 4, the audio decoder 6, the IG decoder 11, and the presentation graphics decoder 13.

The video decoder 4 decodes a plurality of PES packets, which are output from the demultiplexer 3, into pictures of a non-compression format, and writes the pictures onto the video plane 5.

The video plane 5 is a plane for storing non-compression format pictures. The plane is a memory area in the playback apparatus for storing pixel data of one screen. The resolution of the video plane 5 is 1920×1080. The picture data stored in the video plane D is composed of pixel data that is represent by the audio decoder 16-bit YUV values. In the video plane 5, scaling of playback images for each frame in the video stream is possible. Here, "scaling" is changing the size of playback image per frame to either ¼ (quarter) or 1/1 (full-scale) of the video plane 5. Such a scaling is executed in the BD-J mode in accordance with an instruction by the CPU 24. This enables the screen to be arranged differently by displaying the playback image of the video stream at one corner, in the full scale or the like.

The sound processor 6 includes a decode buffer (DB) 6a and an audio decoder 6b. The DB 6a stores PES packets constituting an audio stream that are output from the demultiplexer 3. The audio decoder 6b decodes the PES packets stored in the DE 6a and outputs audio data in the PCM state.

The sound processor 7 includes a preload memory 7a and an audio decoder 7b. The preload memory 7a stores files sound.bdmv read out from the BD-ROM. The audio decoder 7b decodes one or more pieces of sound data that are specified by the CPU 24, among a plurality of pieces of sound data included in the preloaded files sound.bdmv, and outputs audio data in the PCM state. It is preferable that the preloading onto the preload memory 7a is performed when the BD-ROM is loaded or when titles are switched. This is based on the following reasons: when a file sound.bdmv is tried to be read out during a playback of an AVClip, a seek by the optical pickup occurs to read out a file other than the AVClip; on the other hand, it hardly occurs that an AVClip is being played back continuously when the BD-ROM is loaded or when titles are switched; and therefore by reading out files sound.bdmv when the BD-ROM is loaded or when titles are switched, it is possible to ensure that the playback of the AVClip is not interrupted.

The mixer 8 mixes the sound data in the PCM state output from the sound processor 6 and the sound processor 7. In this mixing, to match the sampling frequency and the number of channels, the mixer 8 converts the audio attributes of the sound data output from the sound processor 6 into she audio attributes of the sound data output from the sound processor 7. The mixer 8 performs the mixing when the CPU 24 decodes a navigation command Intended to output a click sound, or a byte code intended to output a click sound.

The sound controller 9 switches data to be output between the decompressed audio data output from the mixer B, and the compressed audio data that has not passed the sound processor 6. The audio data is output to the television 400 or the amplifier 500 via the S/PDIF or the HDMI. When the compressed audio data is output, the compressed audio data is decoded by the television 400 or the amplifier 500 that receives the output data.

The D/A converter 10 converts the audio data output from the mixer 8 from digital to analog, and outputs the analog audio data.

The Interactive Graphics (IG) decoder 11 decodes the IG stream read out from the BD-ROM or the local storage 20, and writes non-compressed graphics onto the IG plane 12.

On the Interactive Graphics (IG) plane 12, non-compressed graphics, that are obtained by the IG decoder 11 in the HDMV mode, are written. On the IG plane 12, characters or graphics, which are drawn by an application in the BD-J mode, are also written.

The Presentation Graphics (PG) decoder 13 decodes the PG stream read out from the BD-ROM or the local storage 20, and writes non-compressed graphics onto the presentation graphics plane 14. With the decoding by the presentation graphics decoder 13, a subtitle is displayed on the screen.

The Presentation Graphics (PG) plane 14 is a memory having an area of one screen, and stores one screen of non-compressed graphics.

The JPEG decoder 15 decodes JPEG data recorded in the BD-ROM 100 or the local storage 20, and writes the obtained data into the Still plane 16.

The Still plane 16 is a plane into which the non-compressed graphics obtained by decoding the JPEG data are written. The graphics data is used as the "wallpaper" of the GUT frame work written by a Java™ application.

The combining unit 17 combines the data stored in the IG plane 12, the data stored in the PG plane 14, the data stored in the video plane 5, and the data stored in the Still plane 16 to obtain a complex image.

The STC generating unit 18 generates a System Time Clock (STC). Also, when the current STC_Sequence switches to a new one, the STC generating unit 18 obtains an STC value (STC2) for a new STC_Sequence by adding an offset value called STC_delta to an STC value (STC1) for the current STC_Sequence so that the STC value (STC1) for the current STC_Sequence is continuous to the STC value (STC2) for the new STC_Sequence.

The STC_delta is expressed as $$STC\_delta = PTS1(1stEND) + Tpp - PTS2(2ndSTART),$$

Where "PTS1(1stEND)" indicates the display start time of a picture that is played back last in the first STC_Sequence, "Tpp" indicates the display period of the picture, and "PTS2 (2ndSTART)" indicates the display start time of a picture that is played back first in the second STC_Sequence that follows the first STC_Sequence. The value STC_delta is obtained based on the above expression, the value STC_delta is added to a clock measurement value, and the result is output to each decoder. This enables each decoder to play back two streams being the two STC_Sequences continuously. With such a construction, even if two or more STC_Sequences are included in one AVClip, or even if each of two AVClips, which are to be played back continuously, includes a different STC_Sequence, it is possible to decode the STC_Sequences in each AVClip seamlessly.

To achieve the continuousness of the buffering, the following conditions 1) and 2) should be satisfied.

1) To satisfy: STC2 (2ndSTART)>STC2 (1stEND), where "STC2 (1stEND)" means STC1 (1stEND) projected on the time axis of STC2, and is expressed as: STC2 (1stEND)= STC1 (1stEND)−STC_delta.

2) An extraction of a TS packet from TS1 and an extraction of a TS packet from TS2 are defined by STC1 and STC2 that are projected on the same time axis, and no underflow or overflow of the buffer occurs.

The ATC-delta adding unit 19 generates an Arrival Time Clock (ATC). Also, when the current ATC_Sequence switches to a new one, the ATC-delta adding unit 19 obtains an ATC value (ATC2) for a new ATC_Sequence by adding an offset value called ATC_delta to an ATC value (ATC1) for the current ATC_Sequence so that the ATC value (ATC1) for the current ATC_Sequence is continuous to the ATC value (ATC2) for the new ATC_Sequence. The addition is expressed as: ATC2=ATC1+ATC_delta. The ATC_delta is an offset value being a difference between T1 and T2, where T1 is a time at which the last TS packet of the current transport stream (TS1) that has been read out up to now is input, and T2 is a time at which the first TS packet of the next transport stream (TS2) is input. The ATC_delta is expressed as: ATC_delta≧N1/TS_recording_rate. It should be noted here that the input time T2 means the input time of the first TS packet of TS2 that is projected on the time axis of TS1. The "N1" indicates the number of TS packets that follow the last video DES packet of TS1. In the BD-ROM, the ATC_delta is written in the Clip information. It can be used to calculate the ATC_delta. The above-described calculation enables the ATC value (ATC1) for the current ATC_Sequence to be continuous to the ATC value (ATC2) for the new ATC_Sequence. Adding the ATC_delta to the clock measurement value and outputting the result to the demultiplexer 3 achieves a seamless buffer control.

Up to now, the component elements for playing back the AVClips have been described. The following describes the component elements (the local storage 20 to the local memory 26) that relate to operations in the BD-J mode.

The local storage 20 is a hard disk for storing, together with metadata, contents that are provided from a recording medium or a communication medium other than the SD-ROM, such as the contents downloaded from the web site. The metadata is used for managing the downloaded contents by binding them to the local storage 20. An application in the BD-J mode can, by accessing the local storage 20, perform various processes using the length of the downloaded contents.

The following describes component elements (the instruction ROM 21 to the local memory 26) for achieving the integration control in the playback apparatus.

The instruction ROM 21 stores software that defines the control by the playback apparatus.

The user event processing unit 22 outputs, to the CPU 24, user events that are instructed through key operations on the remote control or the front panel of the playback apparatus.

The PSR set 23 is a register embedded in the playback apparatus, and is composed of 64 Player Status Registers (PSR) and 4,096 General Purpose Registers (GPR). Among the values set in the Player Status Registers the set values are referred to as PSRs), PSR4 to PSR8 are used to represent a current playback position.

PSR4 is set to a value ranging from 1 to 100 to indicate a Title to which the current playback position belongs, and is set to a value 0 to indicate that the current playback position belongs to the top menu.

PSR5 is set to a value ranging from 1 to 999 to indicate a Chapter number of a Chapter to which the current playback position belongs, and is set to a value 0xFFFF to indicate that Chapter numbers are invalid in the playback apparatus.

PSR6 is set to a value ranging from 0 to 999 to indicate a PlayList number of a PlayList (current PL) to which the current playback position belongs.

PSR7 is set to a value ranging from 0 to 255 to indicate a PlayItem number of a PlayItem (current PlayItem) to which the current playback position belongs.

PSR8 is set to a value ranging from 0 to 0xFFFFFFFF to indicate the current playback position (current PTM (Presentation TiMe)) using the temporal accuracy of 45 KHz. With the above-described PSR4 to PSR8, it is possible to identify the current playback position in the time axis of the entire BD-ROM shown in FIG. 18A.

The CPU 24 runs the software stored in the instruction ROM 21 and controls the entire playback apparatus. The contents of the control dynamically change depending on the user events output from the user event processing unit 22 and depending on the values set in PSRs in the PSR set 23.

The scenario memory 25 stores the current PL information and the current Clip information. The current PL information is a piece of PL information that is a current target of processing, among a plurality of pieces of PL information recorded on the BD-ROM. The current Clip information is a piece of Clip information that is a current target of processing, among a plurality of pieces of Clip information recorded on the BD-ROM.

The local memory 26 is a cache for temporarily sorting the data recorded on the BD-ROM so as to cover the slowness in reading data from the BD-ROM. Due to the presence of the local memory 26, applications are executed efficiently in the BD-J mode.

Figure 34:
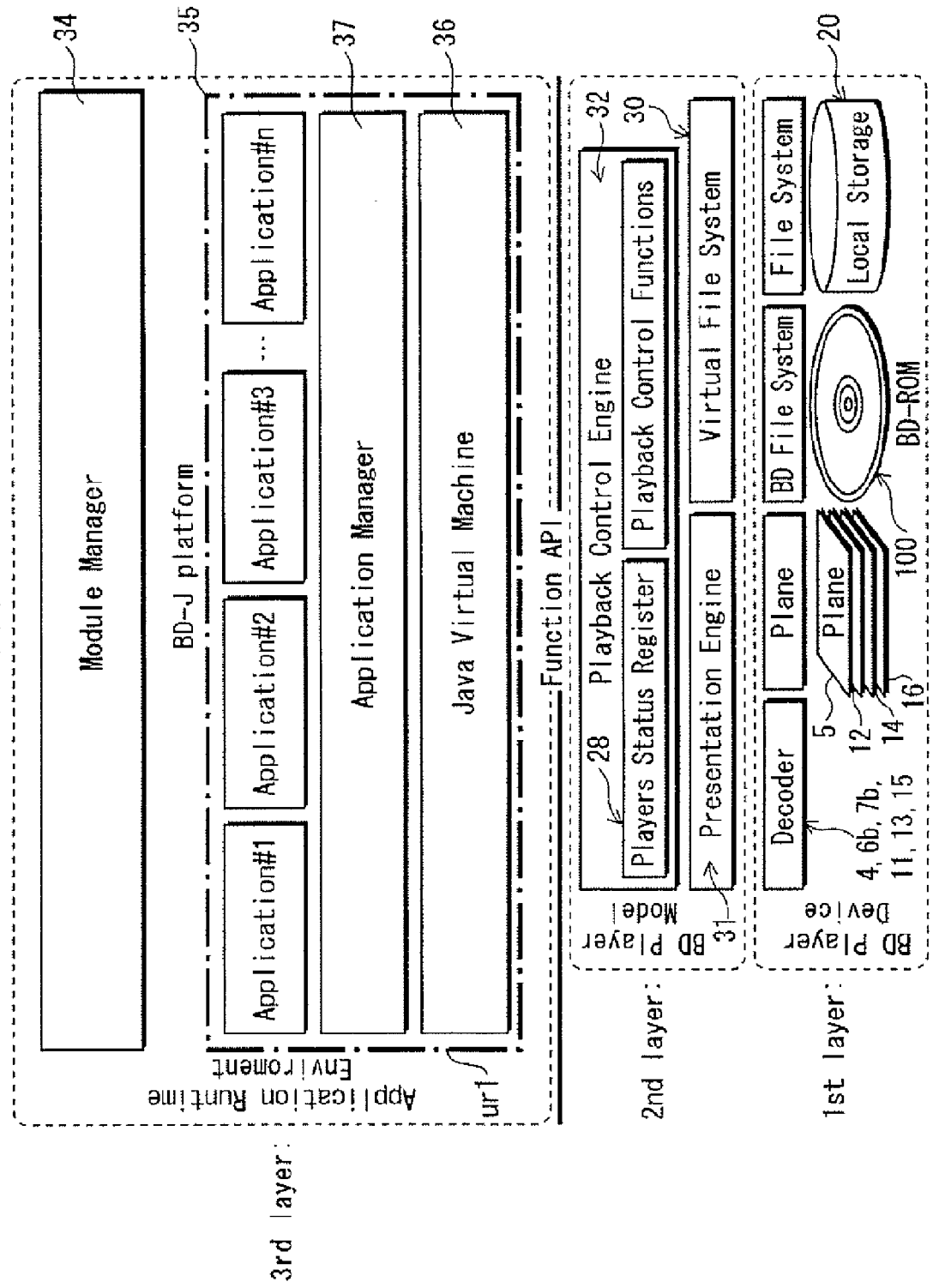
FIG. 34 shows, in the layer structure, the hardware and the software stored in the CPU 24.

Up to now, the hardware structure of the playback apparatus of the present embodiment has been described. The following describes the software structure of the playback apparatus of the present embodiment FIG. 34 shows, in the layer structure, the hardware and the software stored in the CPU 24. As shown in FIG. 34, the layer structure of the playback apparatus is composed of:

a) The first layer as the BD Player Device;

b) The second layer as the BD Player Model; and c) The third layer as the Application Runtime Environment.

The hardware structure of the playback apparatus shown in FIG. 34 belongs to the first layer. The first layer as the BD Player Device includes: a "decoder" that is composed of the video decoder 4, the sound processor 6, the IG decoder 11, and the presentation graphics decoder 13; a "plane" that is composed of the video plane 5, the IG plane 12, and the PC plane 14; the BD-ROM, a file system of the RD-ROM; the local storage 20; and a file system of the local storage 20.

The second layer as the DO Player Model is composed of:

b2) a layer composed of a playback control engine 32; and b1) a layer composed of a virtual file system 30 and a presentation engine 31, and provides the function API to layers that are higher than itself.

The third layer as the Application Runtime Environment is composed of:

c1) a layer in which a module manager 34 is present; and c2) a layer in which a BD-J platform 35 is present.

First, the virtual file system 30 to the module manager 34 that belong to the second layer will be described.

The virtual file system 30 is a virtual file system for treating the downloaded contents stored in the local storage 20 as one unit with the disc contents of the BD-ROM. The downloaded contents stored in the local storage 20 contain the SubClip, Clip information, and PlayList information. The PlayList information in the downloaded contents differ from the PlayList information recorded on the BD-ROM in that it can specify Clip information whether the Clip information is stored in the BD-ROM or the local storage 20. And for this specification, the PlayList information in the virtual file system 30 need not specify a file on the BD-ROM or the local storage 20 by a full path. This is because a file system on the BD-ROM or the local storage 20 is recognized as one virtual file system (virtual file system 30). Therefore, with a five-digit value, which is a file body of a file storing Clip information, specified therein, the Clip_Information_file_name in the PlayItem information and the Clip_Information_file_name in the SubPlayItem information are used to specify an AVClip on the virtual file system 30 or the BD-ROM. The data reading via the virtual file system 30 from the local storage 20, when combined dynamically with the data stored in the BD-ROM, can produce various patterns of playbacks. In the present embodiment, since the disc contents of a combination of the local storage 20 and the BD-ROM are treated on an equality with the disc contents of the BD-ROM, it is presumed that the "BD-ROM" also refers to a virtual recording medium that is a combination of the local storage 20 and the BD-ROM.

The presentation engine 31 executes AV playback functions. The AV playback functions in the playback apparatus are a group of traditional functions succeeded from CD and DVD players. The AV playback functions include: Play, Stop, Pause On, Pause Off, Still Off, Forward Play (with specification of the speed), Backward Play (with specification of the speed), Audio Change, SubTitle Change, and Angle Change. To realize the AV playback functions, the presentation engine 31 controls the video decoder 4, the presentation graphics decoder 13, the D/A converter 10, and the audio decoder 6 so as to decode a portion of the AVClip, which has been read into the read buffer 2, corresponding to a desired time. Here, the desired time may be the time specified by PSR8 (current PTM). With this construction, it is possible to play back a portion of an AVClip that corresponds to an arbitrary time.

The playback control engine (PCE) 32 performs functions that include: (i) PlayList playback control function; and (ii) status obtaining/setting function for obtaining and setting statuses with the PER set 23. The PlayList playback control function is, among the AV playback functions performed by the presentation engine 31, a playback start, a playback stop or the like that are performed based on the current Pt information and Clip information. The functions (i) and (ii) are performed in response to the function calls that are issued by the HDMV module 33, the module manager 34, and the BD-J platform 35.

The module manager 34 holds Index.bdmv that is read from the BD-ROM, and performs a branch control. The branch control includes issuing a terminate even: to a dynamic scenario constituting a current Title, and issuing an activate event to a dynamic scenario constituting a branch destination Title.

Up to now, the presentation engine 31 to the module manager 34 have been explained. The following describes the BD-J platform 35.

The BD-J platform 35 is what is called a Java™ platform, having a construction centering on a Java™ virtual machine 35. Various system programs and applications operate in a work memory that is included in the Java™ virtual machine 36. The BD-J platform 35 is implemented with the BD-J Extension, in addition to the above-mentioned Java™ 2 Micro Edition (J2ME) Personal Basis Profile (PBP1.0), and Globally Executable MHP specification (GEM[1.0.2]) for package media targets. The BD-J Extension includes various specialized packages to provide improved functions of GEM [1.2] to the BD-J platform.

First, the Java™ virtual machine 36 that is the core of the BD-J platform 35 will be described.

<Java™ Virtual Machine 36>

Figure 35:
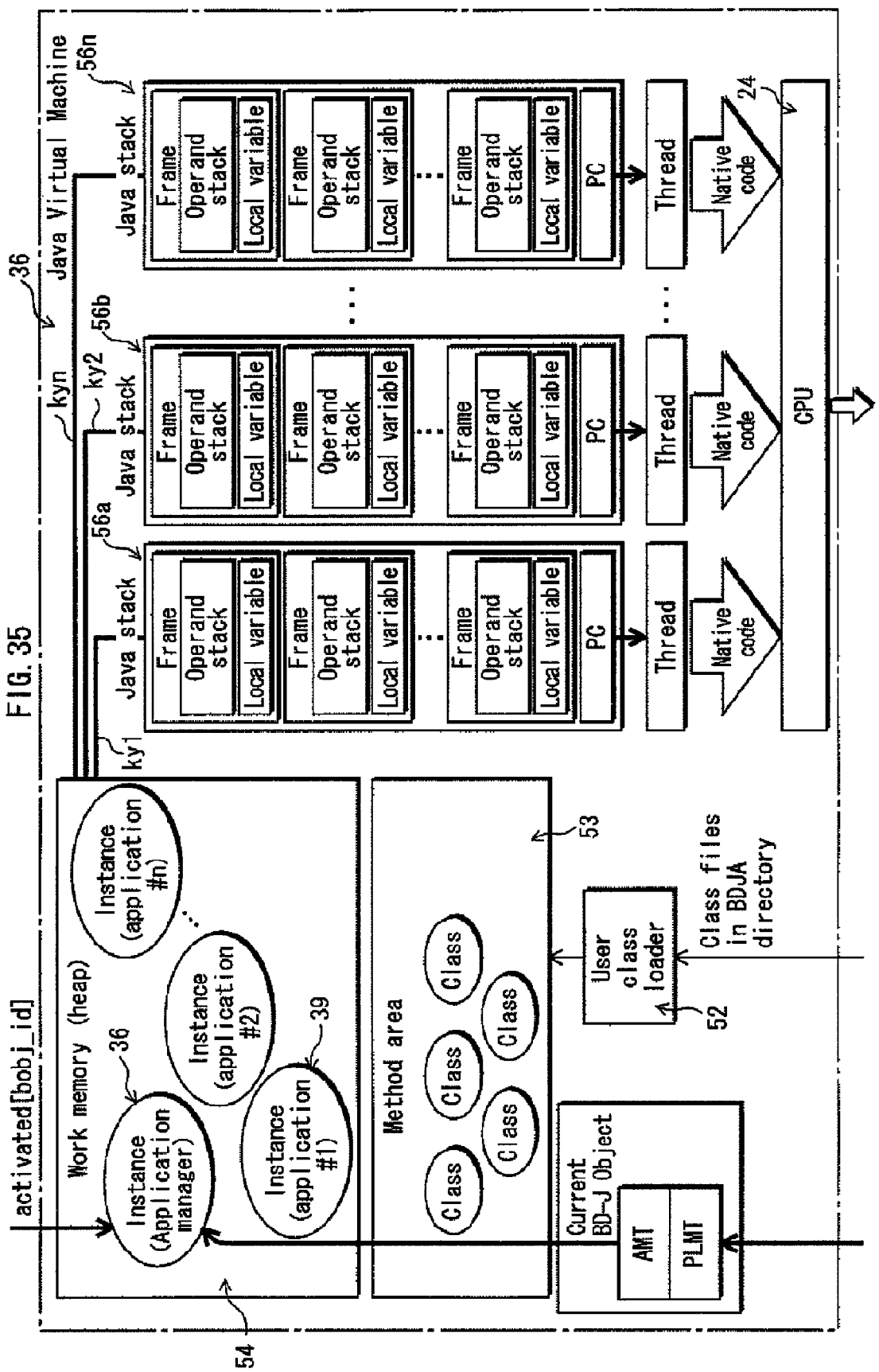
FIG. 35 shows the internal structure of the Java™ virtual machine 36.

FIG. 35 shows the internal structure of the Java™ virtual machine 36. As shown in FIG. 35, the Java™ virtual machine 36 includes the CPU 24, which is shown in FIG. 33, a user class loader 52, a method area 53, a work memory 54, threads 55a, 55b, . . . 55n, and Java™ stacks 56a, 56b, . . . 56n.

The user class leader 52 reads, from the local memory 26 or the like, class files in Java™ archive files that belong to the BDJA directory, and stores the read class files into the method area 53. The class file reading by the user class loader 52 is achieved as the application manager 37 instructs the user class loader 52 to read the class file by specifying a file path. If the file path indicates the local memory 26, the user class loader 52 reads a class file in a Java™ archive file that constitutes an application, from the local memory 26 onto the work memory. If the file path indicates a directory in the virtual file system 30, the user class loader 32 reads a class file in a Java™ archive file that constitutes an application, from the BD-ROM or the local storage 20 onto the work memory. The application activation control is achieved by the class file reading by the user class loader 52. If a class file specified to be read is not stored in the local memory 26, the user class loader 52 notifies the application manager 37 of a reading failure.

The method area 53 stores the class files read by the user class loader 52 from the local memory 26.

The work memory 54 is what is called a heap area for storing instances of various class files. The application manager 37 shown in FIG. 34 is a resident application that is resident in the work memory 54. The work memory 54 also stores instances that correspond to the class files stored in the method area 53, as well as the resident-type instances. The instances are the xlet programs that constitute the application. After such xlet programs are stored in the work memory 54, the application is ready to run.

In the layer model shown in FIG. 34, the application manager 37 in the work memory 54 is located in a layer that is higher than the Java™ virtual machine 36. However, this is an arrangement made to describe the application manager 37 in the work memory 54 to be easy to understand. In reality, the application manager 37 is executed as an instance by the threads 55a, 55b, . . . 55n.

The threads 55a, 55b, . . . 55n are a logical execution body for executing the methods stored in the work memory 54. The threads 55a, 55b, . . . 55n perform calculations using, as the operands, the arguments stored in the local variables or the operand stacks, and stores the calculation results into the local variables or the operand stacks. The arrows ky1, ky2, and kyn symbolically indicate the methods supplied from the work memory 54 to the threads 55a, 55b, . . . 55n. While the physical execution body is only one, namely the CPU, up to 64 threads may be provided in the Java™ virtual machine 36, as the logical execution bodies. In so far as the number does not exceed 64, new threads may be created or existent threads may be deleted. The number of operating threads may be increased or decreased during the operation of the Java™ virtual machine 36. Since the threads may be increased as necessary, it is possible to allow a plurality of threads to execute one instance in parallel, thereby speeding up the instance. In FIG. 35, the relationship between the CPU 24 and the threads is "one-to-many". However, this relation may be "many-to-many" where there are a plurality of CPUs. The execution of the methods by the threads 55a, 55b, . . . 55n is achieved by converting byte codes that constitute the methods into native codes for the CPU 24, and issuing the native codes to the CPU 24. Description of the conversion into native codes is omitted here since it diverges away from the subject of the present application.

The Java™ stacks 56a, 56b, . . . 56n are provided in correspondence with the threads 55a, 55b, . . . 55n on a one-to-one basis, and each have a program counter (PC in FIG. 35) and one or more frames. The "program counter" indicates a portion of an instance that is currently executed. The "frame" is an stack-system area that is assigned one-to-one to a call for a method. Each frame is composed of: "operand stack" for storing an argument used at the one-time call; and "local variable stack (Local Variable in FIG. 35)" used by she called method. Since a frame is stacked on the Java™ stacks 56a, 56b, ... 56n each time a call is performed, a frame is also stacked when a method calls for itself recursively.

Up to now, the Java™ virtual machine has been explained.

<Application Manager 37>

The application manager 37 is system software that operates in a work memory in the Java™ virtual machine 36. Each time a branch between Titles occurs, the application manager 37 instructs the Java™ virtual machine 38 to start an application that is not run in the branch source Title, but has the run attribute "AutoRun" for the branch destination Title. At the same time, the application manager 37 terminates an application that is run in the branch source Title, but has no life cycle in the branch destination Title. Such start-up control and termination control are performed by referring to the application management table for the current BD-J Object.

Figure 36:
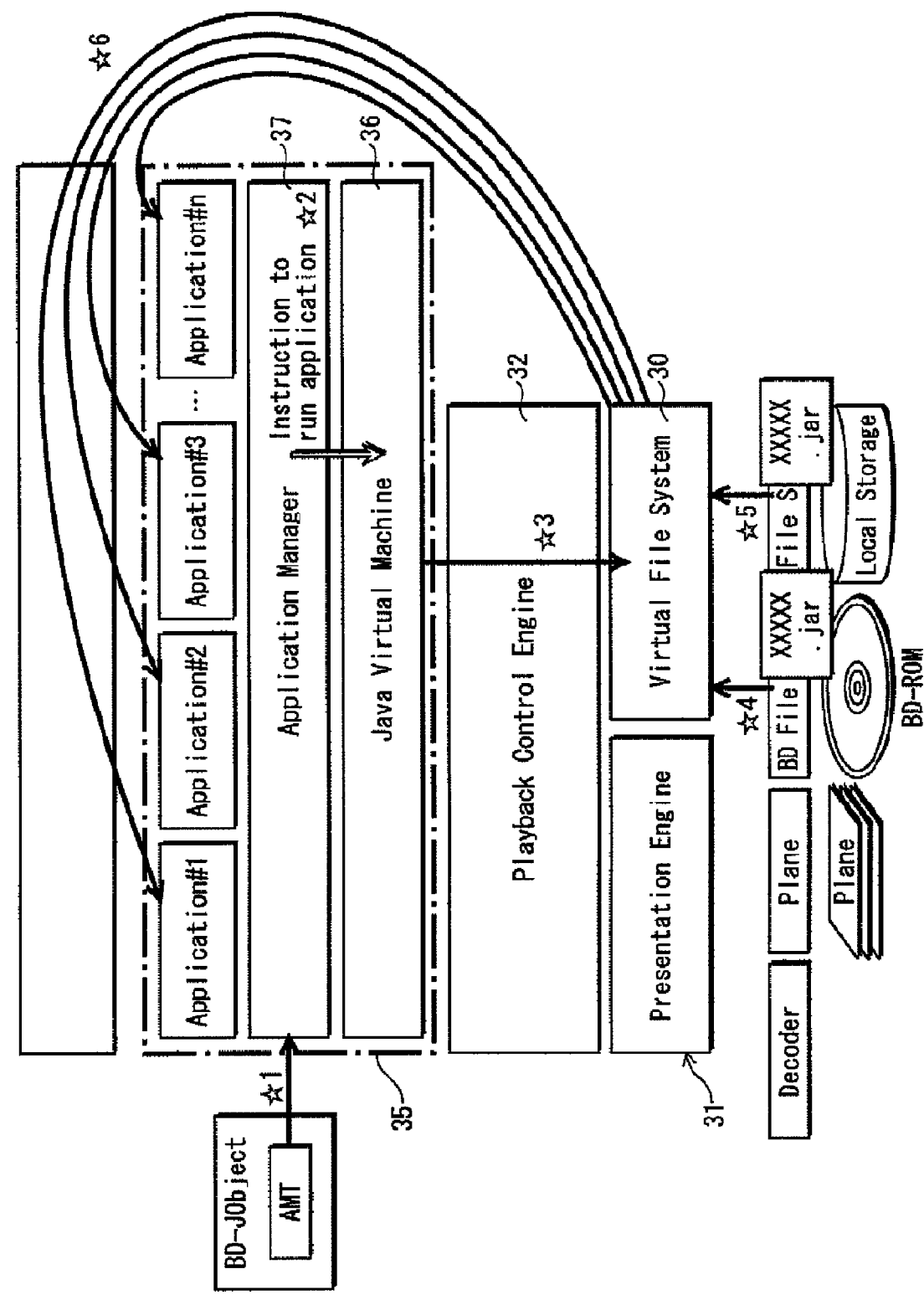
FIG. 36 shows a process performed by the presentation engine 31 to the module manager 34.

FIG. 36 shows a process performed by the application manager 37 based on the Application Management Table for the BD-J Object. In FIG. 36, the signs ☆1 to ☆6 indicate the following operations to be performed in sequence: the application manager 37 refers to the Application Management Table (☆1); the application manager 37 instructs the Java™ virtual machine 36 to start applications (☆2); the Java™ virtual machine 36 instructs a Java™ archive file to read (☆3); and then class files defining the Java™ applications are loaded (☆4, ☆5, and ☆6). With the sequence of operations, the Java™ virtual machine 36 reads the xlet program from the local memory 26 onto the work memory.

Figure 37:
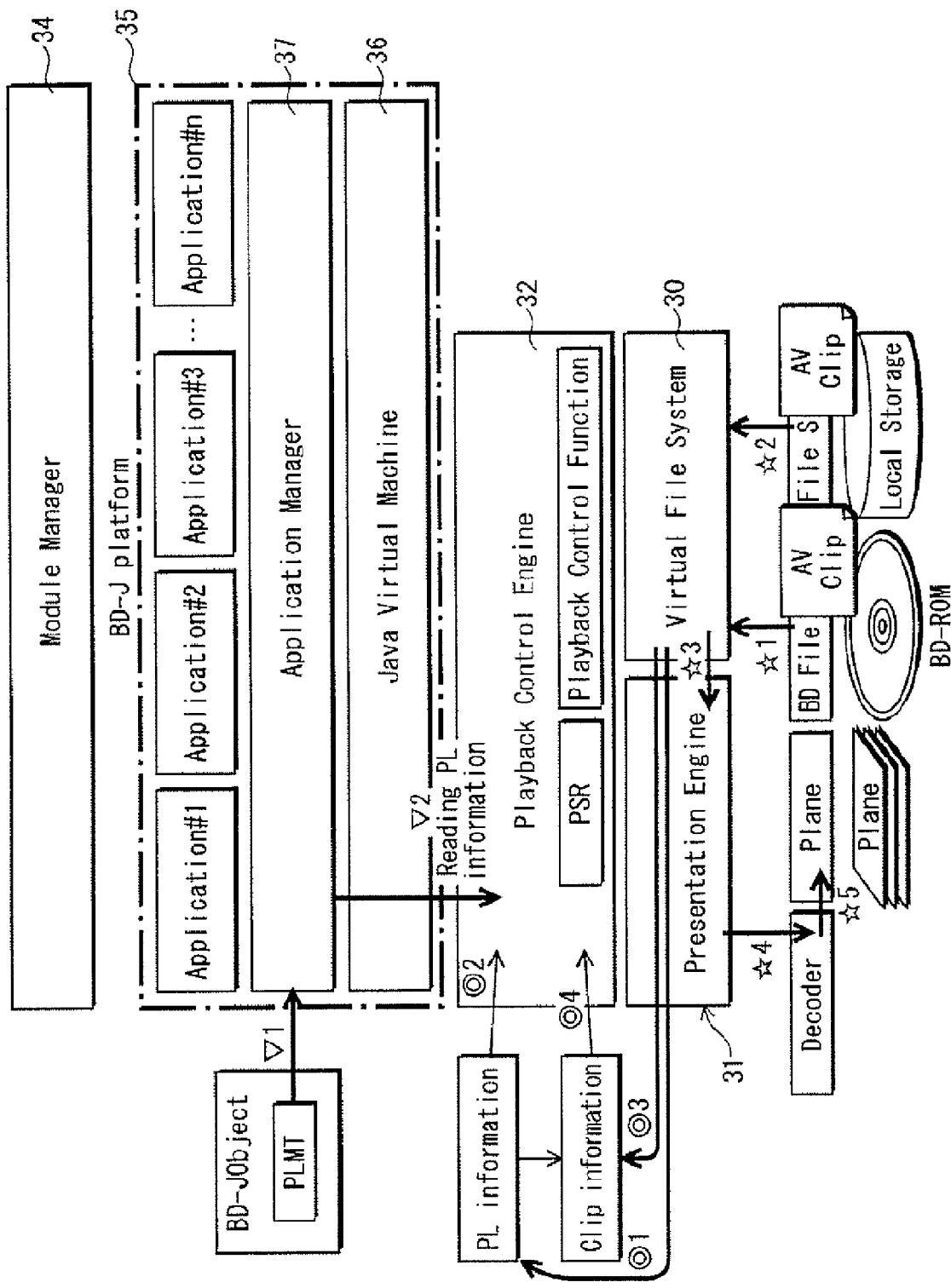
FIG. 37 shows a process performed by the application manager 37 based on the PLMT of the BD-J Object.

FIG. 37 shows a process performed by the application manager 37 based on the PLMT of the BD-J Object. In FIG. 37, the sign ∇1 represents a reference to the PLMT of the BD-J Object, and the sign ∇2 represents an instruction to the Presentation Engine 31 to read the PlayList information.

The signs ⊚1, ⊚2, ⊚3, and ⊚4 in FIG. 37 respectively indicate the following: read PlayList information via the virtual file system 30 (⊚1); decode PlayItem information that constitutes the PlayList information (⊚2); read Clip information via the virtual file system 30 (⊚3); and decode Clip information (⊚4). After the Clip information and the PlayList information are decoded as described above, the TS packets that constitute the AVClips are transferred to the presentation engine 31 via the virtual file system 30. After the TS packets are transferred to the presentation engine 31, the presentation engine 31 outputs the TS packets that constitute the AVClips to the decoder so that they are displayed on the plane. The signs ☆1, ☆2, ☆3, and ☆4, and ☆5 in FIG. 37 respectively Indicate the following: read the TS packets that constitute the AVClips (☆1, ☆2); transfer the TS packets from the virtual file system 30 to the presentation engine 31 (☆3); output the TS packets to the decoder (☆4); and output decoding results from the decoder to the planes (☆5).

Figure 38:
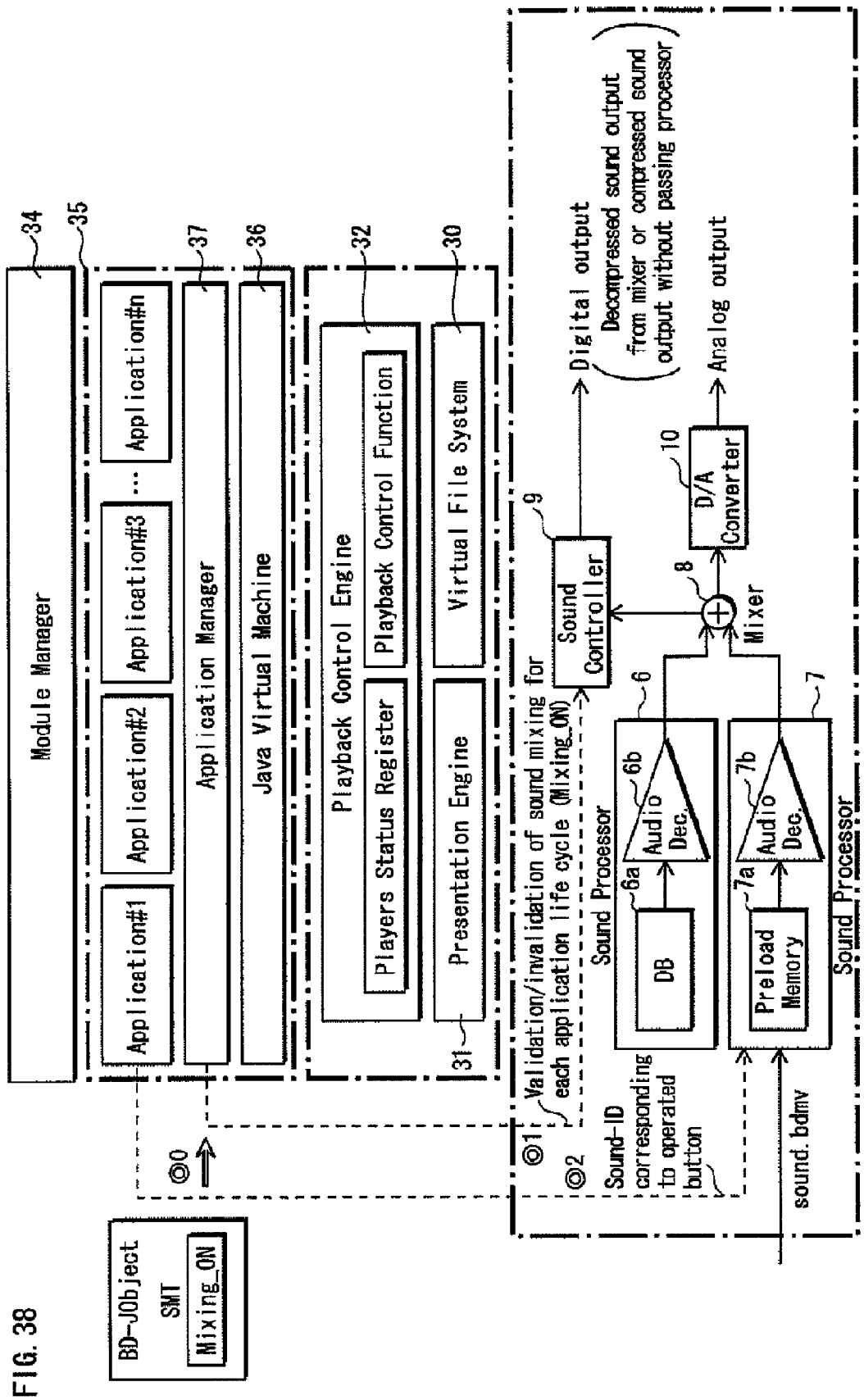
FIG. 38 shows a process performed by the application manager 37 based on the Sound Management Table of the BD-J Object.

FIG. 38 shows a process performed by the application manager 37 based on the Sound Management Table of the BD-J Object. The signs ⊚0, ⊚1, and ⊚2 in FIG. 38 respectively indicate the following: the application manager 37 refers to the Sound Management Table of the BD-J Object (⊚0); an instruction to validate or invalidate the sound mixing for each application life cycle (⊚1); and an instruction to output or decode the sound data corresponding to the operated button (⊚2).

The following will describe an implementation of the application manager 37 by software.

Figure 39:
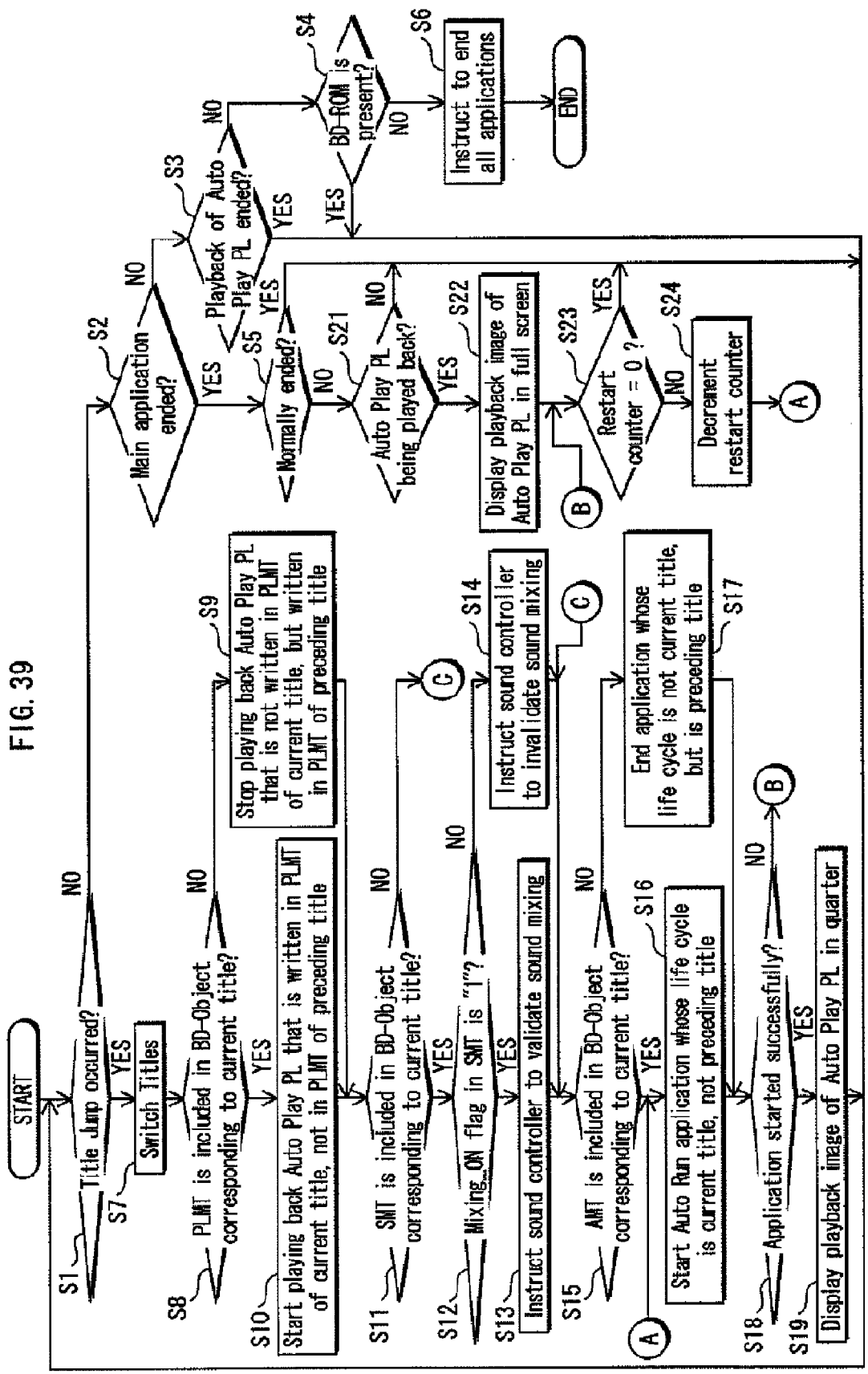
FIG. 39 is a flowchart showing procedures of the application manager 37.

FIG. 39 is a flowchart showing procedures of the application manager 37. The procedures shown in FIG. 39 include a main loop that is composed of steps S1, S2, S3, and S4. In step S1, it is judged whether or not a Title jump occurred. If it is judged that a Title jump occurred, the application manager 37 changes the Titles (step S7).

In step S8, it is judged whether or not a PLMT is present in the BD-Jobject that corresponds to the current Title. If it is judged that no PLMT is present in the BD-Jobject, the playback of the PlayList written in the PLMT of the preceding title is stopped (step S9).

If it is judged that a PLMT is present in the 3D-Jobject, the playback of the PlayList that is written in the PLMT of the current title, but is not written in the PLMT of the preceding title, and is attached wish the AutoPlay attribute is started (step S10).

In step S11, it is judged whether or not a Sound Management Table is present in the BD-Jobject that corresponds to the current Title. If it is judged in step S11 that a Sound Management Table is present in the BD-Jobject, the control goes to step S12 in which it is judged whether or not the Mixing_On flag is "1" in the Sound Management Table. If the Mixing_On flag is "1", the sound controller 9 is instructed to validate the sound mixing (step S13), and if the Mixing_On flag is "0", the sound controller 9 is instructed to invalidate the sound mixing (step S14).

In step S15, it is judged whether or not an Application Management Table is present in the BD-Jobject that corresponds to the current Title. If it is judged in step S15 that an Application Management Table is present in the BD-Jobject, a Java™ application that has the AutoRun attribute, where its life cycle is the current Title, not the preceding Title, is started (step S16). If an Application Management Table is not present in the BD-Jobject, an application whose life cycle is the preceding Title and is not the current Title is stopped (step S17).

After this, it is judged whether a Java™ application started successfully (step S18). If it is judged that a Java™ application started successfully (YES in step S18), the size of the playback image of Auto Play PL is converted into quarter (¼) (step S19).

On the other hand, if it is judged that a Java™ application did not start successfully (NO in step S18), a loop process composed of steps S23, S24, S16, and S18 is executed. The control variable in this loop process is a restart counter. The restart counter is a counter that defines the number of restarts of an application. The restart counter is reset when the present flowchart is started, and it is judged in step S23 whether or not the restart counter is 0. If it is judged in step S23 that the restart counter is not 0, the restart counter is decremented in step S24. The AutoRun application is repeatedly started in the loop process composed of steps S23, S24, S16, and S18-S19 so far as the restart counter is not 0. Such a repetition assures the activation of the application.

In step S2, it is judged whether or not a main application has ended. If it is judged that the main application has ended, the control moves to step S5 to judge whether or not the main application has ended normally. If it is judged that the main application has ended abnormally, steps S21 and S22 are executed. If it is judged that the main application has ended normally, the control returns to the main loop composed of steps S1 to S4, not executing steps S21-S22.

In step S21, it is judged whether or not an AutoPlay PL is being played back. If it is judged that an AutoPlay PL is being played back, the playback control engine 32 is instructed to convert the playback image of AutoPlay Pl into full-screen (step S22). Then the control moves to step S23. With this movement of the control to step S23, the loop process composed of steps S14 to S17 is executed even if the application has ended abnormally. This enables the application to be repeatedly started until the restart counter becomes 0.

In step S4, it is judged whether or not a BD-ROM is present in the BD drive 1. If no BD-ROM is present, all the applications are instructed to end (step S6).

As described above, according to the present embodiments it is possible to invalidate the sound mixing when a playback control intended to output a multi-channel sound/voice is performed, and to validate the sound mixing when a playback control not intended to output a multi channel sound/voice is performed.

This enables the production studio to make an adjustment that a click sound is prohibited when a playback of a multi-channel sound/voice is intended; and a multi-channel sound/voice is prohibited when a playback of a click sound is intended.

This construction will spur the introduction of the click sound into motion pictures since it eliminates the fear of the production studio that the multi-channel audio output might be interrupted if the click sound was introduced.

In Embodiment 1, the Mixing_On flag is turned OFF if the multi-channel audio is a surround audio of 5.1 channels and the audio stream has the attribute of this multi-channel audio. However, the Mixing_On flag may be turned OFF if the multi-channel audio is a stereo audio of 2 channels and the audio stream has the attribute of the stereo audio.

The amount of decompressed stereo audio data is not so large. It sometimes happens that the digital output is possible even after the sound mixing is performed after the audio data is decompressed into the LPCM state. As understood from this, the multi-channel audio may be turned ON in case it is expected that the amount of decompressed stereo audio data is not so large, and it is confirmed that the digital output is available.

Embodiment 2

In Embodiment 1, the Mixing_On flag is provided for each application life cycle in which a PlayList is automatically played back. This indicates that the application life cycle is equivalent to a PlayList, and the Mixing_On flag can control each playback period that constitutes the PlayList.

Based on this concept, the present embodiment proposes a technology for providing the Mixing_On flag in the PlayList information.

Figure 40:
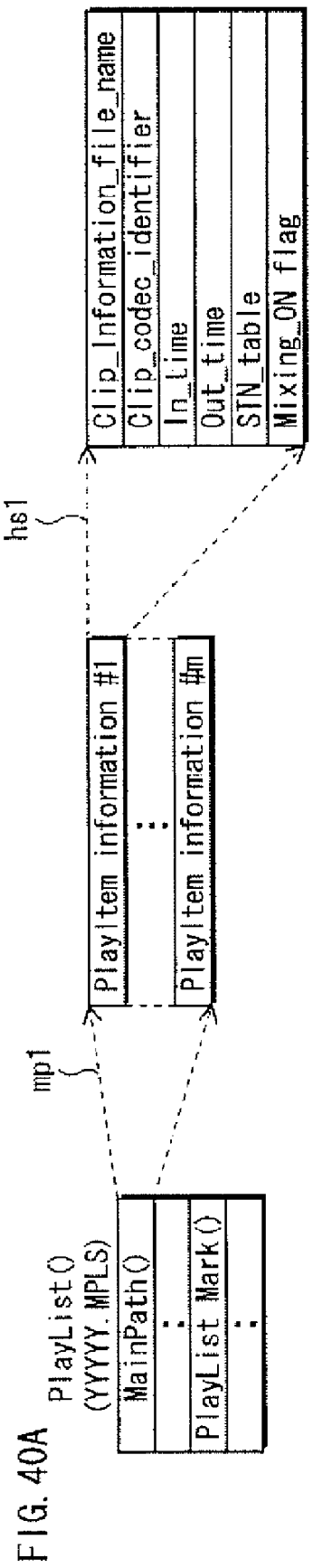
FIG. 40A shows the internal structure of the PlayList Information in Embodiment 2.
FIG. 40B shows the internal structure of the Mixing_On flag provided in the PlayItem information.

FIG. 40A shows the internal structure of the PlayList information in Embodiment 2. The structure shown in FIG. 40A differs from that of FIG. 8 in that the Mixing_On flag is provided in the PlayItem information. FIG. 40B shows the internal structure of the Mixing_On flag provided in the PlayItem information.

When the Mixing_On flag is set to 1, it indicates that the click sound of the file sound.bdmv is mixed with the playback sound/voice of the PlayItem.

When the Mixing_On flag is set to 0, it indicates that the click sound of the file sound.bdmv is not mixed with the playback sound/voice of the PlayItem.

With this construction, it is possible to define whether or not to mix the click sound of the file sound.bdmv, in units of PlayLists. The Mixing_On flag is set depending on the settings in the STN_Table contained in the PlayItem information.

Up to now, the improvement in the recording medium in Embodiment 2 has been described. The following describes the Improvement in the playback apparatus in Embodiment 2. The improvement in the playback apparatus in Embodiment 2 is achieved by the playback control engine 32.

Figure 41:
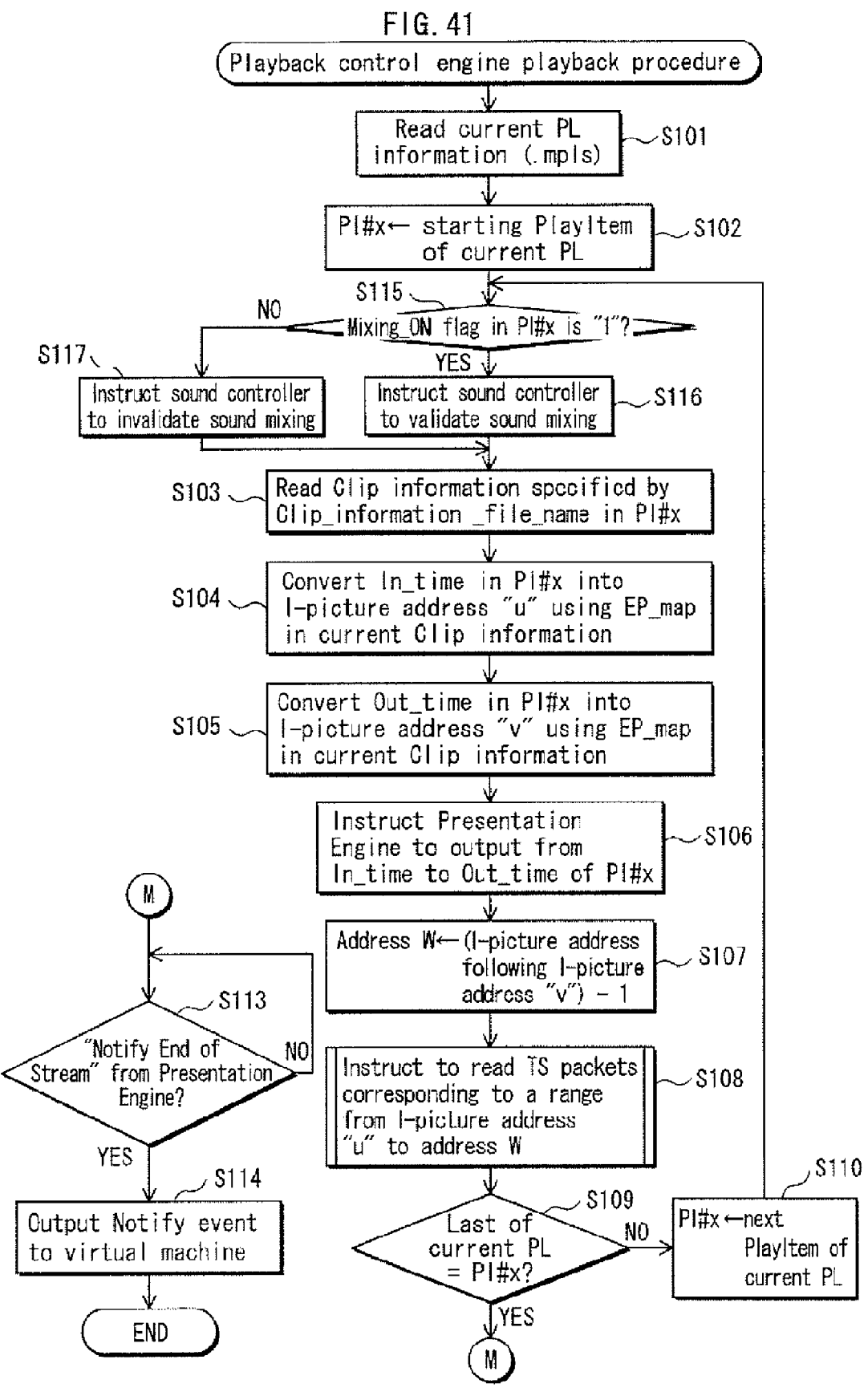
FIG. 41 is a flowchart showing the PlayList playback procedure performed by the playback control engine 32.

The following specifically describes the control procedures performed by the playback control engine 32 with reference to the flowchart shown in FIG. 41.

FIG. 41 is a flowchart showing the PlayList playback procedure performed by the playback control engine 32. The playback procedure mainly includes the control on the presentation engine 31 (step S106) and the control on the BD-ROM drive 1 or the local storage 20 (step S108). In this flowchart, the processing target PlayItem is indicated as PlayItem #x. In this flowchart, first the current PL information (.mpls) is read (step S101), and the processes of steps S102 to S110 are executed. The steps S102 to S110 constitute a loop process in which the processes of steps S103 to S110 are repeated for each niece of PI information constituting the current PL Information until it is judged as YES in step S109. In the loop process, the processing target PlayItem is indicated as PlayItem #x (PI#x). The PlayItem #x is initialized when the PlayItem at the start of the current PL is set to the PlayItem #x (step S302). The condition for the above-mentioned loop process to end is that it is judged that the PlayItem #x is the last PlayItem in the current PlayList (step S109). If the PlayItem #x is not the last PlayItem in the current PlayList, the next PlayItem in the current PlayList is set to the PlayItem #x (step S110).

The steps S103 to S110 are repeatedly executed in the loop process as follows. The Clip information specified by the Clip_information_file_name of the PlayItem #x is read into the scenario memory 25 (step S103). The In_time of the PlayItem #x is converted into an I-Picture address "u" using the EPmap of the current Clip information (step S104). The Out_time of the PlayItem #x is converted into an I-Picture address "v" using the EPmap of the current Clip information (step S105). An address that is obtained by subtracting "1" from the next I-Picture address of the I-Picture address "v" is set to address "W" (step S107). The BD-ROM drive 1 or the local storage 20 is instructed to read TS packets from the locations at the I-Picture address "u" to the address "W" (step 5108).

On the other hand, the presentation engine 31 is instructed to output data ranging from the mark_time_stamp of the current PLMark to the Out_time of the PlayItem #x (step S106). With the execution of the steps S105 to S108, a portion of AVClip that is specified by the PlayItem #x is played back.

After this, it is judged whether or not the PlayItem #x is the last PlayItem in the current PlayList (step S109).

If it is judged that the PlayItem #x is not the last PlayItem in the current PL, the next PlayItem in the current PlayList is set to the PlayItem #x (step S110), and the control returns to step S103. The above-described steps S103 to S110 are repeated to playback in sequence the PlayItems that constitute the PlayList.

In this flowchart, steps S115 to S117 are executed each time a round of steps S103 to S110 is executed. In step S115, it is judged whether or not the Mixing_On flag in the PlayItem #x is 1. If the Mixing_On flag is 1, the sound controller 9 is instructed to validate the sound mixing (step S116); and if the Mixing_On flag is 0, the sound controller 9 is instructed to invalidate the sound mixing (step S117).

As described above, according to the present embodiment, the Mixing_On flag is provided in the PlayList information that is used in both the HDMV mode and the BD-J mode. With this construction, it is possible to define whether to validate or invalidate the sound mixing of the click sound even if the GUI is achieved using the IG stream in the HDMV mode.

Embodiment 3

It is described in Embodiment 1 that the PlayList management table in the BD-J Object can be used to define the playback of a PlayList in the Java™ virtual machine. A problem with this is the PlayList management table. That is to say, since whether or not a PlayList can be played back is described in the PlayList management table in each BD-J Object, a PlayList may be playable in some Titles, but not in other Titles. Also, there is a case where although a PlayList can be played back, it is desired that the PlayList is prohibited from being played back by a certain type of application, from the viewpoint of the copyright protection. To achieve such restrictions on the playback of PlayLists, in Embodiment 3, a permission controller is provided in the BD-J platform 35.

If an application request a playback of a PlayList, the permission controller performs a mutual authentication with the application, and judges whether or not the application that requested the playback of the PlayList is authorized to play back the PlayList. If the application is authorized to play back the PlayList, the permission controller requests the playback control engine 32 to play back the PlayList. If the application is not authorized to play back the PlayList, the permission controller outputs a response event that indicates that the request is not permitted to the application that requested the playback of the PlayList. With such judgment by the permission controller on whether or not the request from the application can be permitted, if a PlayList that is distributed by a distributor is requested to be played back from an application that is distributed by another distributor, the request can be rejected. This enables a PlayList from being played back by a not-authorized application. The judgment by the permission controller is based on the combinations of PlayLists to be permitted and applications and the combinations of PlayLists not to be permitted and applications, the combinations being defined in the Permission file that is recorded in the BD-ROM. Description of details of such a file is omitted here since it diverges away from the subject of the present application.

Figure 42:
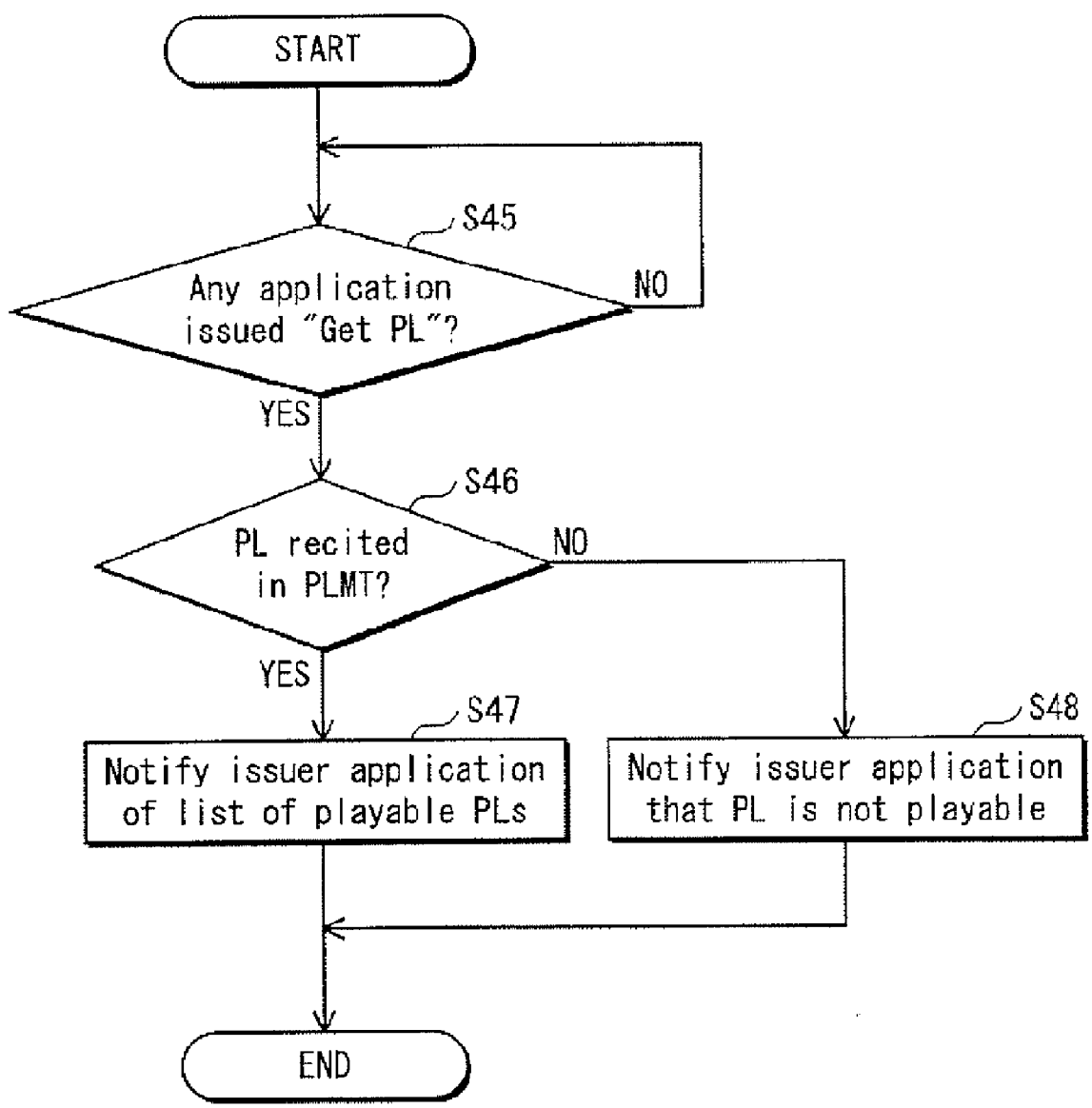
FIG. 42 is a flowchart that shows the procedures of the notification by the application manager 37.

In Embodiment 3, the application manager 37 notifies a PlayList that can be played back at the current playback point in time, in response to a request from an application. FIG. 42 is a flowchart that shows the procedures of the notification by the application manager 37. In this flowchart, it is monitored whether or not an application issued a request (GetPL) to notify a playable PlayList during the start-up of the application (step S45). If it is judged that the application issued such a request, it is judged whether or net there is the PlayList management table in the BD-J Object that constitutes the Title to which the current playback point belongs (step S46). If it is judged that there is the PlayList management table, the PlayList written in the PlayList management table is notified, as a playable PlayList, to the application that requested the playback (step S47).

If it is judged that there is no PlayList management table, a notification that the playback of the PlayList is unavailable is sent to the application that requested the playback (step S48) Up to now, the procedure performed by the application manager 37 in Embodiment 3 has been described.

The following describes the procedure performed by the application manager 37 when a playback of a PlayList is requested. The application manager 37 performs the processes in accordance with the flowchart shown in FIG. 43, in Embodiment 3.

Figure 43:
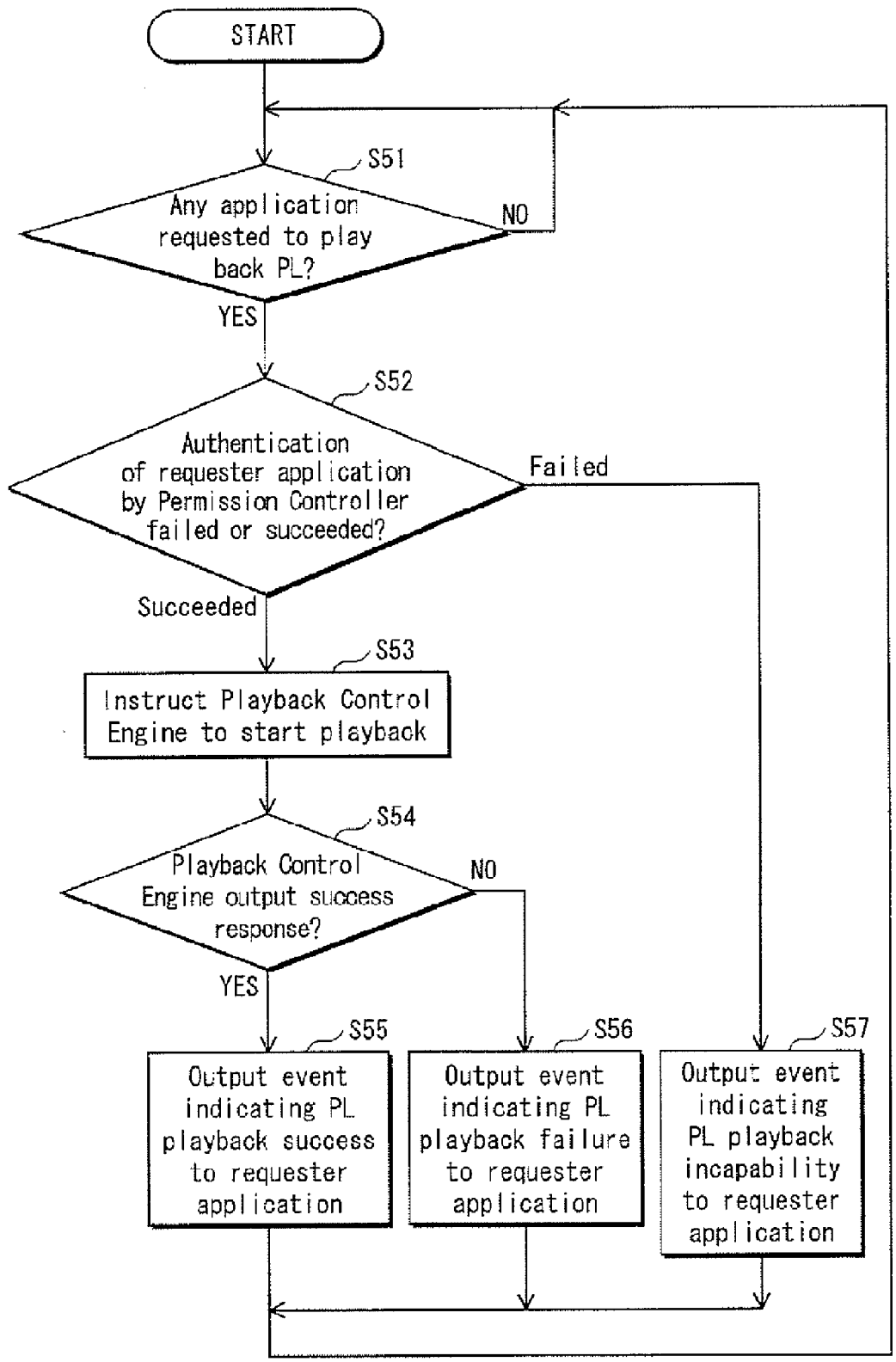
FIG. 43 shows a process performed by the application manager 37 in Embodiment 3.

In FIG. 43, the application manager 37 judges whether or not there is an application that requested a playback of a PlayList (step S51). If any application requests a playback of a PlayList, the application manager 37 causes the permission controller to perform an authentication to judge whether the application that requested the playback is authorized to play back the PlayList (step S52). If the application is authorized to play back the PlayList, the application manager 37 instructs the playback control engine 32 to start the playback (step S53), and waits for a response from the playback control engine 32 that indicates a success (step S54).

Upon receiving such a playback request, the playback control engine 32 checks the authenticity of the PlayList information. The check includes: a check on whether the BD-ROM and the local storage 20 in which the PlayList information, Clip information, and AVClips are stored constitute a proper PlayList; and the Clip information and an AVClip that are specified by the clip_Information_file_name in the PlayList information are stored in the BD-ROM and the local storage 20. In the case where a proper file is not referred to by the clip_Information_file_name or in the case where there is a contradiction in a virtual package that is composed of the BD-ROM and the local storage 2C, and a proper PlayList cannot be constructed, the playback control engine 32 returns a response that indicates "false". The playback control engine 32 also returns a response indicating "false" if the PlayList is played back by an application that is assigned with a higher run priority than the requester application, and a contention for a resource for achieving the playback of the PlayList has occurred.

If a response "success" is returned after the above-described procedure, an event that indicates the success of the playback of the PlayList is output to the application that requested the playback (step S55).

If a response "success" is not returned, an event that indicates the failure of the playback of the PlayList is output to the application that requested the playback (step S56). On the other hand, if it is judged in step 552 that the application that requested the playback is not authorized to play back the PlayList, an event that indicates the unavailability of the playback of the PlayList is output to the application that requested the playback (step S57).

As described above, the present embodiment enables a playback of a PlayList to be performed properly in response to a request from an application if whether or not a PlayList can be played back is defined differently for each Title, and if some applications have authority to playback a PlayList and others do not have the authority. This enables a variety of contents representation to be provided by combining the execution of the application and the playback of the PlayList.

Embodiment 4

It is described in Embodiment 1 that it is possible to instruct the playback apparatus to play back an AutoPlay PL at the start of a Title, by attaching a playback attribute "AutoPlay" to a PlayList desired to be played back. In contrast, the present embodiment relates to an improvement in which an unboundary application is recorded in the BD-ROM, and at the start of Title, the unboundary application is caused to select a Title to be automatically started.

Unboundary applications are applications that are on an equality with the resident applications, such as the playback control engine 32, in the playback apparatus, and execute, in response to a request from the playback control engine 32, a process of selecting a piece of PlayList information that matches the PSR set value on the playback apparatus side, from a plurality of pieces of PlayList information written in the PlayList management tablet and notifying the selected piece of PlayList information.

To cause an unboundary application to select a PlayList, all the playback attributes in the PlayList management table are set to "no specification" in regards with a Title that requires such a selection. This is because "All attributes no specification" is used as a trigger to let the playback control engine 32 to request the unboundary application to select a PlayList.

The selection by the unboundary application is based on the selection algorithm that is defined during the authoring. FIGS. 44A to 44C show, in the form of table, the contents of the selection algorithm that is embedded in the unboundary application. The tables indicate the ranges of the PSR value in correspondence with PLs that are to be played back when the PSR takes the values. Of these, FIG. 44A shows the contents of the selection algorithm based on the parental level. The parental level is set to PSR(13) in the playback apparatus. More specifically, an integer that indicates the age of the user is set in the PSR(13), and the playback apparatus regards the integer as the parental level. In FIG. 44A, the values that the PSR(13) can take are divided into three ranges: under 14; 14 and above and under 18; and 18 and above. Also, a PlayList to be played back is indicated for each of these ranges. Accordingly, based on such a selection algorithm, the unboundary application selects PlayList #1 if the PSR set value is under 14, selects PlayList #2 if the PSR set value is 14 and above and under 18, and selects PlayList #3 if the PSR set value is 18 and above.

FIG. 44B shows the contents of the selection algorithm based on Language for Audio. The Language for Audio is set to PS(16) in the playback apparatus. More specifically, an integer is set in the PSR(16), and the playback apparatus regards the integer that specifics a language for audio playback. In FIG. 44B, the values that the PSR(16) can take are divided into three ranges: English; Japanese; and others. Also, a PlayList to be played back is indicated for each of these ranges. Accordingly, based on such a selection algorithm, the unboundary application selects PlayList #1 if the PSR(16) set value indicates English, selects PlayList #2 if the PSR(16) set value indicates Japanese, and selects PlayList #3 if the PSR (16) set value indicates a language other than English and Japanese.

FIG. 44C shows the contents of the selection algorithm based on Player Configuration for Video. The Player Configuration for Video is set to PSR(14) in the playback apparatus. More specifically, an integer is set in the PSR(14), and the playback apparatus regards the integer that specifies an environment for video playback. In FIG. 44C, the values that the PSR(14) can sake are divided into three ranges: resolution 523×600 TV system LetterBox; resolution 525×600 TVsystem; and resolution 1920×1080 TVsystem. Also, a PlayList to be played back is indicated for each of these ranges. Accordingly, based on such a selection algorithm the unboundary application selects PlayList #1 if the PSR(14) set value indicates resolution 525×600 TVsystem Letter Box, selects PlayList #2 if the PSR(14) set value indicates resolution 525×600 TVsystem, and selects PlayList #3 if the PSR(14) set value indicates resolution 1920×1080 TVsystem. The selection algorithms such as those shown in FIGS. 44A to 44C can be created by describing conditional branches as shown in FIGS. 44A to 44C in a computer description language.

Up to now, an improvement on a recording medium in the present embodiment has been described. The following describes an improvement on a playback apparatus in the present embodiment. This improvement is mainly composed of improvement on the application manager 37 and the playback control engine 32.

Upon an occurrence of a branch between Titles, the application manager 37 refers to the PlayList management table and judges whether or not there is an AutoPlay PL in the PlayList management table. If there is no AutoPlay PL, the application manager 37 transfers the PlayList management table to the playback control engine 32, and requests the playback control engine 32 to automatically play back a PlayList that is written in the PlayList management table.

The playback control engine 32, upon receiving the PlayList management table, requests the unboundary application to select PlayLists. Upon receiving from the unboundary application a list of playable PlayLists that is sent in response to the request, the playback control engine 32 judges whether or not there is a PlayList among those in the list that is written in the PlayList management table transferred from the PlayItem. And if there is a PlayList, among those selected by the unboundary application, that is written in the PlayList management table, the playback control engine 32 automatically plays back the PlayList.

FIG. 45 is an illustration of the process in which the Title unboundary application selects PlayLists. On the left-hand side of FIG. 45, the layer structure of software in the playback apparatus is shown. On the right-hand side of FIG. 49, the contents of the BD-ROM are shown. In FIG. 49, the signs (⊚1, ⊚2, ⊚3, ⊚4 represent the following: a notification from the application manager 37 that there is no AutoPlay in the PlayList management table (⊚1); a request by the playback control engine 32 to Indicate playable PlayLists (⊚2); acquisition of PSR set values by the Title unboundary application (⊚3); and notification of playable PlayLists from the Title unboundary application to the playback control engine 32 (⊚4).

It should be noted here that in FIG. 45, the Title unboundary application is written on the BD-ROM for the sake of convenience. Since the Title unboundary application is a Java™ application, the description that is closer to reality would be that the Title unboundary application is executed as an instance by the threads 55 in the work memory 54 in the Java™ virtual machine 36.

According to the present embodiment as described above, such an application that lives at a boundary between Titles is caused to mate the above-described judgment. This enables the playback control engine 32 in the playback apparatus to recognize, at an early stage after a Title is started, a PlayList that satisfies conditions set in the playback apparatus, among a plurality of PlayLists recorded on the BD-ROM. This makes it possible to determine a PlayList that is to be played back at the start of the Title, even without determining an application having the playback attribute "AutoPlay" in advance. It is possible to achieve, even in the BD-J mode, playback controls such as the language credit and the parental lock.

It should be noted here that although in the present embodiment, the selection algorithms correlate PSR values with PlayLists, a PlayList that is to be played back when a PSR set value in the playback apparatus is beyond the scope of assumption may be defined in advance.

Embodiment 5

The present embodiment relates to an improvement of invalidating the sound mixing in advance when titles are switched. The file sound.bdmv may be read out when titles are switched. However, if the file sound.bdmv is not stored in the preload memory 7*a*, a playback of the click sound is interrupted. To prevent this, it is set as a default that the sound mixing is invalidated in advance when titles are switched. With this construction, it is possible to prevent the playback of the click sound from being interrupted.

Embodiment 6

The present embodiment is applied to a case in which the xlet program instructs the playback apparatus to play back a PlayList by generating an instance (JMF player instance) for the mpls file, using an interface or the JMF (Java™ Media Framework) method.

The mpls file is a file that defines the substantial contents of the PlayList information. As described in Embodiment 2, the Mixing_On flag is provided in the PlayList information. When the Mixing_On flag is provided in the PlayList information, the Java™ application requests the playback control engine 32 to play back the PlayList information. This enables the sound mixing to be validated or invalidated according to the Mixing_On flag included in the specified PlayList information.

Embodiment 7

In Embodiment 1, the application manager 37 has a function to instruct the sound controller 9 to validate or invalidate the sound mixing. In the present embodiment, the Java™ application has this function.

To achieve this in the present embodiment, the BD-J platform 35 is provided with an API (Application Interface) for receiving a call for the function, from the Java™ application. And when the Java™ application issues a call for a function to request validation or invalidation of the sound mixing, the sound controller is instructed to validate or invalidate the sound mixing.

It should be noted here that the module manager 34 may have she function to instruct the validation or invalidation of the sound mixing.

Embodiment 8

There is a case where the playback apparatus can output the surround audio as it is since the playback apparatus provides an output form for transferring the surround audio in PCM, the user has selected the output form, and it is not necessary to re-encode the mixing audio. Such output forms include the HDMI output form and the analog output form.

To enable the playback apparatus to judge whether or not the playback apparatus provides an output form for transferring the surround audio in PCM and the user has selected the output form, in the present embodiment, the PSR set 23 describes what audio output form is desired by the user, or what audio output is available based on the connection form of the interface of the playback apparatus.

The following describes the contents of the PSR in the present embodiment. The present embodiment adds the following improvements to the 21$^{st}$ and 22$^{nd}$ PSRs (PSR21 and PSR22) in the PSR set 23.

PSR21 stores: "Audio Mixing Capability" that indicates whether or not the mixing (for example, mixing of an additional sound/voice of 2 channels)-s available; "Audio Mixing Channel Number" that indicates the number of mixing-capable channels (or, names of the mixing-capable channels); and "Audio Output Channel Number" that indicates the maximum number of output channels for the audio output form currently selected by the user.

For example, when the S/PDF is selected as the audio output form, the surround audio cannot be output unless it is compress-encoded, due to a band-related problem. Therefore, re-encoding is necessary after the mixing. When a digital interface corresponding to a high bit rate such as HDMI is selected, however, the surround audio data can be transmitted as it is even in a non-compressed (LPCM) format. Accordingly, in case of the S/PDF connection, the value of the "Audio Output Channel Number" changes depending on whether the encoding is performed after the mixing.

PSR22 stores: "Audio Only Player" that indicates it is a playback apparatus that does not perform a video output; and "Profile1 Player" and "Profile2 Player" that indicates it is a playback apparatus that conforms to a certain profile. For example, for a playback apparatus that supports Profile1, but does not support Profile2, the "Profile1 Player" is set to be effective, and the "Profile2 Player" is set to be ineffective. Since these values can be referred to from the Japanese L, a dynamic playback route selection according to the profile of the playback apparatus, or a selection of whether or not to provide a menu is possible. Especially, when the "Audio Only Player" is effective, it is possible to create a title that plays back a PlayList in a manner in which the user has the same operability as that of a CD playback apparatus in the Japanese L. In this case, the user can operate the BD-ROM in the same manner as he/she operates a music CP. Off course, in the case where a playback apparatus in which the "Audio Only Player" is ineffective is to play back the same disc, an interactive playback is available by displaying a GUI-based menu presuming a video output as before. It is thought that such a presumption is effective in a car audio system or the like adopting the BD-ROM.

With the addition of the above-described PSRs, when the Mixing_On flag corresponding to the PlayItem information or the PlayList information indicates "mixing=effective", the playback control engine 32 of the present invention judges whether or not the mixing is available by referring to PSR21. When PSR21 indicates that the mixing is available, the playback control engine 32 obtains the number of mixing-capable channels from PSR21, and selectively output audio streams or sound data that have the number of channels equal to or less than the number of mixing-capable channels, to the mixer 8 and the sound controller 9.

According to the present embodiment described above, it is possible to define in further detail whether or not the mixing output is available since the PSRs describe what audio output form is desired by the user, or what audio output is available based on the connection form of the interface of the playback apparatus.

Notes

The above description does not show all the embodiments of the present invention. The present invention can be achieved by the following embodiments (A), (B), (C), (D), . . . . The invention defined in the claims of the present application is expansion or generalization of the above-described embodiments or modifications thereof. The level of the expansion or generalization is based on the technical level in technical field of the present invention at the time the present application is filed.

(A) The BD-ROM in each embodiment can be produced by performing the following processes in sequence.

First, a plot of how to play back the BD-ROM is planned (planning process), then video and audio materials are created by recording them (material creating process), and volume structure information is created based on the plot created in the planning process (scenario creating process).

The volume structure information is information that shows, by abstract description, the format of the application layer of the optical disc.

After this, elementary streams are generated by encoding the video, audio, subtitle, and menu materials (material encoding process). The elementary streams are then multiplexed (multiplexing process).

After the multiplexing, the multiplexed streams and the volume structure information are adapted to the application layer format of the BD-ROM so that the general representation of the data to be recorded in the volume area of the BD-ROM is generated (formatting process).

Here, the application layer format of the recording medium of the present invention is an instance of a class structure written in a programming language. And the BD-JObject, Clip information, PlayList information and the like can be created by writing instances of class structures based on the sentence structure defined in the BD-ROM standard or the BD-J standard. In doing this, table-format data can be defined using the "for" sentence of the programming language. Also, such data that is necessary under certain conditions can be defined using the "if" sentence.

After the volume data is obtained by the adaptation process, it is confirmed by playing back the volume data whether or not the results of the scenario creating process are correct (emulation process). In this emulation process, it is preferable to simulate the buffer state of the BD-ROM player model.

Lastly, the press process is performed.

In this press process, the disc master is created by converting the volume image into the physical data sequence, and performing the master cutting using the physical data sequence. Further, the BD-ROM is manufactured from the master created by the press apparatus. This BD-ROM manufacturing includes processes of substrate forming, reflective layer forming, protection layer forming, bonding, and label printing.

With such processes, the recording medium (BD-ROM) for each embodiment is produced.

Both the information processing explained in the above-described embodiments using the flowcharts and the information processing of the functional components explained in the above-described embodiments satisfy the requirements for the "program invention" since the above-mentioned information processing is realized concretely using the hardware resources and are the creation of a technical idea utilizing natural laws.

Production of Program of Present Invention

The program of the present invention can be produced as follows. First, the software developer writes, using a programming language, a source program that achieves each flowchart and functional component. In this writing, the software developer uses the class structure, variables, array variables, calls to external functions and so on, which conform to the sentence structure of the programming language he/she uses.

More specifically, the process repeatedly performed in the flowchart is written using the "for" sentence or the like defined in the sentence structure. The judgment process is write using the "if" sentence, "switch" sentence or the like defined in the sentence structure. The control on the hardware, such as the playback control on the decoder, or the access control on the drive apparatus, is written as calling the external function supplied by the manufacturer of the hardware.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysts, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way. (C) The program of the present invention can be used as follows.

(i) Used as Embedded Program

When the program of the present invention is used as an embedded program, the load module as the program is written into an instruction ROM, together wash the Basic Input/Output System (BIOS) program and various pieces of middleware (operation systems). The program of the present invention is used as the control program of the playback apparatus as the instruction ROM is embedded in the control unit and is executed by the CPU.

(ii) Used as Application

When the playback apparatus is a hard disk-embedded model, the Basic Input/Output System (BIOS) program is embedded in an instruction ROM, and various pieces of middleware (operation systems) are preinstalled in the hard disk. Also, a boot ROM for activating the system from the hard disk is provided in the playback apparatus.

In this case, only the load module supplied to the playback apparatus via a transportable recording medium and/or a network, and is installed in the hard disk as one application. This enables the playback apparatus to perform the bootstrapping by the boot ROM to activate an operation system, and then causes the CPU to execute the installed load module as one application so that the program of the present application can be used.

As described above, when the playback apparatus is a hard-disk-embedded model, the program of the present invention can be used as one application. Accordingly, it is possible to transfer, lend, or supply, via a network, the program of the present invention separately.

(D) Production and Use of System LSI of Present Invention

The system LSI is obtained by implementing a Dear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus.

The bear chips packaged in the system LSI are the instruction ROM, CPU, decoder LSI and the like that realize the functions of each component element included in the internal structure of each embodiment as shown in the drawings.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

In regards with a specific implementation method, it is preferable to use the SoC implementation or the SiP implementation. The SoC (System on Chip) implementation is a technology for printing a plurality of circuits onto a chip. The Sib (System in Package) implementation is a technology for packaging a plurality of circuits by resin or the like. Through these processes, a system LSI of the present invention can be produced based on the internal structure of the playback apparatus 300 described in each embodiment above.

It should be noted here that although the term LSI is used here, it may be called IC, LSI, super LSI, ultra LSI or the like, depending on the level of integration.

Further, part or all of the components of each playback apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

(E) In all the embodiments described above, the optical disc of the present invention is the BD-ROM. However, the optical disc may be any recording medium. For example, it may be an optical disc such as DVD-ROM, DVD-VRAM DVD-RW, DVD-R, DVD+RW, DVD+R, CD-R, and CD-RW, or a magneto-optical disk such as PD or MO.

(F) In all the embodiments described above, the video stream is the AVClip defined in the BD-ROM standard. However, the video stream may be the VOB (Video Object) conforming to the DVD-Video standard or the DVD-Video Recording standard. The VOB is a program stream that is obtained by multiplexing video streams and audio streams, the program stream conforming to the ISO/IEC13818-1 standard. Also, the video stream in the AVClip may conform to the MPEG4 or WMV system. Further, the audio stream may conform to the Linear-PCM system, Dolby-AC3 system, MP3 system, MPEG-AAC system, or dts system.

The description of each embodiment is based on MPEG4-AVC (also called H.264 or JVT). However, the description may be made based on the MPEG2 video stream. Also, the present invention can easily be applied to any other image format (such as VC-1) in so war as the image in the format can be decoded separately.

INDUSTRIAL APPLICABILITY

The recording medium and the playback apparatus of the present invention may be used industrially since the internal structure thereof is disclosed in the embodiments described above, and it is apparent that the recording medium and the playback apparatus of the present invention will be mass-produced. For this reason, the recording medium and the playback apparatus of the present invention have industrial applicability.

The invention claimed is:

1. A non-transitory recording medium on which an application, sound data to be output as a click sound, and a digital stream including a video stream and an audio stream multiplexed therein are recorded, wherein
    management information and a flag corresponding to the management information are further recorded on the non-transitory recording medium,
    the management information indicates a playback control on the digital stream that is to be played back by a playback apparatus while the application is executed, and
    the flag indicates whether or not to mix an output of the click sound using the sound data with an audio output of the digital stream when a user performs an operation on the application being executed by the playback apparatus while the digital stream is under the playback control.

2. A playback apparatus that executes an application while playing back a digital stream recorded on a recording medium, the playback apparatus comprising:
    a reader that reads management information and a flag corresponding to the management information, from the recording medium;
    a platform that executes the application recorded on the recording medium;
    a playback control engine that plays back the digital stream recorded on the recording medium by performing a playback control indicated by the management information while the application is executed, and provides a video output and an audio output of the digital stream; and
    a mixer that, if a flag corresponding to the management information is set to ON, mixes an output of a click sound using sound data with the audio output of the digital stream when a user performs an operation on the application being executed, and if the flag corresponding to the management information is set to OFF, refrains from mixing the output of the click sound with the audio output.

3. A non-transitory computer readable recording medium or storing a management program for managing execution of an application and causing a computer to play back a digital stream recorded on the non-transitory computer readable recording medium, comprising:

a code segment for reading out management information and a flag corresponding to the management information, from the non-transitory computer readable recording medium;

a code segment for executing the application recorded on the non-transitory computer readable medium;

a code segment for playing back the digital stream recorded on the non-transitory computer readable recording medium, via the computer, by performing a playback control indicated by the management information while the application is executed, and providing a video output and an audio output of the digital stream; and if a flag corresponding to the management information is set to ON, mixing an output of a click sound using sound data with the audio output of the digital stream when a user performs an operation on the application being executed, and if the flag corresponding to the management information is set to OFF, refraining from mixing the output of the click sound with the audio output.

4. A playback method for executing an application while playing back a digital stream recorded on a recording medium, the method comprising:

reading out management information and a flag corresponding to the management information, from the recording medium;

executing the application recorded on the recording medium;

playing back the digital stream recorded on the recording medium by performing a playback control indicated by the management information while the application is executed, and providing a video output and an audio output of the digital stream; and if a flag corresponding to the management information is set to ON, mixing an output of a click sound using sound data with the audio output of the digital stream when a user performs an operation on the application being executed, and if the flag corresponding to the management information is set to OFF, refraining from mixing the output of the click sound with the audio output.

5. A playback apparatus that executes an application while playing back a digital stream recorded on a non-transitory recording medium according to claim 1.

* * * * *